United States Patent
Murakami

(10) Patent No.: US 11,444,682 B2
(45) Date of Patent: Sep. 13, 2022

(54) RELAY APPARATUS AND RELAYING METHOD FOR RELAYING SIGNALS

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 35 days.

(21) Appl. No.: 16/968,144

(22) PCT Filed: Jan. 30, 2019

(86) PCT No.: PCT/JP2019/003062
§ 371 (c)(1),
(2) Date: Aug. 6, 2020

(87) PCT Pub. No.: WO2019/155949
PCT Pub. Date: Aug. 15, 2019

(65) Prior Publication Data
US 2021/0044346 A1   Feb. 11, 2021

(30) Foreign Application Priority Data
Feb. 9, 2018   (JP) .............................. JP2018-022192

(51) Int. Cl.
*H04B 7/15* (2006.01)
*H04B 7/0413* (2017.01)
(Continued)

(52) U.S. Cl.
CPC ............. *H04B 7/15* (2013.01); *H04B 7/0413* (2013.01); *H04W 40/22* (2013.01); *H04W 72/0446* (2013.01)

(58) Field of Classification Search
CPC ...... H04B 7/15; H04B 7/0413; H04B 7/0617; H04B 7/0417; H04B 7/061; H04B 7/0634;
(Continued)

(56) References Cited

U.S. PATENT DOCUMENTS

2010/0208643 A1* 8/2010 Robertson ............ H04B 7/2606
                                                                     370/315
2011/0228720 A1* 9/2011 Ninagawa ............ H04B 7/155
                                                                     370/315
(Continued)

FOREIGN PATENT DOCUMENTS

JP    2010-050853 A    3/2010
WO    2011/055536 A1   5/2011

OTHER PUBLICATIONS

AT&T, "Wireless backhaul/relay for NR," R1-166488, Agenda Item: 8.1.3.2, 3GPP TSG RAN WG1 Meeting #86, Göteborg, Sweden, Aug. 22-26, 2016, 8 pages.
(Continued)

*Primary Examiner* — Tejis Daya
(74) *Attorney, Agent, or Firm* — Seed IP Law Group LLP

(57) ABSTRACT

This communication device relays a relay signal to be transmitted to and from a first communication device and a second communication device, and is connected to a first apparatus. The communication device transmits the relay signal using a first transmission slot, and also transmits, using a second transmission slot, a signal having been transmitted from the first apparatus, said signal being transmitted within the transmission period of the first transmission slot in a frequency domain different from that of the first transmission slot.

16 Claims, 57 Drawing Sheets

(51) Int. Cl.
*H04W 40/22* (2009.01)
*H04W 72/04* (2009.01)

(58) Field of Classification Search
CPC .. H04B 7/026; H04B 7/0628; H04B 7/15542; H04W 40/22; H04W 72/0446; H04W 76/40; H04W 88/04; H04W 4/06; H04L 5/14; H04L 5/1469; H04L 5/0044
See application file for complete search history.

(56) References Cited

U.S. PATENT DOCUMENTS

| | | | | |
|---|---|---|---|---|
| 2011/0228722 | A1* | 9/2011 | Noh | H04L 27/2605 |
| | | | | 370/315 |
| 2012/0113888 | A1* | 5/2012 | Takano | H04B 7/15 |
| | | | | 370/315 |
| 2012/0170481 | A1* | 7/2012 | Kimura | H04B 7/15542 |
| | | | | 370/252 |
| 2012/0220239 | A1 | 8/2012 | Hosoya et al. | |
| 2013/0208654 | A1* | 8/2013 | Fujii | H04B 7/026 |
| | | | | 370/315 |
| 2015/0215094 | A1* | 7/2015 | Meng | H04L 1/1861 |
| | | | | 370/280 |
| 2017/0280472 | A1* | 9/2017 | Gupta | H04W 72/048 |
| 2018/0035437 | A1* | 2/2018 | Kahtava | H04B 7/15528 |

OTHER PUBLICATIONS

International Search Report, dated Apr. 2, 2019, for corresponding International Application No. PCT/JP2019/003062, 3 pages.
Extended European Search Report dated Oct. 6, 2021, for the corresponding European Patent Application No. 19750562.1, 9 pages.

* cited by examiner

US 11,444,682 B2

RELAY APPARATUS AND RELAYING METHOD FOR RELAYING SIGNALS

TECHNICAL FIELD

The present invention relates to a communication apparatus and a communication method.

BACKGROUND ART

A communication method called Multiple-Input Multiple-Out (MIMO), for example, is a conventional communication method using a plurality of antennas. Multi-antenna communication represented by MIMO makes it possible to increase data reception quality and/or increase data communication speed (per unit time) by modulating multiple streams of transmission data, and transmitting modulation signals at the same time from different antennas using the same frequency (common frequency).

Further, when multicast communication and/or broadcast communication are performed in a multi-antenna communication, a transmission apparatus sometimes uses a quasi-omni pattern antenna with a substantially constant antenna gain over a wide range of directions in a space. For example, Patent Literature (hereinafter, referred to as "PTL") 1 describes that a transmission apparatus transmits modulation signals using a quasi-omni pattern antenna.

CITATION LIST

Patent Literature

PTL 1
  WO2011/055536

SUMMARY OF INVENTION

Non-limiting examples of the present disclosure help to provide further performance improvements for communication methods using a plurality of antennas.

A communication apparatus according to one aspect of the present disclosure is a communication apparatus that relays a relay signal transmitted and received between a first communication apparatus and a second communication apparatus, and is additionally connected to a first device, in which the communication apparatus transmits the relay signal using a first transmission slot, and transmits a signal from the first device using a second transmission slot during a transmission period of the first transmission slot in a frequency domain different from a frequency domain of the first transmission slot.

It should be noted that general or specific embodiments may be implemented as a system, a method, an integrated circuit, a computer program, or a storage medium, or any selective combination of a system, an apparatus, a method, an integrated circuit, a computer program, and a storage medium.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

According to the present disclosure, it is possible to improve performance in a communication method using a plurality of antennas.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Embodiment 1

Figure 1:
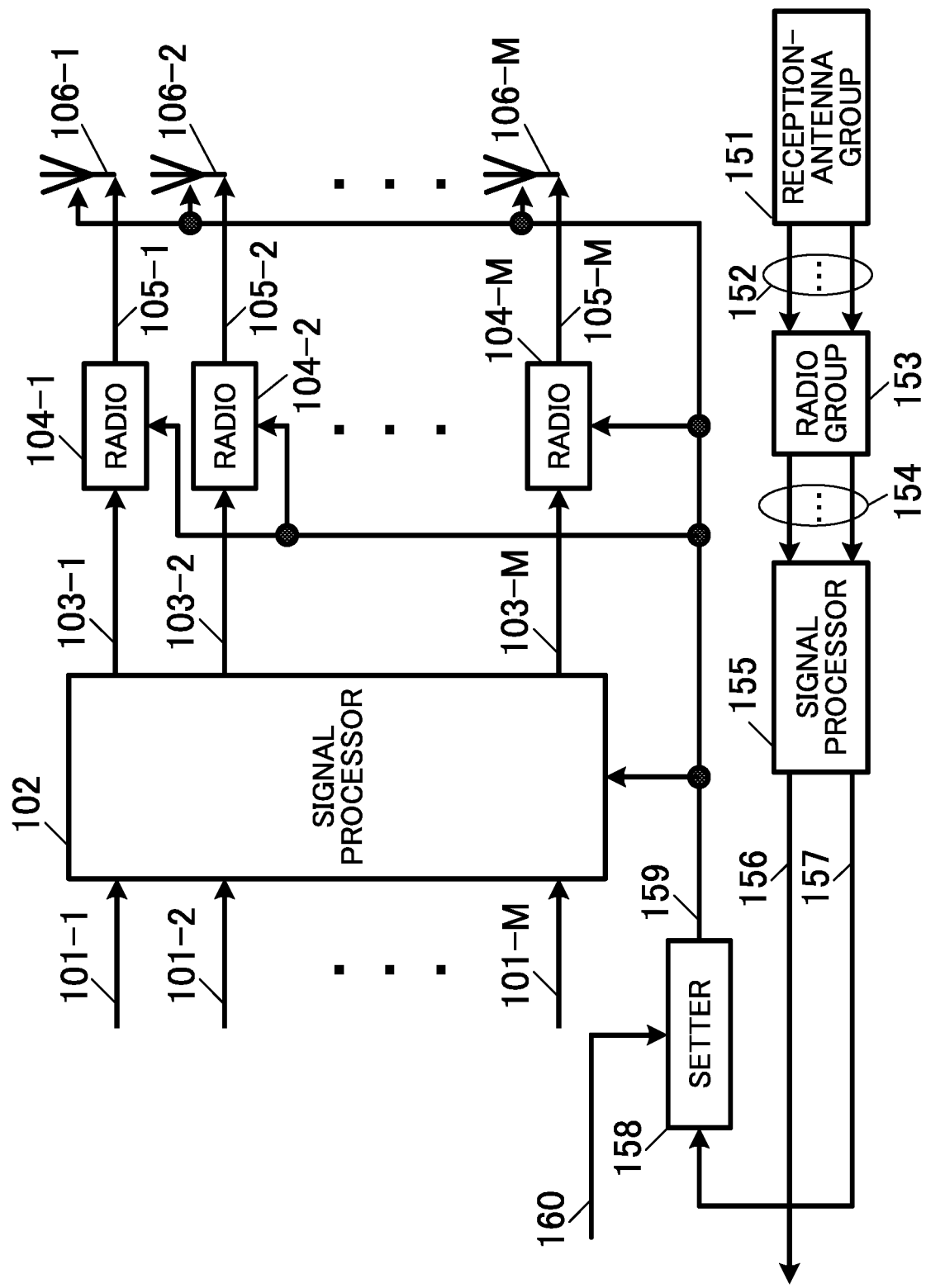
FIG. 1 illustrates an example of a configuration of a base station.

FIG. 1 illustrates an example of a configuration of a base station (or an access point or the like) according to the present embodiment.

FIG. 1 illustrates #1 information 101-1, #2 information 101-2, . . . , and #M information 101-M. That is, #i pieces of information 101-i are illustrated in FIG. 1. The character "i" is an integer of from 1 through M. Note that "M" is an integer equal to or greater than 2. Note that not all the pieces of information of from the #1 information to the #M information have to be present.

The #1 information 101-1, #2 information 101-2, . . . , and/or #M information 101-M and control signal 159 are input to signal processor 102. Signal processor 102 performs signal processing based on information such as "information on an error correction coding scheme (coding rate, code length (block length))," "information on a modulation scheme," "information on precoding," "a transmission method (multiplexing method)," "whether to perform multicast transmission and/or to perform unicast transmission (the multicast transmission and the unicast transmission may also be realized simultaneously)," "the number of transmission streams for multicasting," "a transmission method in the case of transmission of a multicast modulation signal (which will be described in detail later)," and/or the like included in control signal 159, and outputs signal 103-1 after the signal processing, signal 103-2 after the signal processing, . . . , and signal 103-M after the signal processing (i.e., signals 103-i after the signal processing). Note that, not all the signals of from signal #1 after the signal processing to signal #M after the signal processing necessarily have to be present. At this time, error correction coding is performed on #i information 101-i, and mapping according to a configured modulation scheme is then performed. Accordingly, a baseband signal is obtained. Then, signal processor 102 collects baseband signals corresponding respectively to the pieces of information to perform precoding. For example, signal processor 102 may apply Orthogonal Frequency Division Multiplexing (OFDM).

Signal 103-1 after the signal processing and control signal 159 are input to radio 104-1, and the radio performs processing such as band limitation, frequency conversion, and amplification on the basis of control signal 159, and outputs transmission signal 105-1. Then, transmission signal 105-1 is output as a radio wave from antenna section 106-1.

Similarly, signal 103-2 after the signal processing and control signal 159 are input to radio 104-2, and the radio performs processing such as band limitation, frequency conversion, and amplification on the basis of control signal 159, and outputs transmission signal 105-2. Then, transmission signal 105-2 is output as a radio wave from antenna section 106-2. Descriptions of radios 104-3 to 104-(M−1) are omitted.

Signal 103-M after the signal processing and control signal 159 are input to radio 104-M, and the radio performs processing such as band limitation, frequency conversion, and amplification on the basis of control signal 159, and outputs transmission signal 105-M. Then, transmission signal 105-M is output as a radio wave from antenna section 106-M.

When there is no signal after signal processing, the radios do not need to perform the above processing.

Reception signal group 152 received by reception-antenna group 151 is input to radio group 153, and the radio group performs processing such as frequency conversion on the reception signal group and outputs baseband-signal group 154.

Baseband-signal group 154 is input to signal processor 155, and the signal processor performs demodulation and error correction decoding. In other words, signal processor 155 also performs processing such as time synchronization, frequency synchronization, and channel estimation. Since signal processor 155 receives a modulation signal transmitted by one or more terminals at this time for performing the processing, the signal processor obtains data transmitted by each of the terminals and control information transmitted by each of the terminals. Accordingly, signal processor 155 outputs data group 156 corresponding to one or more terminals and control information group 157 corresponding to one or more terminals.

Control information group 157 and configuration signal 160 are input to setter 158, and the setter determines, based on control information group 157, the "error correction coding scheme (coding rate and code length (block length))," "modulation scheme," "precoding method," "transmission method," "antenna configuration," "whether to perform multicast transmission and/or to perform unicast transmission (the multicast transmission and the unicast transmission may be realized simultaneously)," "number of transmission streams for multicasting," "transmission method for transmitting a multicast modulation signal," and/or the like to output control signal 159 including the determined information.

Control signal 159 is input to antenna sections 106-1, 106-2, . . . , and/or 106-M. An operation at this time will be described with reference to FIG. 2.

Figure 2:
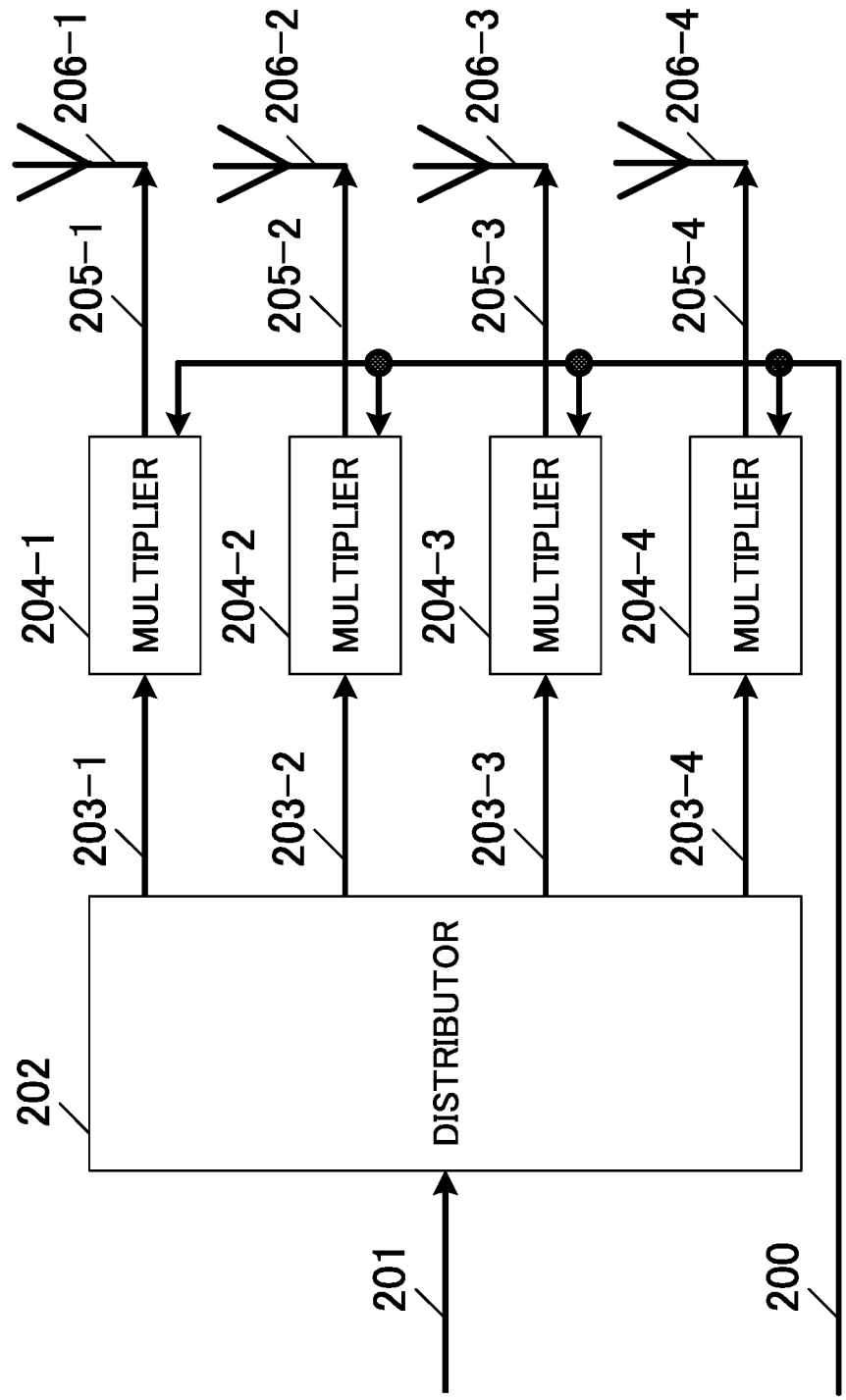
FIG. 2 illustrates an example of a configuration of an antenna section of the base station.

FIG. 2 illustrates an example of the configuration of each of antenna sections 106-1, 106-2, . . . , and 106-M. Each of the antenna sections includes a plurality of antennas as illustrated in FIG. 2. Note that, while FIG. 2 illustrates four antennas, each of the antenna sections only has to include a plurality of antennas. Note that the number of antennas is not limited to 4.

FIG. 2 is a configuration of antenna section 106-$i$. The character "i" is an integer of from 1 through M.

Transmission signals 201 (corresponding to transmission signals 105-$i$ in FIG. 1) are input to distributor 202, and the distributor distributes transmission signals 201 to output signals 203-1, 203-2, 203-3, and/or 203-4.

Signal 203-1 and control signal 200 (corresponding to control signal 159 in FIG. 1) are input to multiplier 204-1, and the multiplier multiplies signal 203-1 by factor W1 based on information on a multiplication factor included in control signal 200, to output signal 205-1 resulting from multiplication. Factor W1 is defined by a complex number and, thus, W1 may be a real number. Accordingly, when signal 203-1 is expressed as v1($t$), signal 205-1 resulting from multiplication can be expressed as W1×v1($t$) (t denotes time). Signal 205-1 resulting from multiplication is output as a radio wave from antenna 206-1.

Similarly, signal 203-2 and control signal 200 are input to multiplier 204-2, and the multiplier multiplies signal 203-2 by factor W2 based on the information on the multiplication factor included in control signal 200, to output signal 205-2 resulting from multiplication. Factor W2 is defined by a complex number and, thus, W2 can be a real number. Accordingly, when signal 203-2 is expressed as v2($t$), signal 205-2 resulting from multiplication can be expressed as W2×v2($t$) (t denotes time). Signal 205-2 resulting from multiplication is output as a radio wave from antenna 206-2.

Signal 203-3 and control signal 200 are input to multiplier 204-3, and the multiplier multiplies signal 203-3 by factor W3 based on the information on the multiplication factor included in control signal 200, to output signal 205-3 resulting from multiplication. Factor W3 is defined by a complex number and, thus, W3 can be a real number. Accordingly, when signal 203-3 is expressed as v3($t$), signal 205-3 resulting from multiplication can be expressed as W3×v3($t$) (t denotes time). Signal 205-3 resulting from multiplication is output as a radio wave from antenna 206-3.

Signal 203-4 and control signal 200 are input to multiplier 204-4, and the multiplier multiplies signal 203-4 by factor W4 based on the information on the multiplication factor included in control signal 200, to output signal 205-4 resulting from multiplication. Factor W4 is defined by a complex number and, thus, W4 can be a real number. Accordingly, when signal 203-4 is expressed as v4($t$), signal 205-4 resulting from multiplication can be expressed as W4×v4($t$) (t denotes time). Signal 205-4 resulting from multiplication is output as a radio wave from antenna 206-4.

Note that, at least two of the absolute value of W1, the absolute value of W2, the absolute value of W3, and the absolute value of W4 may be equal to each other.

Figure 3:
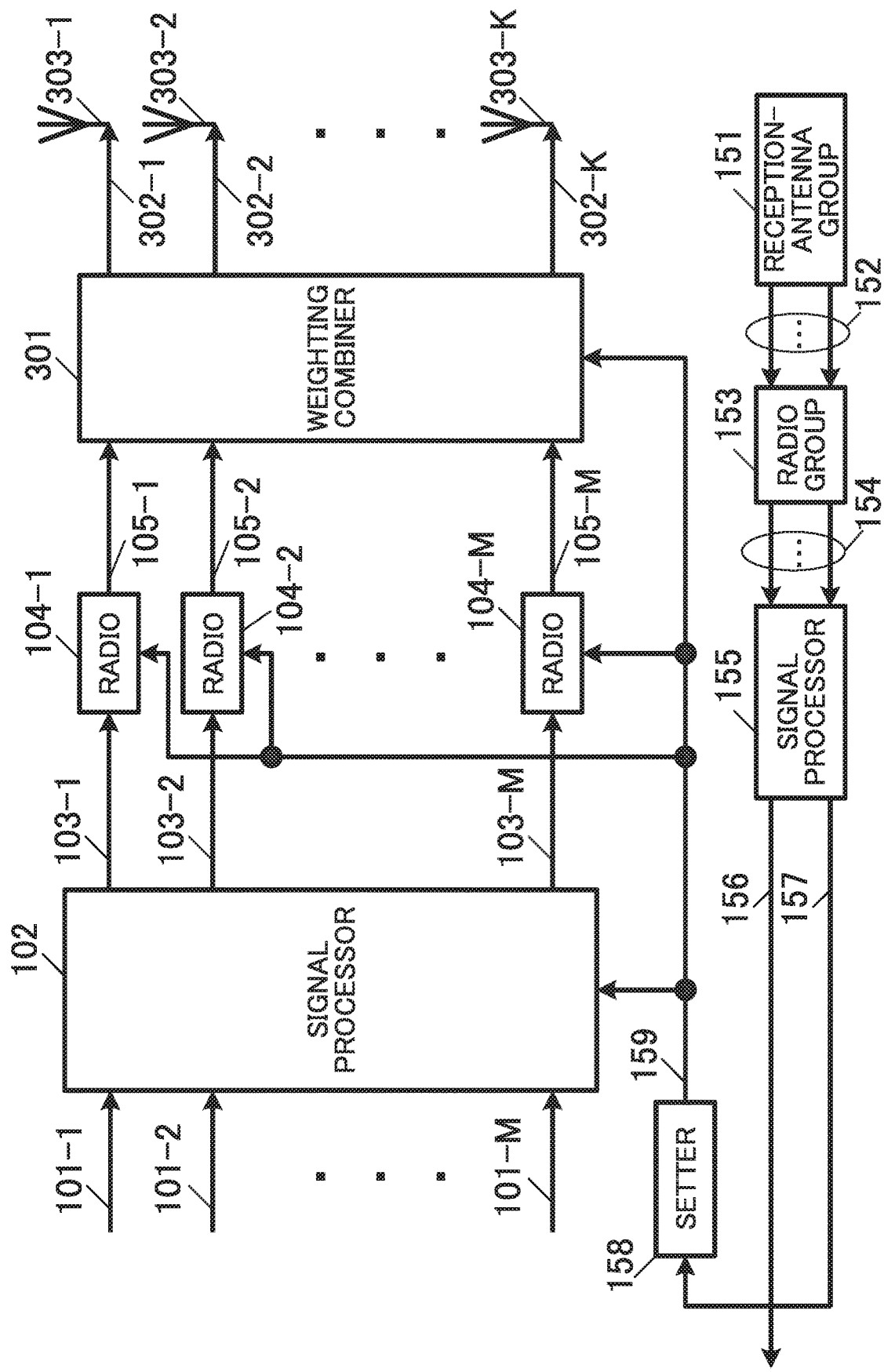
FIG. 3 illustrates an example of the configuration of the base station.

FIG. 3 illustrates a configuration of the base station in the present embodiment, which is different from the configuration of the base station in FIG. 1. Components in FIG. 3 that operate in the same manner as those in FIG. 1 are provided with the same reference numerals, and the descriptions of those components are omitted below.

Modulation signal 105-1, modulation signal 105-2, . . . , and/or modulation signal 105-M and control signal 159 are input to weighting combiner 301. Weighting combiner 301 performs weighted combination on modulation signal 105-1, modulation signal 105-2, . . . , and/or modulation signal 105-M based on information relevant to weighted combination included in control signal 159, to output signals 302-1, 302-2, . . . , and/or 302-K resulting from the weighted combination. The character "K" is an integer equal to or greater than 1. Signal 302-1 resulting from the weighted combination is output as a radio wave from antenna 303-1, signal 302-2 resulting from the weighted combination is output as a radio wave from antenna 303-2, . . . , and signal 302-K resulting from the weighted combination is output as a radio wave from antenna 303-K.

Signal $y_i(t)$ 302-$i$ resulting from the weighted combination, where i is an integer of from 1 through K, is expressed as follows (t denotes time).

[1]

$$y_i^{(t)} = A_{i1} \times x_1^{(t)} + A_{i2} \times x_2^{(t)} + \ldots + A_{iM} \times x_M^{(t)} \quad \text{(Equation 1)}$$
$$= \sum_{j=1}^{M} A_{ij} \times x_j^{(t)}$$

In Equation 1, $A_{ij}$ is defined as a complex number and, thus, $A_{ij}$ can be a real number. Correspondingly, $x_j(t)$ is modulation signal 105-$j$. The character "j" is an integer of from 1 through M.

Figure 4:
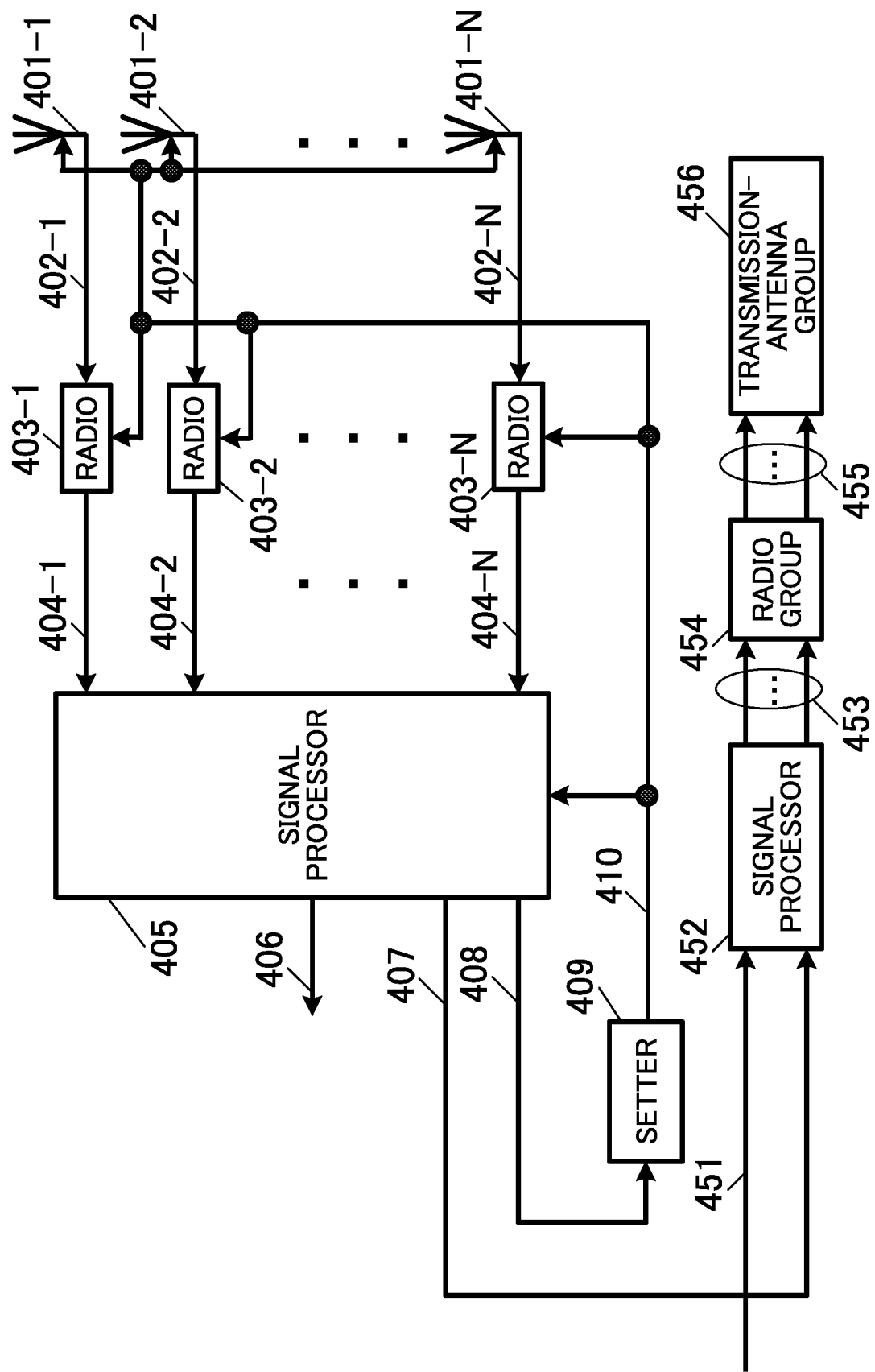
FIG. 4 illustrates an example of a configuration of a terminal.

FIG. 4 illustrates an example of a configuration of a terminal. Control signal 410 is input to antenna sections 401-1, 401-2, . . . , and/or 401-N. N is an integer equal to or greater than 1.

Reception signal 402-1 received by antenna section 401-1 and control signal 410 are input to radio 403-1, and the radio performs processing such as frequency conversion and the like on reception signal 402-1 based on control signal 410, to output baseband signal 404-1.

Similarly, reception signal 402-2 received by antenna section 401-2 and control signal 410 are input to radio 403-2, and the radio performs processing such as frequency conversion and the like on reception signal 402-2 based on control signal 410, to output baseband signal 404-2. Note that, descriptions of radios 403-3 to 403-(N−1) are omitted.

Reception signal 402-N received by antenna section 401-N and control signal 410 are input to radio 403-N, and the radio performs processing such as frequency conversion and the like on reception signal 402-N based on control signal 410, to output baseband signal 404-N.

However, not all of radios 403-1, 403-2, . . . , and 403-N necessarily operate. Correspondingly, not all of baseband signals 404-1, 404-2, . . . , and 404-N are necessarily present.

Baseband signals 404-1, 404-2, . . . , and 404-N and control signal 410 are input to signal processor 405, and the signal processor performs processing of demodulation and error correction decoding based on control signal 410, to output data 406, transmission control information 407, and control information 408. In other words, signal processor 405 also performs processing such as time synchronization, frequency synchronization, and channel estimation.

Control information 408 is input to setter 409, and the setter performs setting for a reception method and outputs control signal 410.

Information 451 and transmission control information 407 are input to signal processor 452, and the signal processor performs processing such as error correction encoding and mapping according to a configured modulation scheme, to output baseband-signal group 453.

Baseband-signal group 453 is input to radio group 454, and the radio group performs processing such as band limitation, frequency conversion, and amplification, to output transmission-signal group 455. Transmission-signal group 455 is output from transmission-antenna group 456 as a radio wave.

Figure 5:
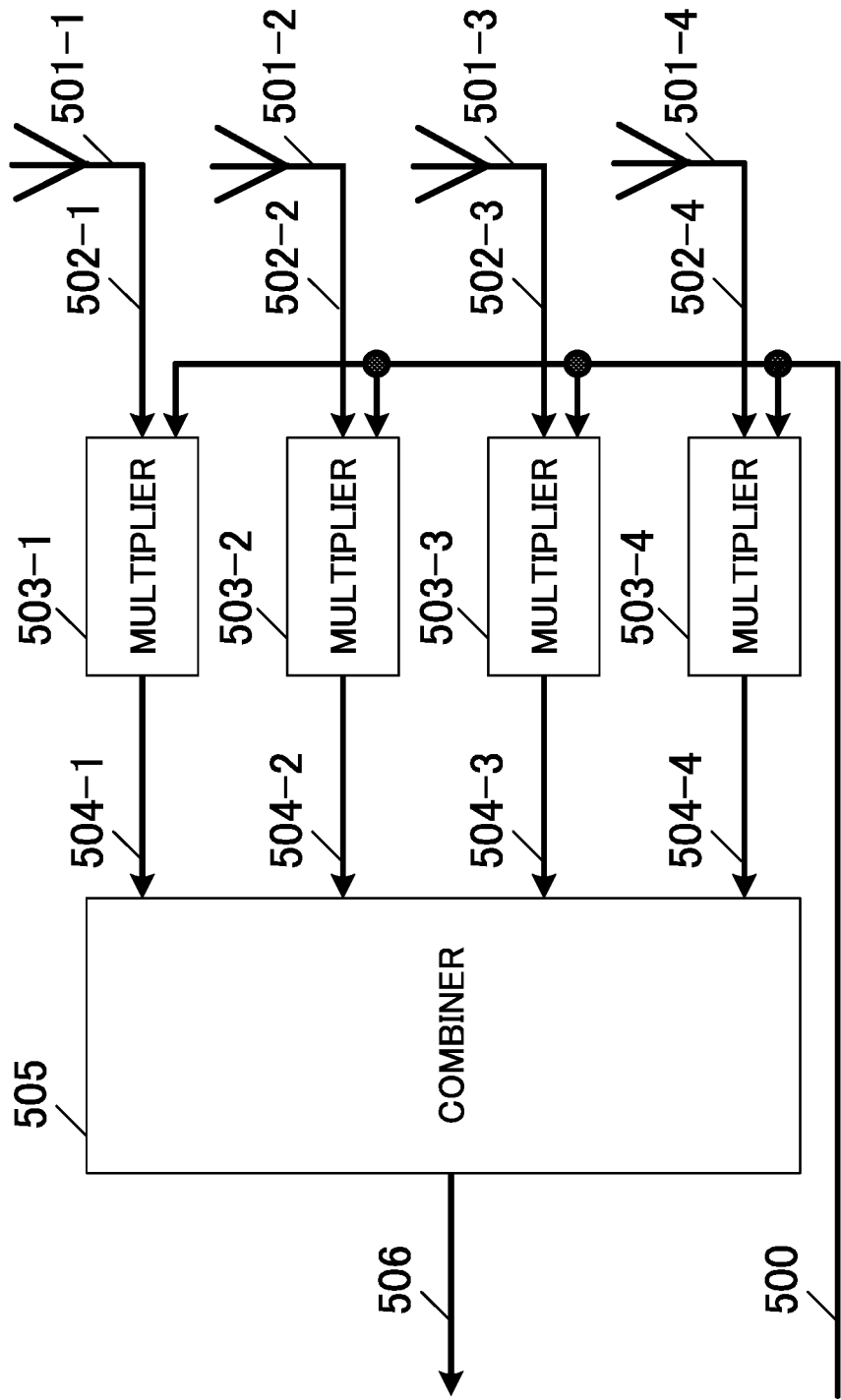
FIG. 5 illustrates an example of a configuration of an antenna section of the terminal.

FIG. 5 illustrates an example of the configuration of each of antenna sections 401-1, 401-2, . . . , and 401-N. Each of the antenna sections includes a plurality of antennas as illustrated in FIG. 5. Note that, while FIG. 5 illustrates four antennas, each of the antenna sections only has to include a plurality of antennas. Note that, the number of antennas of the antenna section is not limited to 4.

FIG. 5 illustrates the configuration of antenna section 401-$i$. The character "i" is an integer of from 1 through N.

Reception signal 502-1 received by antenna 501-1 and control signal 500 (corresponding to control signal 410 in FIG. 4) are input to multiplier 503-1, and the multiplier multiplies reception signal 502-1 by factor D1 based on the information on the multiplication factor included in control signal 500, to output signal 504-1 resulting from multiplication. Factor D1 is defined by a complex number and, thus, D1 may be a real number. Accordingly, when reception signal 502-1 is expressed as $e1(t)$, signal 504-1 resulting from multiplication can be expressed as $D1 \times e1(t)$ (t denotes time).

Similarly, reception signal 502-2 received by antenna 501-2 and control signal 500 are input to multiplier 503-2, and the multiplier multiplies reception signal 502-2 by factor D2 based on the information on the multiplication factor included in control signal 500, to output signal 504-2 resulting from multiplication. Factor D2 is defined by a complex number and, thus, D2 may be a real number. Accordingly, when reception signal 502-2 is expressed as $e2(t)$, signal 504-2 resulting from multiplication can be expressed as $D2 \times e2(t)$ (t denotes time).

Similarly, reception signal 502-3 received by antenna 501-3 and control signal 500 are input to multiplier 503-3, and the multiplier multiplies reception signal 502-3 by factor D3 based on the information on the multiplication factor included in control signal 500, to output signal 504-3 resulting from multiplication. Factor D3 is defined by a complex number and, thus, D3 may be a real number. Accordingly, when reception signal 502-3 is expressed as $e3(t)$, signal 504-3 resulting from multiplication can be expressed as $D3 \times e3(t)$ (t denotes time).

Reception signal 502-4 received by antenna 501-4 and control signal 500 are input to multiplier 503-4, and the multiplier multiplies reception signal 502-4 by factor D4 based on the information on the multiplication factor included in control signal 500, to output signal 504-4 resulting from multiplication. Factor D4 is defined by a complex number and, thus, D4 may be a real number. Accordingly, when reception signal 502-4 is expressed as $e4(t)$, signal 504-4 resulting from multiplication can be expressed as $D4 \times e4(t)$ (t denotes time).

Signals 504-1, 504-2, 504-3, and 504-4 resulting from multiplication are input to combiner 505, and the combiner adds together signals 504-1, 504-2, 504-3, and 504-4 resulting from multiplication to output combined signal 506 (corresponding to reception signal 402-$i$ in FIG. 4). Accordingly, combined signal 506 is expressed as $D1 \times e1(t) + D2 \times e2(t) + D3 \times e3(t) + D4 \times e4(t)$.

Figure 6:
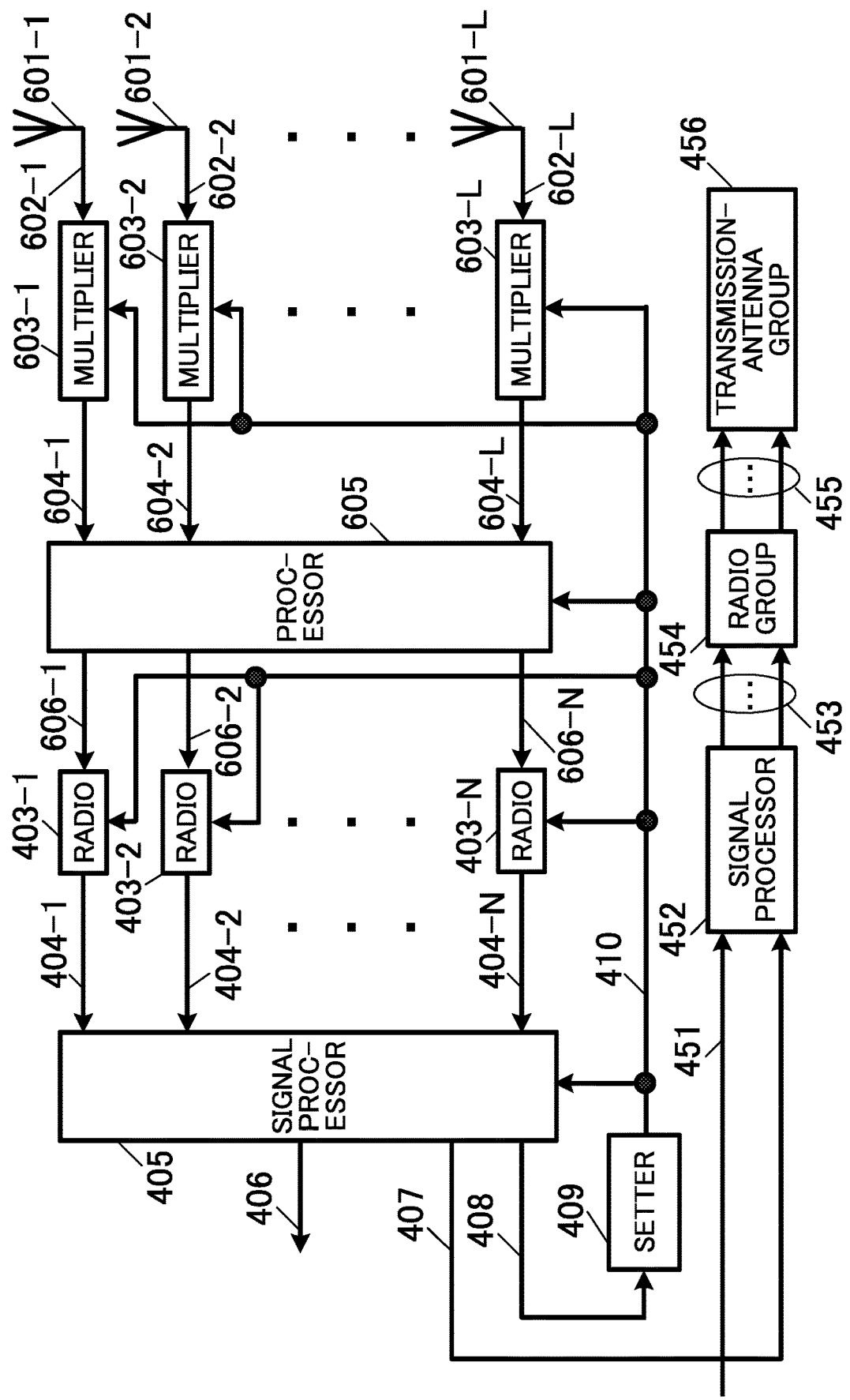
FIG. 6 illustrates an example of the configuration of the terminal.

FIG. 6 illustrates a configuration of a terminal in the present embodiment, which is different from the configuration of the terminal in FIG. 4. Components in FIG. 6 that operate in the same manner as those in FIG. 4 are provided with the same reference numerals, and the descriptions of those components are omitted below.

Reception signal 602-1 received by antenna 601-1 and control signal 410 are input to multiplier 603-1, and the multiplier multiplies reception signal 602-1 by factor G1 based on information on a multiplication factor included in control signal 410, to output signal 604-1 resulting from multiplication. Factor G1 is defined by a complex number and, thus, G1 may be a real number. Accordingly, when reception signal 602-1 is expressed as $c1(t)$, signal 604-1 resulting from multiplication can be expressed as $G1 \times c1(t)$ (t denotes time).

Similarly, reception signal 602-2 received by antenna 601-2 and control signal 410 are input to multiplier 603-2, and the multiplier multiplies reception signal 602-2 by factor G2 based on the information on the multiplication factor included in control signal 410, to output signal 604-2 resulting from multiplication. Factor G2 is defined by a complex number and, thus, G2 may be a real number. Accordingly, when reception signal 602-2 is expressed as $c2(t)$, signal 604-2 resulting from multiplication can be expressed as $G2 \times c2(t)$ (t denotes time). The descriptions of multipliers 603-3 to 603-(L−1) are omitted.

Reception signal 602-L received by antenna 601-L and control signal 410 are input to multiplier 603-L, and the multiplier multiplies reception signal 602-L by factor GL based on the information on the multiplication factor included in control signal 410, to output signal 604-L resulting from multiplication. Factor GL is defined by a complex number and, thus, GL may be a real number. Accordingly, when reception signal 602-L is expressed as cL(t), signal 604-L resulting from multiplication can be expressed as $GL \times cL(t)$ (t denotes time).

Thus, reception signal 602-$i$ received by antenna 601-$i$ and control signal 410 are input to multiplier 603-$i$, and the multiplier multiplies reception signal 602-$i$ by factor Gi based on the information on the multiplication factor included in control signal 410, to output signal 604-$i$ resulting from multiplication. Factor Gi is defined by a complex number and, thus, Gi may be a real number. Accordingly, when reception signal 602-$i$ is expressed as ci(t), signal 604-$i$ resulting from multiplication can be expressed as $Gi \times ci(t)$ (t denotes time). Note that, "i" is an integer of from 1 through L, and L is an integer equal to or greater than 2.

Signal 604-1 resulting from multiplication, signal 604-2 resulting from multiplication, . . . , and/or signal 604-L resulting from multiplication and control signal 410 are input to processor 605, and the processor performs signal processing based on control signal 410, to output processed signals 606-1, 606-2, . . . , and/or 606-N. N is an integer equal to or greater than 2. In this case, signal 604-$i$ resulting from multiplication is expressed as $p_i(t)$. The character "i" is an integer of from 1 through L. In this case, processed signal 606-$j$ ($r_j(t)$) is expressed as follows (where j is an integer of from 1 through N).

[2]

$$r_j^{(t)} = B_{j1} \times p_1^{(t)} + B_{j2} \times p_2^{(t)} + \ldots + B_{jL} \times p_L^{(t)}$$ (Equation 2)

$$= \sum_{i=1}^{L} B_{ji} \times p_i^{(t)}$$

In Equation 2, $B_{ji}$ is defined by a complex number and, thus, $B_{ji}$ may be a real number.

Figure 7:
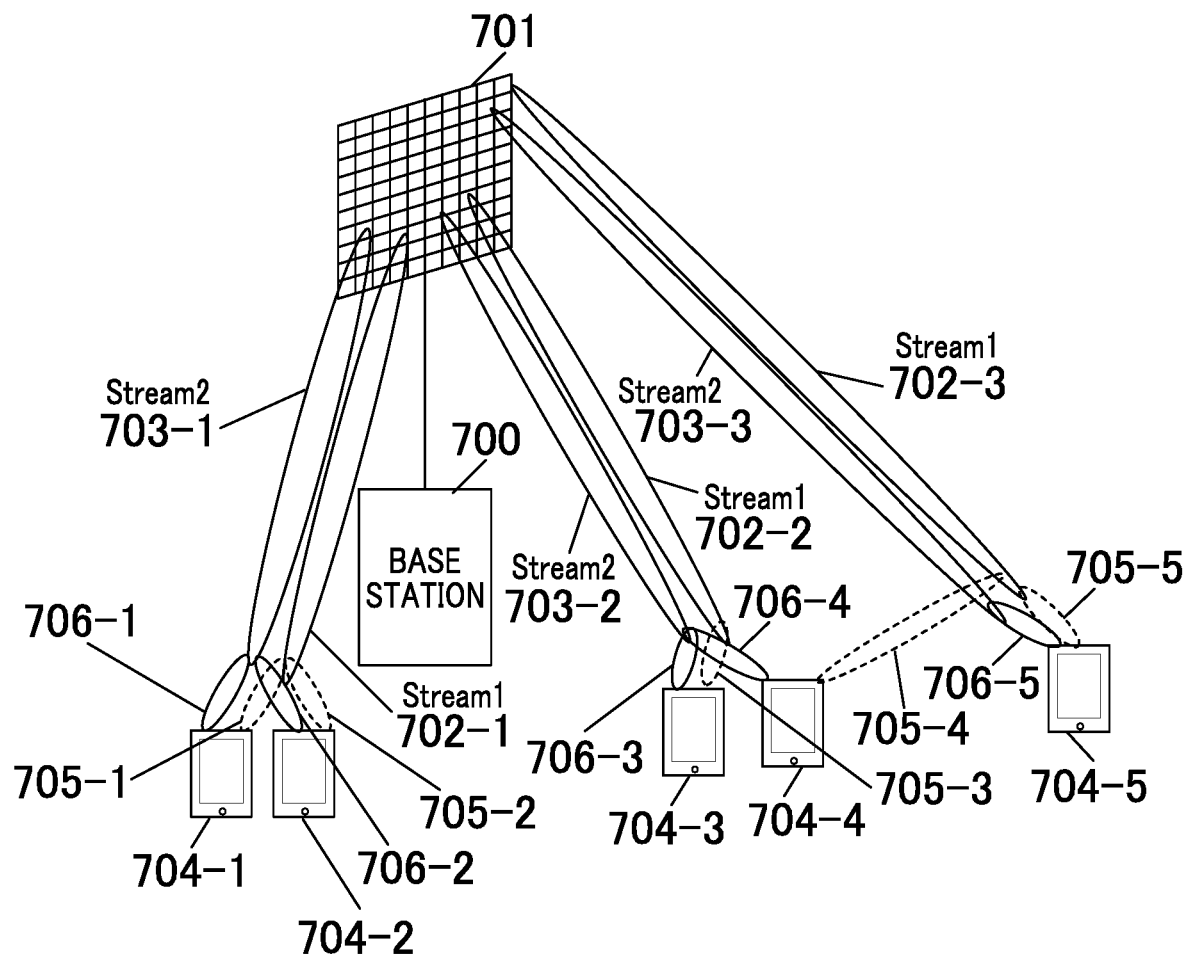
FIG. 7 illustrates an example of a communication state between the base station and the terminal.

FIG. 7 illustrates an example of a communication state between the base station and the terminal. Note that, the base station may also be referred to as an access point, broadcasting station, or the like.

Base station 700 includes a plurality of antennas, and transmits a plurality of transmission signals from transmission antenna 701. Base station 700 is configured, for example, as in FIG. 1 or 3 and performs, at signal processor 102 (and/or at weighting combiner 301), precoding (weighted combination) to perform transmission beamforming (directivity control).

FIG. 7 illustrates transmission beam 702-1 for transmitting data of stream 1, transmission beam 702-2 for transmitting data of stream 1, and transmission beam 702-3 for transmitting data of stream 1. FIG. 7 also illustrates transmission beam 703-1 for transmitting data of stream 2, transmission beam 703-2 for transmitting data of stream 2, and transmission beam 703-3 for transmitting data of stream 2.

Note that, while the number of transmission beams for transmitting data of stream 1 is 3 and the number of transmission beams for transmitting data of stream 2 is 3 in FIG. 7, the number of transmission beams is not limited to this example. That is, there only have to be a plurality of transmission beams for transmitting data of stream 1 and a plurality of transmission beams for transmitting data of stream 2.

FIG. 7 includes terminals 704-1, 704-2, 704-3, 704-4, and 704-5. These terminals may be configured as illustrated in FIG. 4 or 5, for example.

For example, terminal 704-1 performs directivity control performed for reception (hereinafter, referred to as "reception directivity control") at "signal processor 405," "antennas 401-1 to 401-N," and/or "multipliers 603-1 to 603-L and processor 605" to form reception directivity 705-1 and reception directivity 706-1. Reception directivity 705-1 allows terminal 704-1 to receive and demodulate transmission beam 702-1 for transmitting data of stream 1, and reception directivity 706-1 allows terminal 704-1 to receive and demodulate transmission beam 703-1 for transmitting data of stream 2.

Similarly, terminal 704-2 performs the reception directivity control at "signal processor 405," "antennas 401-1 to 401-N," and/or "multipliers 603-1 to 603-L and processor 605" to form reception directivity 705-2 and reception directivity 706-2. Reception directivity 705-2 allows terminal 704-2 to receive and demodulate transmission beam 702-1 for transmitting data of stream 1, and reception directivity 706-2 allows terminal 704-2 to receive and demodulate transmission beam 703-1 for transmitting data of stream 2.

Terminal 704-3 performs the reception directivity control at "signal processor 405," "antennas 401-1 to 401-N," and/or "multipliers 603-1 to 603-L and processor 605" to form reception directivity 705-3 and reception directivity 706-3. Reception directivity 705-3 allows terminal 704-3 to receive and demodulate transmission beam 702-2 for transmitting data of stream 1, and reception directivity 706-3 allows terminal 704-3 to receive and demodulate transmission beam 703-2 for transmitting data of stream 2.

Terminal 704-4 performs the reception directivity control at "signal processor 405," "antennas 401-1 to 401-N," and/or "multipliers 603-1 to 603-L and processor 605" to form reception directivity 705-4 and reception directivity 706-4. Reception directivity 705-4 allows terminal 704-4 to receive and demodulate transmission beam 702-3 for transmitting data of stream 1, and reception directivity 706-4 allows terminal 704-4 to receive and demodulate transmission beam 703-2 for transmitting data of stream 2.

Terminal 704-5 performs the reception directivity control at "signal processor 405," "antennas 401-1 to 401-N," and/or "multipliers 603-1 to 603-L and processor 605" to form reception directivity 705-5 and reception directivity 706-5. Reception directivity 705-5 allows terminal 704-5 to receive and demodulate transmission beam 702-3 for transmitting data of stream 1, and reception directivity 706-5 allows terminal 704-5 to receive and demodulate transmission beam 703-3 for transmitting data of stream 2.

In FIG. 7, each of the terminals can obtain the data of stream 1 with high quality by selecting, depending on its spatial position, at least one transmission beam of transmission beams 702-1, 702-2, and 702-3 for transmitting the data of stream 1 and by directing the reception directivity. Each of the terminals also can obtain the data of stream 2 with high quality by selecting, depending on its spatial position, at least one transmission beam of transmission beams 703-1, 703-2, and 703-3 for transmitting the data of stream 2 and by directing the reception directivity.

Base station 700 transmits transmission beam 702-1 for transmitting the data of stream 1 and transmission beam 703-1 for transmitting the data of stream 2 using the same frequency (the same frequency band) and the same time. Base station 700 transmits transmission beam 702-2 for transmitting the data of stream 1 and transmission beam 703-2 for transmitting the data of stream 2 using the same frequency (the same frequency band) and the same time. Base station 700 transmits transmission beam 702-3 for transmitting the data of stream 1 and transmission beam 703-3 for transmitting the data of stream 2 using the same frequency (the same frequency band) and the same time.

Note that, transmission beams 702-1, 702-2, and 702-3 for transmitting the data of stream 1 may be beams of the same frequency (the same frequency band) or beams of frequencies (frequency bands) different from one another. Transmission beams 703-1, 703-2, and 703-3 for transmitting the data of stream 2 may be beams of the same frequency (the same frequency band) or beams of frequencies (frequency bands) different from one another.

The operation of setter 158 of the base station illustrated in FIG. 1 or 3 for the above case will be described.

Configuration signal 160 is input to setter 158. Configuration signal 160 includes information indicating "whether to perform multicast transmission and/or to perform unicast transmission." When the base station performs transmission as illustrated in FIG. 7, configuration signal 160 provides input of the information "multicast transmission is to be performed" into setter 158.

Configuration signal 160 includes information indicating the "number of transmission streams for multicasting." When the base station performs transmission as illustrated in FIG. 7, configuration signal 160 provides input of the information "the number of transmission streams is 2" into setter 158.

Configuration signal 160 may include information indicating "how many transmission beams are used to transmit each stream." When the base station performs transmission as illustrated in FIG. 7, configuration signal 160 provides input of the information "the number of transmission beams for transmitting stream 1 is 3 and the number of transmission beams for transmitting stream 2 is 3" into setter 158.

The base station of FIG. 1 or 3 may transmit a control information symbol including information indicating whether data symbols are "multicast transmission and/or unicast transmission," information indicating "the number of transmission streams for multicasting," and/or information indicating "how many transmission beams are used to transmit each stream," and the like. It is thus possible for the terminal to perform suitable reception. Details of the configuration of the control information symbol will be described later.

Figure 8:
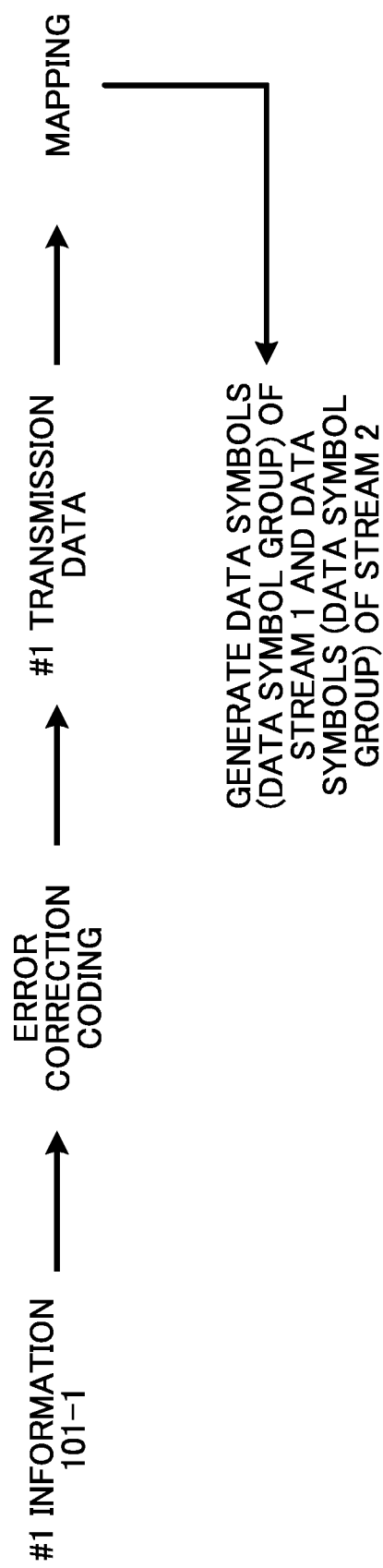
FIG. 8 illustrates the relationship between multiple streams.

FIG. 8 explains the relationship between #i information 101-i in FIG. 1 or 3 and the "stream 1" and "stream 2" described with reference to FIG. 7.

For example, processing such as error correction coding is performed on #1 information 101-1 to obtain data after the error correction coding. This data after the error correction coding is called "#1 transmission data." Then, mapping is performed on the #1 transmission data to obtain data symbols. Then, the data symbols are distributed to stream 1 and stream 2 to obtain data symbols (data symbol group) of stream 1 and data symbols (data symbol group) of stream 2. The symbol group of stream 1 includes data symbols (data symbol group) of stream 1, and the symbol group of stream 1 is transmitted from the base station of FIG. 1 or 3. The symbol group of stream 2 includes data symbols (data symbol group) of stream 2, and the symbol group of stream 2 is transmitted from the base station of FIG. 1 or 3.

Figure 9:
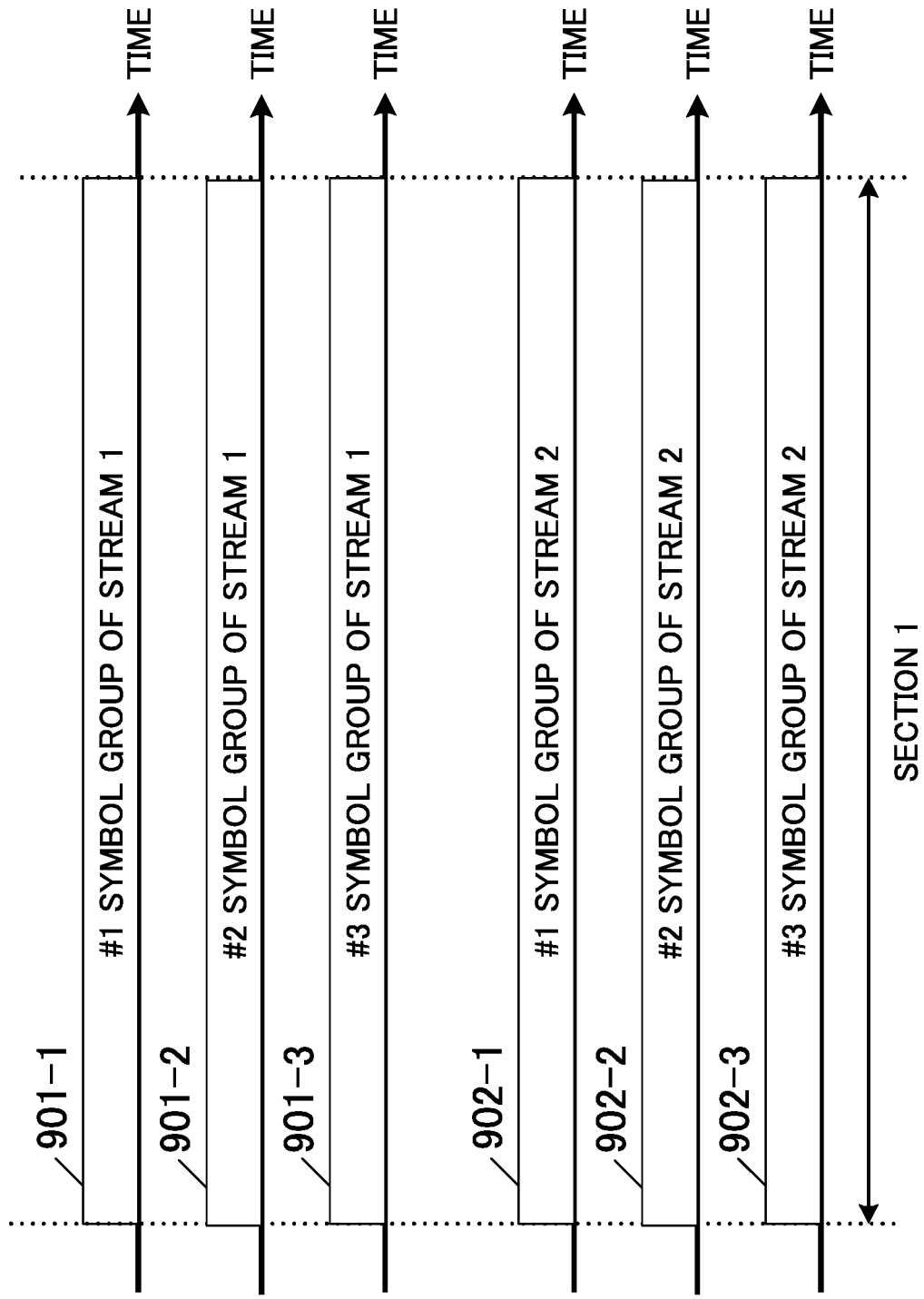
FIG. 9 illustrates an example of a frame configuration.

FIG. 9 illustrates an example of a frame configuration in which the horizontal axis represents time.

The #1 symbol group 901-1 of stream 1 in FIG. 9 is a symbol group of transmission beam 702-1 for transmitting data of stream 1 in FIG. 7.

The #2 symbol group 901-2 of stream 1 in FIG. 9 is a symbol group of transmission beam 702-2 for transmitting data of stream 1 in FIG. 7.

The #3 symbol group 901-3 of stream 1 in FIG. 9 is a symbol group of transmission beam 702-3 for transmitting data of stream 1 in FIG. 7.

The #1 symbol group 902-1 of stream 2 in FIG. 9 is a symbol group of transmission beam 703-1 for transmitting data of stream 2 in FIG. 7.

The #2 symbol group 902-2 of stream 2 in FIG. 9 is a symbol group of transmission beam 703-2 for transmitting data of stream 2 in FIG. 7.

The #3 symbol group 902-3 of stream 2 in FIG. 9 is a symbol group of transmission beam 703-3 for transmitting data of stream 2 in FIG. 7.

The #1 symbol group 901-1 of stream 1, #2 symbol group 901-2 of stream 1, #3 symbol group 901-3 of stream 1, #1 symbol group 902-1 of stream 2, #2 symbol group 902-2 of stream 2, and #3 symbol group 902-3 of stream 2 exist, for example, in time section 1.

As described above, #1 symbol group 901-1 of stream 1 and #2 symbol group 902-1 of stream 2 are transmitted using the same frequency (the same frequency band). The #2 symbol group 901-2 of stream 1 and #2 symbol group 902-2 of stream 2 are transmitted using the same frequency (the same frequency band). The #3 symbol group 901-3 of stream 1 and #3 symbol group 902-3 of stream 2 are transmitted using the same frequency (the same frequency band).

For example, in accordance with the procedure of FIG. 8, "data symbol group A of stream 1" and "data symbol group A of stream 2" are generated from the information. Then, "data symbol group A-1 of stream 1" composed of the same symbols as the symbols constituting "data symbol group A of stream 1" is prepared. A "data symbol group A-2 of stream 1" composed of the same symbols as the symbols constituting "data symbol group A of stream 1" is prepared. A "data symbol group A-3 of stream 1" composed of the same symbols as the symbols constituting "data symbol group A of stream 1" is prepared.

That is, the symbols constituting "data symbol group A-1 of stream 1," the symbols constituting "data symbol group A-2 of stream 1," and the symbols constituting "data symbol group A-3 of stream 1" are the same.

In this case, #1 symbol group 901-1 of stream 1 in FIG. 9 includes "data symbol group A-1 of stream 1." The #2 symbol group 901-2 of stream 1 in FIG. 9 includes "data symbol group A-2 of stream 1." The #3 symbol group 901-3 of stream 1 in FIG. 9 includes "data symbol group A-3 of stream 1." That is, #1 symbol group 901-1 of stream 1, #2 symbol group 901-2 of stream 1, and #3 symbol group 901-3 of stream 1 include the same data symbol group.

Further, "data symbol group A-1 of stream 2" composed of the same symbols as the symbols constituting "data symbol group A of stream 2" is prepared. A "data symbol group A-2 of stream 2" composed of the same symbols as the symbols constituting "data symbol group A of stream 2" is prepared. A "data symbol group A-3 of stream 2" composed of the same symbols as the symbols constituting "data symbol group A of stream 2" is prepared.

That is, the symbols constituting "data symbol group A-1 of stream 2," the symbols constituting "data symbol group A-2 of stream 2," and the symbols constituting "data symbol group A-3 of stream 2" are the same.

In this case, #1 symbol group 902-1 of stream 2 in FIG. 9 includes "data symbol group A-1 of stream 2," #2 symbol group 902-2 of stream 2 in FIG. 9 includes "data symbol group A-2 of stream 2," and #3 symbol group 902-3 of stream 2 in FIG. 9 includes "data symbol group A-3 of stream 2." That is, #1 symbol group 902-1 of stream 2, #2 symbol group 902-2 of stream 2, and #3 symbol group 902-3 of stream 2 include the same data symbol group.

Figure 10:
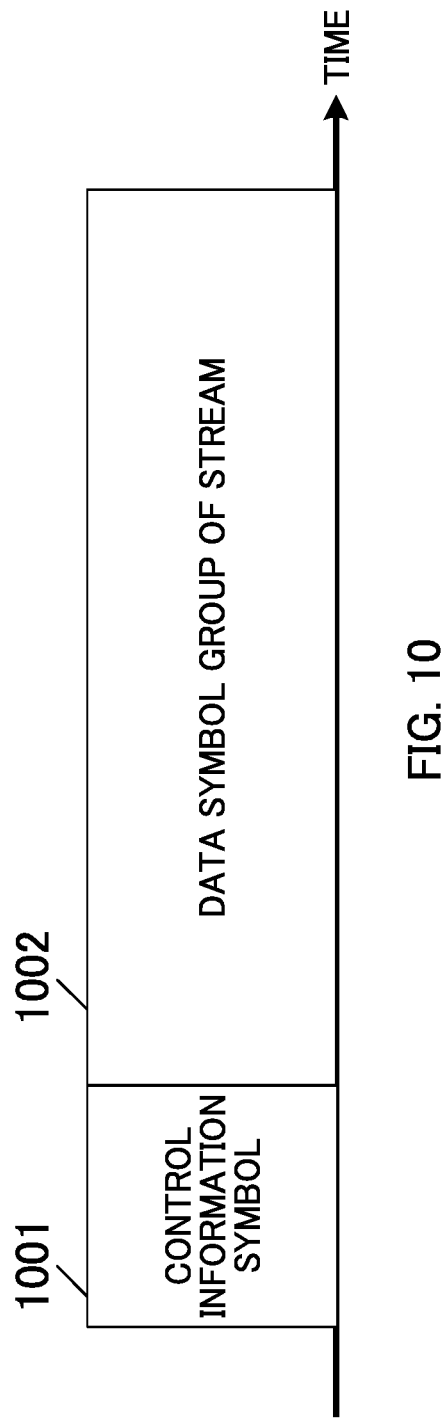
FIG. 10 illustrates an example of the frame configuration.

FIG. 10 illustrates an example of the frame configuration of "symbol group #Y of stream X" (X=1 or 2; Y=1, 2, or 3) described in FIG. 9. In FIG. 10, the horizontal axis indicates the time direction, and control information symbol 1001 and data symbol group 1002 of the stream are arranged in the time direction. In this case, data symbol group 1002 of the stream is symbols for transmitting "data symbol group A of stream 1" or "data symbol group A of stream 2" described with reference to FIG. 9.

Note that, a multi-carrier system such as an Orthogonal Frequency Division Multiplexing (OFDM) scheme may be used for the frame configuration in FIG. 10, and in this case, symbols may be present in the frequency-axis direction. In addition, each of the symbols may include a reference symbol for a reception apparatus to perform time and frequency synchronization, a reference symbol for the reception apparatus to detect a signal, a reference symbol for the reception apparatus to perform channel estimation, and/or the like. The frame configuration is not limited to that illustrated in FIG. 10, and control information symbol 1001 and data symbol group 1002 of a stream may also be arranged in any manner. Note that, the reference symbol may also be referred to as a preamble or a pilot symbol.

Next, the configuration of control information symbol 1001 will be described.

Figure 11:
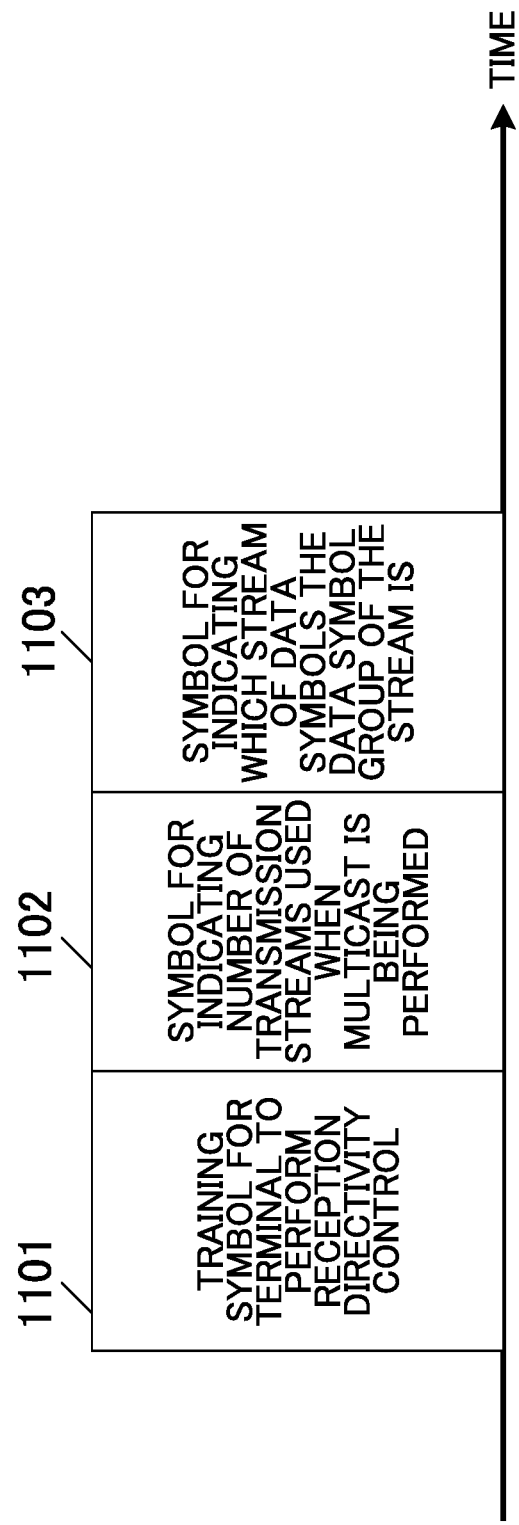
FIG. 11 illustrates an example of a symbol configuration.

FIG. 11 illustrates an example of a configuration of a symbol to be transmitted as the control information symbol in FIG. 10. In FIG. 11, the horizontal axis represents time. In FIG. 11, the terminal receives "training symbol 1101 for a terminal to perform reception directivity control" to determine a signal processing method for reception directivity control performed at "signal processor 405," "antennas 401-1 to 401-N," and/or "multipliers 603-1 to 603-L and processor 605."

The terminal receives "symbol 1102 for indicating the number of transmission streams used when multicast is being performed," so as to be able to know the number of streams to be obtained.

The terminal receives "symbol 1103 for indicating which stream of data symbols the data symbols of the stream is," so as to be able to know which one of the streams being transmitted by the base station has been successfully received.

An example of the above will be described.

A description will be given of such a case as illustrated in FIG. 7 where the base station transmits transmission beams of streams. Further, a description will be given of specific information of the control information symbol in #1 symbol group 901-1 of stream 1 in FIG. 9.

Since the base station transmits "stream 1" and "stream 2" in the case of FIG. 7, the information of "symbol 1102 for indicating the number of transmission streams used when multicast is being performed" is "2."

Further, since #1 symbol group 901-1 of stream 1 in FIG. 9 sends the data symbols of stream 1, the information of "symbol 1103 for indicating which stream of data symbols the data symbols of the stream is" is "stream 1."

A description will be given, for example, of a case where the terminal receives #1 symbol group 901-1 of stream 1 in FIG. 9. At this time, the terminal recognizes, from "symbol 1102 for indicating the number of transmission streams used when multicast is being performed," that the information "the number of transmission streams is 2" has been obtained, and, from "symbol 1103 for indicating which stream of data symbols the data symbol group is," that the information "data symbols of stream 1" has been obtained.

Then, since the terminal recognizes that "the number of transmission streams is 2" and the obtained data symbols are the "data symbols of stream 1," the terminal recognizes that "data symbols of stream 2" are to be obtained. Thus, the terminal can begin operation of searching for symbols of stream 2. For example, the terminal searches for the transmission beam of any of #1 symbol group 902-1 of stream 2, #2 symbol group 902-2 of stream 2, and #3 symbol group 902-3 of stream 2 in FIG. 9.

Then, the terminal obtains the transmission beam of any of #1 symbol group 902-1 of stream 2, #2 symbol group 902-2 of stream 2, and #3 symbol group 902-3 of stream 2, to obtain the data symbols of both the data symbols of stream 1 and the data symbols of stream 2.

As an effect of the present embodiment, the control information symbol configured as described above allows the terminal to accurately obtain data symbols.

As described above, in the multicast data transmission and the broadcast data transmission, the base station transmits data symbols using a plurality of transmission beams, and the terminal selectively receives a high-quality beam out of a plurality of transmission beams. The transmission directivity control and the reception directivity control are performed on the modulation signal transmitted by the base station, so that, as an effect of the present embodiment, it is possible to widen an area where high data reception quality is achieved.

Note that, although the terminal performs the reception directivity control in the above description, the aforementioned effects can be obtained even when the terminal does not perform the reception directivity control.

Note also that, the modulation scheme for "data symbol group 1002 of the stream" in FIG. 10 may be any modulation scheme. Note also that, the mapping method of the modulation scheme for "data symbol group 1002 of the stream" may be switched for each symbol. That is, the phase of a constellation may be switched for each symbol on the in-phase I-quadrature Q plane after mapping.

Figure 12:
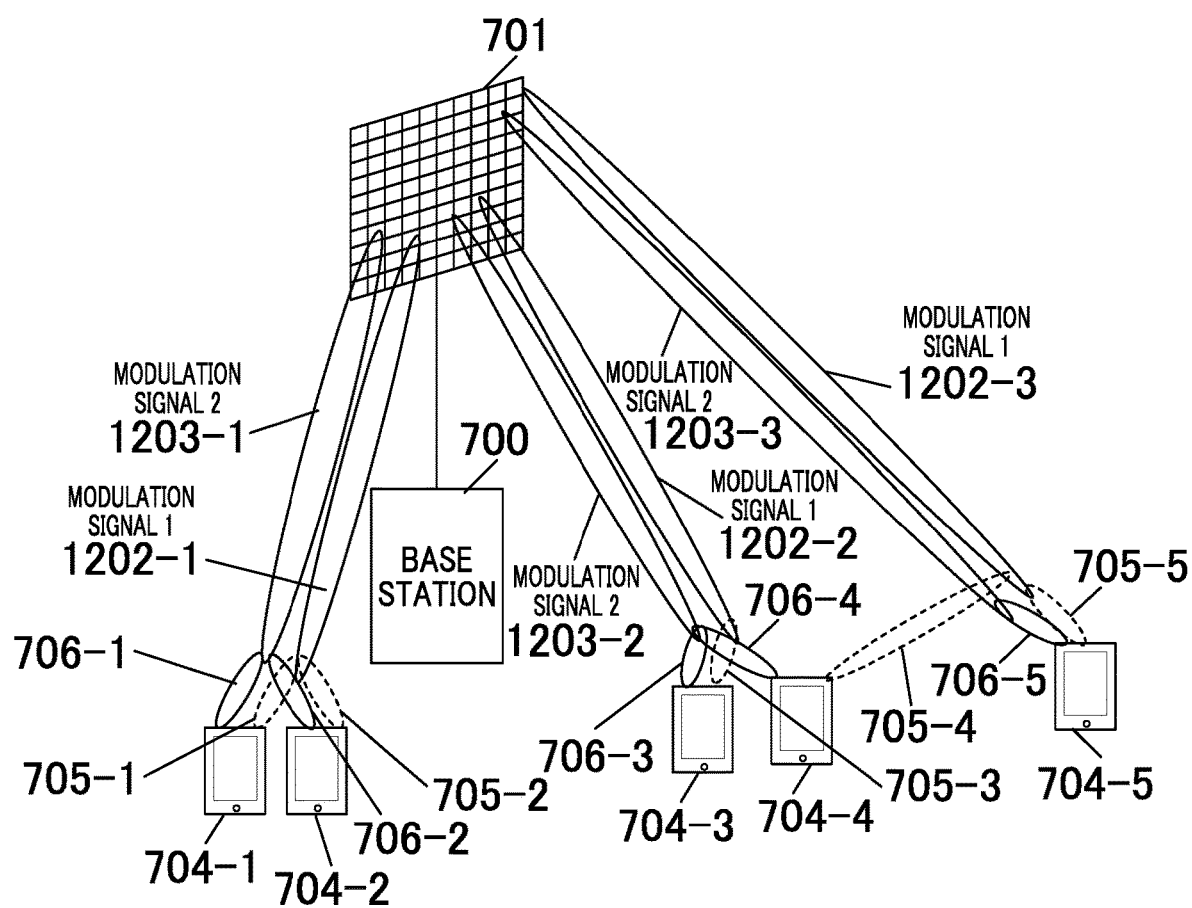
FIG. 12 illustrates an example of the communication state between the base station and the terminal.

FIG. 12 is an example of the communication state between the base station and the terminal, which is different from the example in FIG. 7. Note that, components in FIG. 12 that operate in the same manner as those in FIG. 7 are provided with the same reference numerals.

Base station 700 includes a plurality of antennas and transmits a plurality of transmission signals from transmission antenna 701. Base station 700 is configured, for example, as illustrated in FIG. 1 or 3 and performs, at signal processor 102 (and/or at weighting combiner 301), precoding (weighted combination) to perform transmission beamforming (directivity control).

FIG. 12 illustrates transmission beam 1202-1 for transmitting "modulation signal 1," transmission beam 1202-2 for transmitting "modulation signal 1," and transmission beam 1202-3 for transmitting "modulation signal 1." FIG. 12 also illustrates transmission beam 1203-1 for transmitting "modulation signal 2," transmission beam 1203-2 for transmitting "modulation signal 2," and transmission beam 1203-3 for transmitting "modulation signal 2."

While the number of transmission beams for transmitting "modulation signal 1" is 3 and the number of transmission beams for transmitting "modulation signal 2" is 3 in FIG. 12, the number of transmission beams is not limited thereto. That is, there only have to be a plurality of transmission beams for transmitting "modulation signal 1" and a plurality of transmission beams for transmitting "modulation signal 2." Note that, modulation signal 1 and modulation signal 2 will be described in detail later.

FIG. 12 includes terminals 704-1, 704-2, 704-3, 704-4, and 704-5. These terminals may be configured as illustrated in FIGS. 4 and 5, for example.

For example, terminal 704-1 performs reception directivity control at "signal processor 405," "antennas 401-1 to 401-N," and/or "multipliers 603-1 to 603-L and the processor 605" to form reception directivity 705-1 and reception directivity 706-1. Reception directivity 705-1 allows terminal 704-1 to receive and demodulate transmission beam 1202-1 for transmitting "modulation signal 1," and reception directivity 706-1 allows terminal 704-1 to receive and demodulate transmission beam 1203-1 for transmitting "modulation signal 2."

Similarly, terminal 704-2 performs the reception directivity control at "signal processor 405," "antennas 401-1 to 401-N," and/or "multipliers 603-1 to 603-L and the processor 605" to form reception directivity 705-2 and reception directivity 706-2. Reception directivity 705-2 allows terminal 704-2 to receive and demodulate transmission beam 1202-1 for transmitting "modulation signal 1," and reception directivity 706-2 allows terminal 704-2 to receive and demodulate transmission beam 1203-1 for transmitting "modulation signal 2."

Terminal 704-3 performs the reception directivity control at "signal processor 405," "antennas 401-1 to 401-N," and/or "multipliers 603-1 to 603-L and the processor 605" to form reception directivity 705-3 and reception directivity 706-3. Reception directivity 705-3 allows terminal 704-3 to receive and demodulate transmission beam 1202-2 for transmitting "modulation signal 1," and reception directivity 706-3 allows terminal 704-3 to receive and demodulate transmission beam 1203-2 for transmitting "modulation signal 2."

Terminal 704-4 performs the reception directivity control at "signal processor 405," "antennas 401-1 to 401-N," and/or "multipliers 603-1 to 603-L and the processor 605" to form reception directivity 705-4 and reception directivity 706-4. Reception directivity 705-4 allows terminal 704-4 to receive and demodulate transmission beam 1202-3 for transmitting "modulation signal 1," and reception directivity 706-4 allows terminal 704-4 to receive and demodulate transmission beam 1203-2 for transmitting "modulation signal 2."

Terminal 704-5 performs the reception directivity control at "signal processor 405," "antennas 401-1 to 401-N," and/or "multipliers 603-1 to 603-L and the processor 605" to form reception directivity 705-5 and reception directivity 706-5. Reception directivity 705-5 allows terminal 704-5 to receive and demodulate transmission beam 1202-3 for transmitting "modulation signal 1," and reception directivity 706-5 allows terminal 704-5 to receive and demodulate transmission beam 1203-3 for transmitting "modulation signal 2."

In FIG. 12, each of the terminals can obtain "modulation signal 1" with high quality by selecting, depending on its spatial position, at least one transmission beam of transmission beams 1202-1, 1202-2, and 1202-3 for transmitting "modulation signal 1" and by directing the reception directivity. Each of the terminals also can obtain "modulation signal 2" with high quality by selecting, depending on its spatial position, at least one transmission beam of transmission beams 1203-1, 1203-2, and 1203-3 for transmitting "modulation signal 2" and by directing the reception directivity.

Base station 700 transmits transmission beam 1202-1 for transmitting "modulation signal 1" and transmission beam 1203-1 for transmitting "modulation signal 2" using the same frequency (the same frequency band) and the same time. Base station 700 transmits transmission beam 1202-2 for transmitting "modulation signal 1" and transmission beam 1203-2 for transmitting "modulation signal 2" using the same frequency (the same frequency band) and the same time. Base station 700 transmits transmission beam 1202-3 for transmitting "modulation signal 1" and transmission beam 1203-3 for transmitting "modulation signal 2" using the same frequency (the same frequency band) and the same time.

Transmission beams 1202-1, 1202-2, and 1202-3 for transmitting "modulation signal 1" may be beams of the same frequency (the same frequency band) or may be beams of frequencies (frequency bands) different from one another. Transmission beams 1203-1, 1203-2, and 1203-3 for transmitting "modulation signal 2" may be beams of the same frequency (the same frequency band) or may be beams of frequencies (frequency bands) different from one another.

The operation of setter 158 of the base station illustrated in FIG. 1 or 3 for the above case will be described.

Configuration signal 160 is input to setter 158. Configuration signal 160 includes information indicating "whether to perform multicast transmission and/or to perform unicast transmission." When the base station performs transmission as illustrated in FIG. 12, configuration signal 160 provides input of the information "multicast transmission is to be performed" into setter 158.

Configuration signal 160 includes information indicating "the number of transmission modulation signals for multicasting." When the base station performs transmission as illustrated in FIG. 12, configuration signal 160 provides input of the information "the number of the transmission modulation signals is 2" into setter 158.

Configuration signal 160 may include information indicating "how many transmission beams are used to transmit each modulation signal." When the base station performs transmission as illustrated in FIG. 12, configuration signal 160 provides input of the information "the number of transmission beams for transmitting modulation signal 1 is 3 and the number of transmission beams for transmitting modulation signal 2 is 3" into setter 158.

The base station of FIG. 1 or 3 may transmit a control information symbol including information indicating whether data symbols are "multicast transmission and/or unicast transmission," information indicating "the number of transmission modulation signals for multicasting," and/or information indicating "how many transmission beams are used to transmit each modulation signal," and the like. It is thus possible for the terminal to perform suitable reception. Details of the configuration of the control information symbol will be described later.

Figure 13:
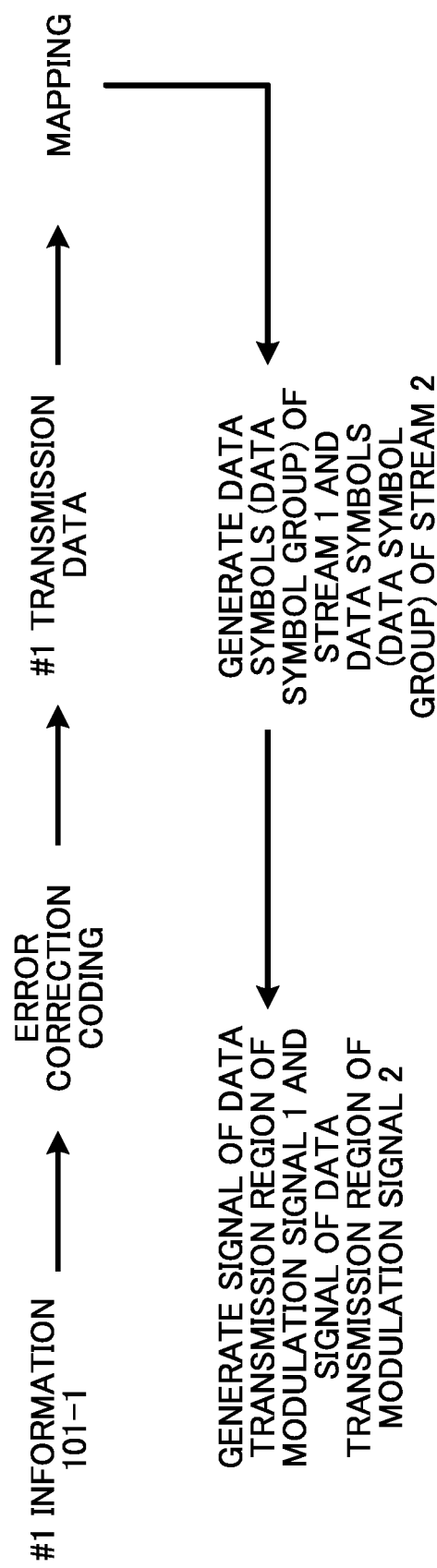
FIG. 13 illustrates the relationship between a plurality of modulation signals.

FIG. 13 explains the relationship between #i information 101-i in FIG. 1 or 3 and "modulation signal 1" and "modulation signal 2" described with reference to FIG. 12.

For example, processing such as error correction coding is performed on #1 information 101-1 to obtain data after the error correction coding. This data after the error correction coding is called "#1 transmission data." Then, mapping is performed on the #1 transmission data to obtain data symbols. Then, the data symbols are distributed to stream 1 and stream 2 to obtain data symbols (data symbol group) of stream 1 and data symbols (data symbol group) of stream 2. One of the data symbols of stream 1 having symbol number i is expressed as s1(i), and one of the data symbols of stream 2 having symbol number i is expressed as s2(i). In this case, "modulation signal 1" tx1(i) with symbol number i is expressed, for example, as follows.

$$tx1(i)=\alpha(i) \times s1(i)+\beta(i) \times s2(i) \quad \text{(Equation 3)}$$

In addition, "modulation signal 2" tx2(i) with symbol number i is expressed, for example, as follows.

$$tx2(i)=\gamma(i) \times s1(i)+\delta(i) \times s2(i) \quad \text{(Equation 4)}$$

Note that in Equations 3 and 4, α(i) is defined by a complex number and, thus, may be a real number. β(i) is defined by a complex number and, thus, may be a real number. γ(i) is defined by a complex number and, thus, may be a real number. δ(i) is defined by a complex number and, thus, may be a real number. In addition, α(i) does not have to be a function of symbol number i, and may be a fixed value, for example. β(i) does not have to be a function of symbol number i, and may be a fixed value, for example. γ(i) does not have to be a function of symbol number i, and may be a fixed value, for example. δ(i) does not have to be a function of symbol number i, and may be a fixed value, for example.

The "symbol group of modulation signal 1" including a "signal of a data transmission region of modulation signal 1" composed of data symbols is transmitted from the base station of FIG. 1 or 3. Further, the "symbol group of modulation signal 2" including a "signal of the data transmission region of modulation signal 2" composed of data symbols is transmitted from the base station of FIG. 1 or 3.

Note that, signal processing such as phase change and/or Cyclic Delay Diversity (CDD) may be performed on "modulation signal 1" and/or "modulation signal 2." However, the method for signal processing is not limited to this.

Figure 14:
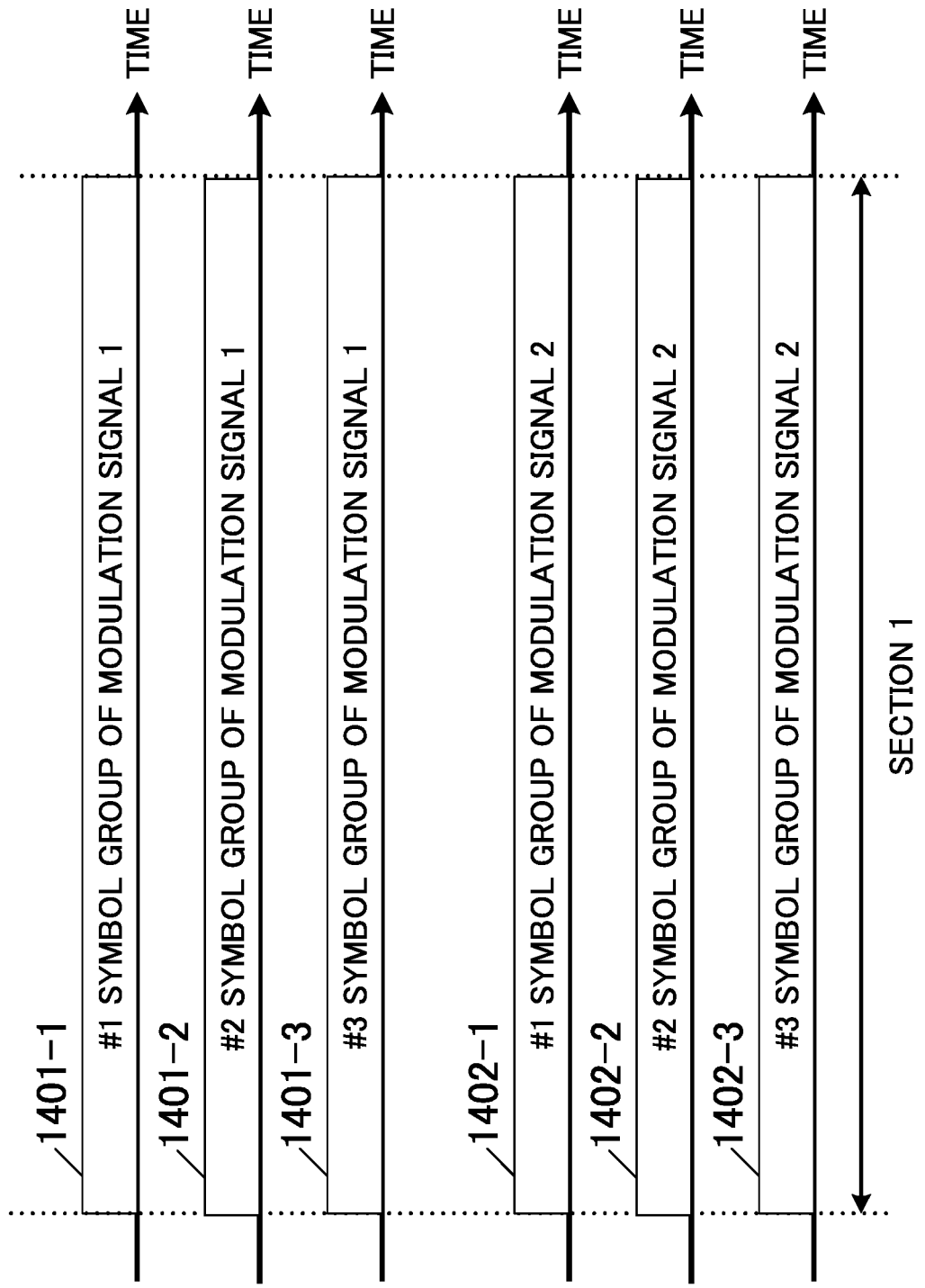
FIG. 14 illustrates an example of the frame configuration.

FIG. 14 illustrates an example of the frame configuration in which the horizontal axis represents time.

The #1 symbol group (1401-1) of modulation signal 1 in FIG. 14 is a symbol group of transmission beam 1202-1 for transmitting data of modulation signal 1 in FIG. 12.

The #2 symbol group (1401-2) of modulation signal 1 in FIG. 14 is a symbol group of transmission beam 1202-2 for transmitting data of modulation signal 1 in FIG. 12.

The #3 symbol group (1401-3) of modulation signal 1 in FIG. 14 is a symbol group of transmission beam 1202-3 for transmitting data of modulation signal 1 in FIG. 12.

The #1 symbol group (1402-1) of modulation signal 2 in FIG. 14 is a symbol group of transmission beam 1203-1 for transmitting the data of modulation signal 2 in FIG. 12.

The #2 symbol group (1402-2) of modulation signal 2 in FIG. 14 is a symbol group of transmission beam 1203-2 for transmitting the data of modulation signal 2 in FIG. 12.

The #3 symbol group (1402-3) of modulation signal 2 in FIG. 14 is a symbol group of transmission beam 1203-3 for transmitting the data of modulation signal 2 in FIG. 12.

The #1 symbol group (1401-1) of modulation signal 1, #2 symbol group (1401-2) of modulation signal 1, #3 symbol group (1401-3) of modulation signal 1, #1 symbol group (1402-1) of modulation signal 2, #2 symbol group (1402-2) of modulation signal 2, and #3 symbol group (1402-3) of modulation signal 2 exist, for example, in time section 1.

As described above, #1 symbol group (1401-1) of modulation signal 1 and #1 symbol group (1402-1) of modulation signal 2 are transmitted using the same frequency (the same frequency band). The #2 symbol group (1401-2) of modulation signal 1 and #2 symbol group (1402-2) of modulation signal 2 are transmitted using the same frequency (the same frequency band). The #3 symbol group (1401-3) of modulation signal 1 and #3 symbol group (1402-3) of modulation signal 2 are transmitted using the same frequency (the same frequency band).

For example, in accordance with the procedure of FIG. 13, "signals A of the data transmission region of modulation signal 1" and "signals A of the data transmission region of modulation signal 2" are generated from the information. Then, "signals A-1 of the data transmission region of modulation signal 1" composed of signals equivalent to those constituting "signals A of the data transmission region of modulation signal 1" are prepared. The "signals A-2 of the data transmission region of modulation signal 1" composed of signals equivalent to those constituting "signals A of the data transmission region of modulation signal 1" are prepared. The "signals A-3 of the data transmission region of modulation signal 1" composed of signals equivalent to those constituting "signals A of the data transmission region of modulation signal 1" are prepared.

That is, the signals constituting "signal group A-1 of the data transmission region of modulation signal 1," the signals constituting "signals A-2 of the data transmission region of modulation signal 1" and the signals constituting the "signals A-3 of the data transmission region of modulation signal 1" are the same.

In this case, #1 symbol group (1401-1) of modulation signal 1 of FIG. 14 includes "signals A-1 of the data transmission region of modulation signal 1." The #2 symbol group (1401-2) of modulation signal 1 of FIG. 14 includes "signals A-2 of the data transmission region of modulation signal 1." The #3 symbol group (1401-3) of modulation signal 1 of FIG. 14 includes "signals A-3 of the data transmission region of modulation signal 1." In other words, #1 symbol group (1401-1) of modulation signal 1, #2 symbol group (1401-2) of modulation signal 1, and #3 symbol group (1401-3) of modulation signal 1 include equivalent signals.

Further, "signals A-1 of the data transmission region of modulation signal 2" composed of signals equivalent to those constituting "signals A of the data transmission region of modulation signal 2" are prepared. The "signals A-2 of the data transmission region of modulation signal 2" composed of signals equivalent to those constituting "signals A of the data transmission region of modulation signal 2" are prepared. The "signals A-3 of the data transmission region of modulation signal 2" composed of signals equivalent to those constituting "signals A of the data transmission region of modulation signal 2" are prepared.

That is, the signals constituting "signals A-1 of the data transmission region of modulation signal 2," the signals constituting "signals A-2 of the data transmission region of modulation signal 2," and the signals constituting the "signals A-3 of the data transmission region of modulation signal 2" are the same.

In this case, #1 symbol group (1402-1) of modulation signal 2 in FIG. 14 includes "signals A-1 of the data transmission region of modulation signal 2." The #2 symbol group (1402-2) of stream 2 in FIG. 14 includes "signals A-2 in the data transmission region of modulation signal 2." The #3 symbol group (1402-3) of modulation signals 2 of FIG. 14 includes "signals A-3 of the data transmission region of modulation signal 2." In other words, #1 symbol group (1402-1) of modulation signal 2, #2 symbol group (1402-2) of modulation signal 2, and #3 symbol group (1402-3) of modulation signal 2 include equivalent signals.

Figure 15:
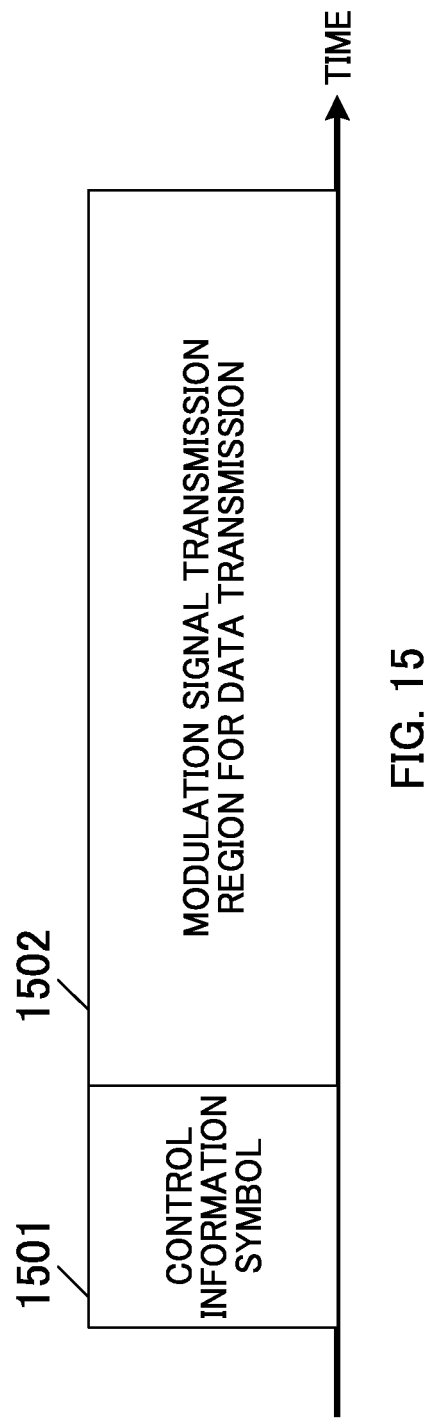
FIG. 15 illustrates an example of the frame configuration.

FIG. 15 illustrates an example of the frame configuration of "symbol group #Y of modulation signal X" (X=1 or 2; Y=1, 2, or 3) described in FIG. 14. In FIG. 15, the horizontal axis represents the time direction, and control information symbol 1501 and modulation signal transmission region 1502 for data transmission are arranged in the time axis direction. In this case, modulation signal transmission region 1502 for data transmission is a symbol for transmitting "signals A of the data transmission region of modulation signal 1" or "signals A of the data transmission region of modulation signal 2" described with reference to FIG. 14.

Note that, a multi-carrier system such as an Orthogonal Frequency Division Multiplexing (OFDM) scheme may be used for the frame configuration of FIG. 15, and in this case, symbols may be present in the frequency-axis direction. In addition, each of the symbols may include a reference symbol for a reception apparatus to perform time and frequency synchronization, a reference symbol for the reception apparatus to detect a signal, a reference symbol for the reception apparatus to perform channel estimation, and/ or the like. The frame configuration is not limited to that illustrated in FIG. 15, and control information symbol 1501 and modulation signal transmission region 1502 for data transmission may also be arranged in any manner. The reference symbol may also be referred to as a preamble or a pilot symbol.

Next, the configuration of control information symbol 1501 will be described.

Figure 16:
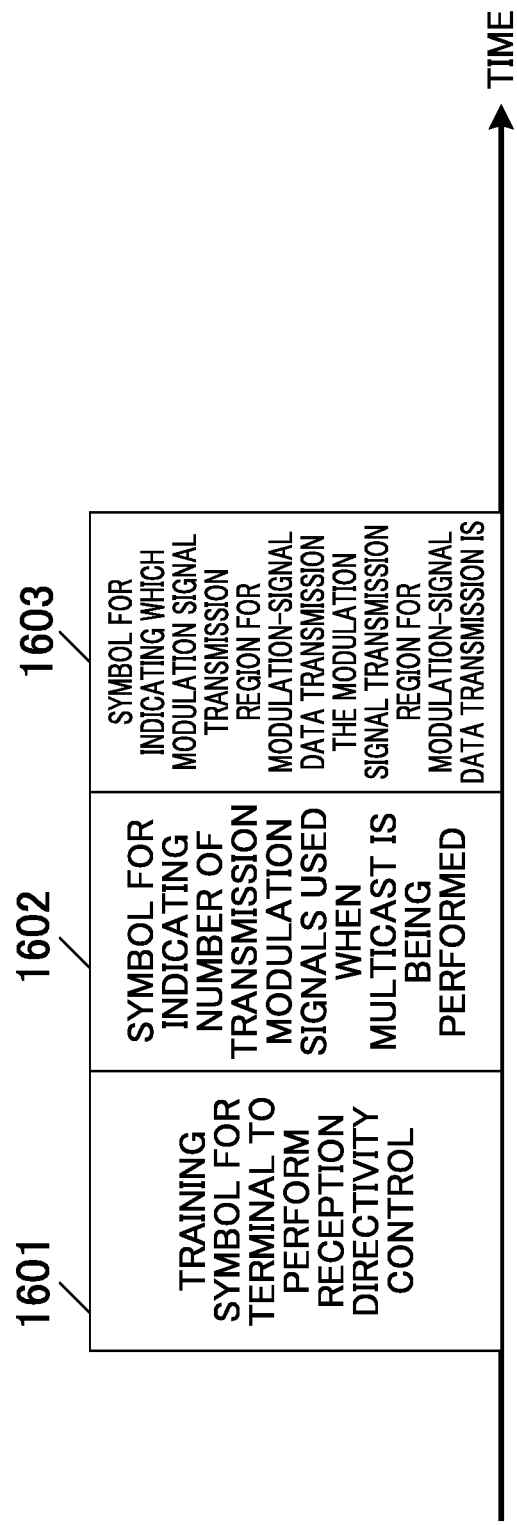
FIG. 16 illustrates an example of the symbol configuration.

FIG. 16 illustrates an example of a configuration of a symbol to be transmitted as the control information symbol in FIG. 15. In FIG. 16, the horizontal axis represents time. In FIG. 16, the terminal receives "training symbol 1601 for a terminal to perform reception directivity control" to determine a signal processing method for reception directivity control performed at "signal processor 405," "antennas 401-1 to 401-N," and/or "multipliers 603-1 to 603-L and processor 605."

The terminal receives "symbol 1602 for indicating the number of transmission modulation signals used when multicast is being performed," so as to be able to know the number of modulation signals to be obtained.

The terminal receives "symbol 1603 for indicating which modulation signal transmission region for modulation-signal data transmission the modulation signal transmission region for modulation-signal data transmission is," so as to be able to know which one of the modulation signals being transmitted by the base station has been successfully received.

An example of the above will be described.

The case where the base station transmits transmission beams of "modulation signals" as illustrated in FIG. 12 will be considered. Further, a description will be given of specific information of the control information symbol in #1 symbol group 1401-1 of modulation signal 1 in FIG. 14.

Since the base station transmits "modulation signal 1" and "modulation signal 2" in the case of FIG. 12, the information of "symbol 1602 for indicating the number of transmission modulation signals used when multicast is being performed" is "2."

Since #1 symbol group 1401-1 of modulation signal 1 in FIG. 14 sends the signal of the data transmission region of modulation signal 1, the information of "symbol 1603 for indicating which modulation signal transmission region for modulation-signal data transmission the modulation signal transmission region for modulation-signal data transmission is" is "modulation signal 1."

For example, a description will be given of the case where the terminal receives #1 symbol group 1401-1 of modulation signal 1 in FIG. 14. At this time, the terminal recognizes, from "symbol 1602 for indicating the number of transmission modulation signals used when multicast is being performed," that the information "the number of transmission modulation signals is 2" has been obtained, and, from "symbol 1603 for indicating which modulation signal transmission region for modulation-signal data transmission the modulation signal transmission region for modulation-signal data transmission is," that the information "modulation signal 1" has been obtained.

Then, since the terminal recognizes that "the number of transmission modulation signals is 2" and the obtained modulation signal is "modulation signal 1," the terminal recognizes that "modulation signal 2" is to be obtained. Thus, the terminal can begin operation of searching for "modulation signal 2." For example, the terminal searches for the transmission beam of any of "#1 symbol group 1402-1 of modulation signal 2," "#2 symbol group 1402-2 of modulation signal 2," and "#3 symbol group 1402-3 of modulation signal 2 in FIG. 14.

Then, the terminal obtains the transmission beam of any of "#1 symbol group 1402-1 of modulation signal 2," "#2 symbol group 1402-2 of modulation signal 2," and "#3 symbol group 1402-3 of modulation signal 2," to obtain both of "modulation signal 1" and "modulation signal 2." Thus, the terminal is capable of obtaining the data symbols of stream 1 and the data symbols of stream 2 with high quality.

As an effect of the present embodiment, the control information symbol configured as described above allows the terminal to accurately obtain data symbols.

As described above, in the multicast data transmission and the broadcast data transmission, the base station transmits data symbols using a plurality of transmission beams, and the terminal selectively receives a high-quality beam out of a plurality of transmission beams. The transmission directivity control and the reception directivity control are performed on the modulation signal transmitted by the base station, so that, as an effect of the present embodiment, it is possible to widen an area where high data reception quality is achieved.

Note that, although the terminal performs the reception directivity control in the above description, the aforementioned effects can be obtained even when the terminal does not perform the reception directivity control.

Note also that each of the terminals obtains both of the modulation signal of stream 1 and the modulation signal of stream 2 in FIG. 7, but the embodiment is not necessarily limited thereto. For example, there may be a terminal which intends to obtain the modulation signal of stream 1, a terminal which intends to obtain the modulation signal of stream 2, a terminal which intends to obtain both of the modulation signal of stream 1 and the modulation signal of stream 2. That is, the modulation signal that the terminal intends to obtain may be different in the embodiment.

Embodiment 2

Embodiment 1 has been described in relation to a method in which the base station transmits data symbols using a plurality of transmission beams in multicast data transmission and broadcast data transmission. The present embodiment as a variation of Embodiment 1 will be described in relation to a case where the base station performs multicast data transmission, broadcast data transmission, and unicast data transmission.

Figure 17:
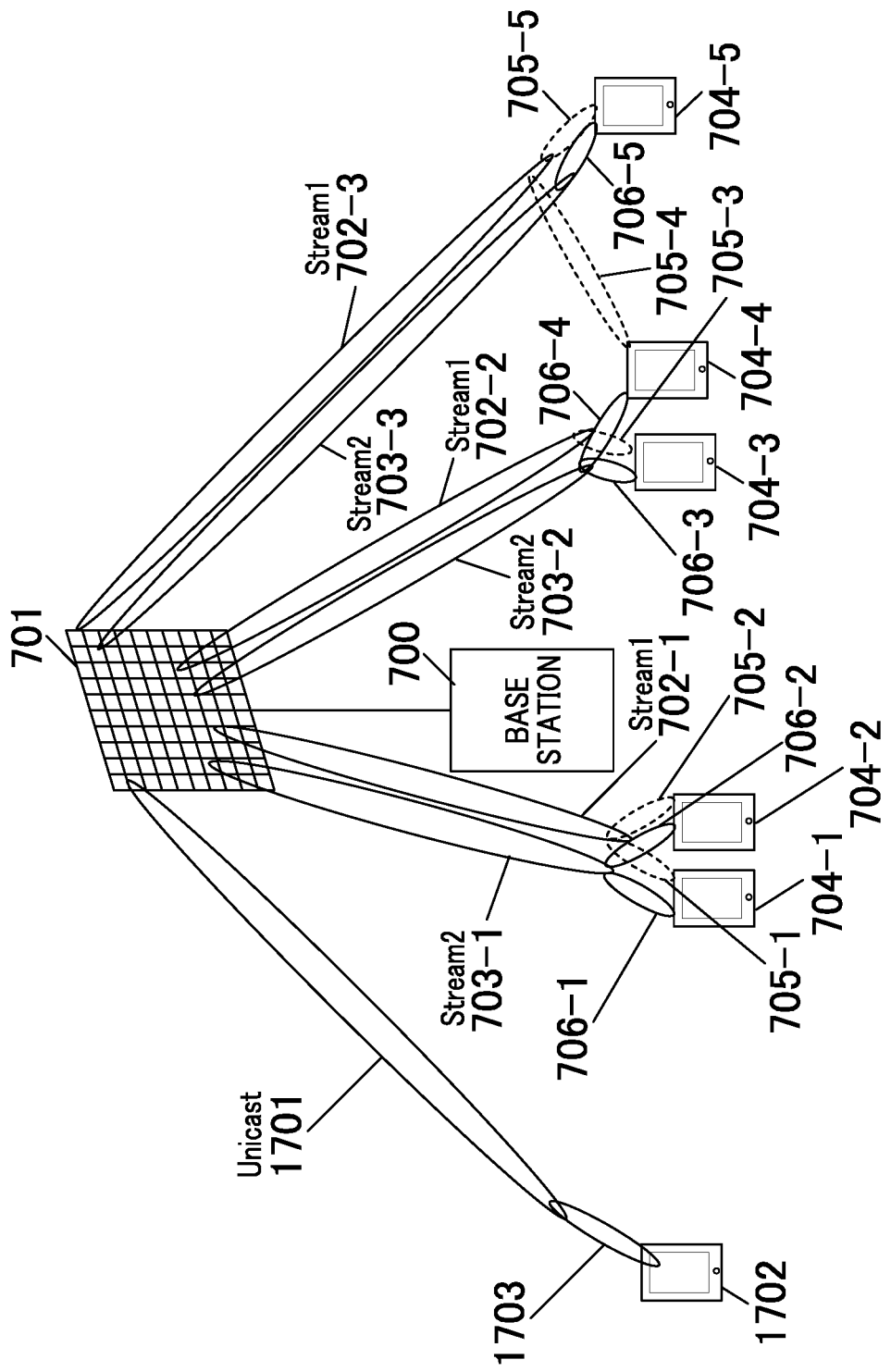
FIG. 17 illustrates an example of the communication state between the base station and the terminal.

FIG. 17 illustrates an example of a communication state between a base station (or access point or the like) and terminals. Components in FIG. 17 that operate in the same manner as those in FIG. 7 are provided with the same reference numerals, and the descriptions of those components are omitted below.

Base station 700 includes multiple antennas and transmits a plurality of transmission signals from transmission antenna 701. Base station 700 is configured, for example, as illustrated in FIG. 1 or 3 and performs, at signal processor 102 (and/or at weighting combiner 301), precoding (weighted combination) to perform transmission beamforming (directivity control) when transmitting a transmission signal.

Transmission beams 702-1, 702-2, 702-3, 703-1, 703-2, and 703-3 are as described with reference to FIG. 7 and, therefore, the descriptions thereof are omitted.

Terminals 704-1, 704-2, 704-3, 704-4, and 704-5 and reception directivities 705-1, 705-2, 705-3, 705-4, 705-5, 706-1, 706-2, 706-3, 706-4, and 706-5 are as described with reference to FIG. 7 and, therefore, the descriptions thereof are omitted.

In FIG. 17, the base station performs multicast as described in FIG. 7, and further, base station 700 and the terminal (e.g., 1702) perform unicast communication.

In addition to multicast transmission beams 702-1, 702-2, 702-3, 703-1, 703-2, and 703-3, base station 700 generates unicast transmission beam 1701 and transmits specific data to terminal 1702 in FIG. 17. Note that, FIG. 17 illustrates an example where base station 700 transmits one transmission beam 1701 to terminal 1702. However, the number of transmission beams is not limited to one. Base station 700 may transmit a plurality of transmission beams (or may transmit a plurality of modulation signals) to terminal 1702.

Terminal 1702 performs the reception directivity control at "signal processor 405," "antennas 401-1 to 401-N," and/or "multipliers 603-1 to 603-L and the processor 605" to form reception directivity 1703. Terminal 1702 can thus receive and demodulate transmission beam 1701.

In order to generate transmission beams including transmission beam 1701, the base station performs precoding (weighted combination) at signal processor 102 (and/or weighting combiner 301) configured, for example, as illustrated in FIG. 1 or 3.

When terminal 1702 transmits a modulation signal to base station 700, terminal 1702 performs precoding (or weighted combination) and transmits transmission beam 1703. Base station 700 performs reception directivity control to form reception directivity 1701. Base station 700 can thus receive and demodulate transmission beam 1703.

Base station 700 transmits transmission beam 702-1 for transmitting the data of stream 1 and transmission beam 703-1 for transmitting the data of stream 2 using the same frequency (the same frequency band) and the same time. Base station 700 transmits transmission beam 702-2 for transmitting the data of stream 1 and transmission beam 703-2 for transmitting the data of stream 2 using the same frequency (the same frequency band) and the same time. Base station 700 transmits transmission beam 702-3 for transmitting the data of stream 1 and transmission beam 703-3 for transmitting the data of stream 2 using the same frequency (the same frequency band) and the same time.

Note that, transmission beams 702-1, 702-2, and 702-3 for transmitting the data of stream 1 may be beams of the same frequency (the same frequency band), or may be beams of frequencies different from one another (frequency bands different from one another). Transmission beams 703-1, 703-2, and 703-3 for transmitting the data of stream 2 may be beams of the same frequency (the same frequency band), or may be beams of frequencies different from one another (frequency bands different from one another).

Transmission beam 1701 for unicast may be a beam of the same frequency (same frequency band) as transmission beams 702-1, 702-2, 702-3, 703-1, 703-2, and 703-3, or a beam of a frequency (frequency band) different from the frequency of transmission beams 702-1, 702-2, 702-3, 703-1, 703-2, and 703-3.

Note that, although the description of FIG. 17 has been given in which one terminal performs unicast communication, a plurality of terminals may perform unicast communication with the base station.

The operation of setter 158 in the configuration of the base station illustrated in FIG. 1 or 3 will be described.

Configuration signal 160 is input to setter 158. Configuration signal 160 includes information indicating "whether to perform multicast transmission and/or to perform unicast transmission." When the base station performs transmission as illustrated in FIG. 17, configuration signal 160 provides input of the information "both multicast transmission and unicast transmission are to be performed" into setter 158.

Configuration signal 160 includes information indicating "the number of transmission streams for multicasting." When the base station performs transmission as illustrated in FIG. 17, configuration signal 160 provides input of the information "the number of transmission streams is 2" into setter 158.

Configuration signal 160 may include information indicating "how many transmission beams are used to transmit each stream." When the base station performs transmission as illustrated in FIG. 17, configuration signal 160 provides input of the information "the number of transmission beams for transmitting stream 1 is 3 and the number of transmission beams for transmitting stream 2 is 3" into setter 158.

The base station of FIG. 1 or 3 may transmit a control information symbol including information indicating whether data symbols are "multicast transmission and/or unicast transmission," information indicating "the number of transmission streams for multicasting," and/or information indicating "how many transmission beams are used to transmit each stream," and the like. It is thus possible for the terminal to perform suitable reception.

The base station may transmit, to the terminal with which the base station performs the unicast communication, a training control information symbol for the base station to perform the directivity control and/or a training control information symbol for the terminal to perform the directivity control.

Figure 18:
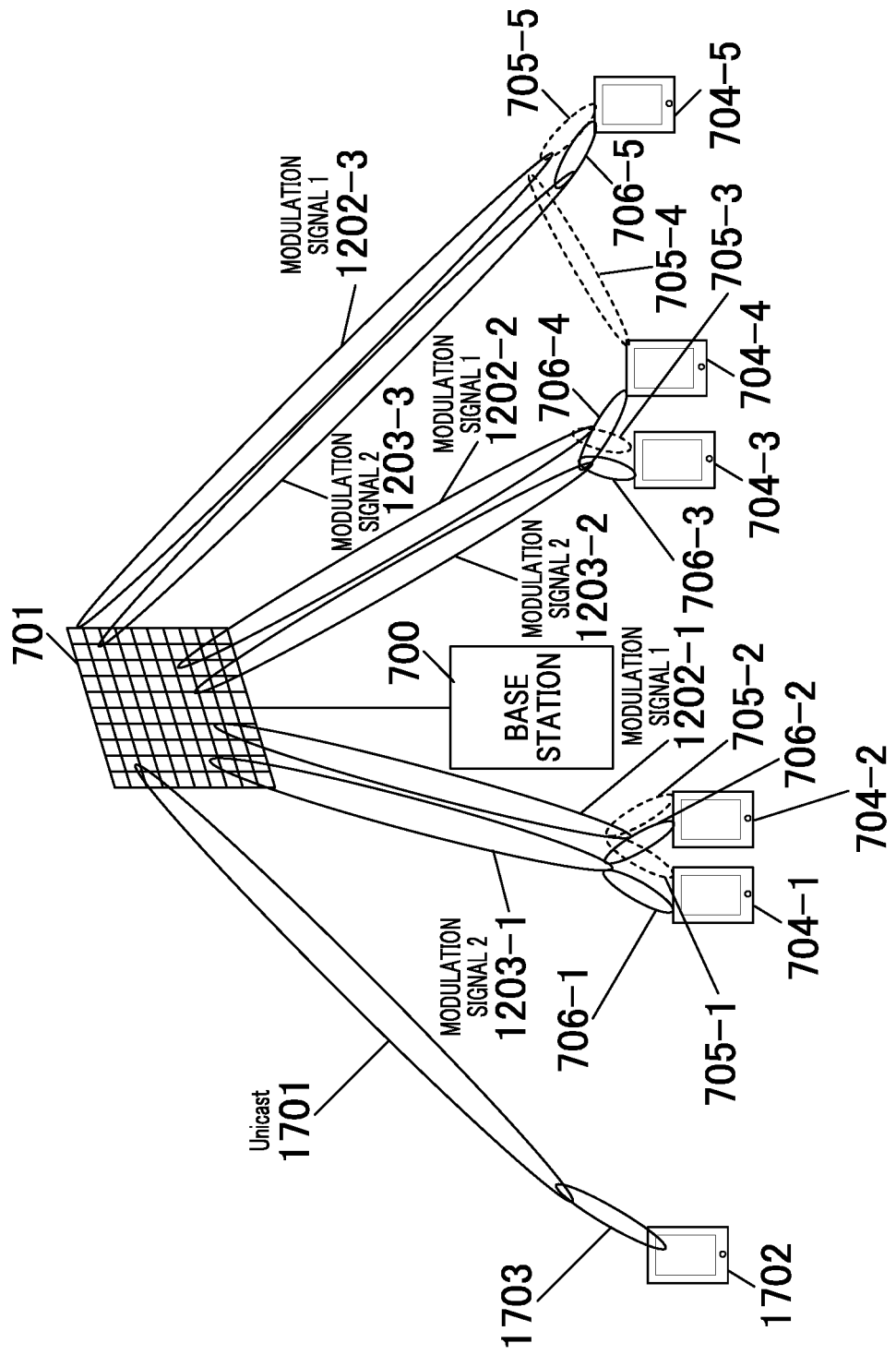
FIG. 18 illustrates an example of the communication state between the base station and the terminal.

FIG. 18 illustrates an example of a communication state between a base station (or access point or the like) and terminals. Components in FIG. 18 that operate in the same manner as those in FIG. 7 or 12 are provided with the same reference numerals, and the descriptions of those components are omitted below.

Base station 700 includes multiple antennas and transmits a plurality of transmission signals from transmission antenna 701. Base station 700 is configured, for example, as illustrated in FIG. 1 or 3 and performs, at signal processor 102 (and/or at weighting combiner 301), precoding (weighted combination) to perform transmission beamforming (directivity control) when transmitting a transmission signal.

Transmission beams 1202-1, 1202-2, 1202-3, 1203-1, 1203-2, and 1203-3 are as described with reference to FIG. 12 and, therefore, the descriptions thereof are omitted.

Terminals 704-1, 704-2, 704-3, 704-4, and 704-5 and reception directivities 705-1, 705-2, 705-3, 705-4, 705-5, 706-1, 706-2, 706-3, 706-4, and 706-5 are as described with reference to FIG. 12 and, therefore, the descriptions thereof are omitted.

In FIG. 18, the base station performs multicast as described in FIG. 12, and further, base station 700 and the terminal (e.g., 1702) perform unicast communication.

In addition to multicast transmission beams 1202-1, 1202-2, 1202-3, 1203-1, 1203-2, and 1203-3, base station 700 generates unicast transmission beams 1701 and transmits specific data to terminal 1702 in FIG. 18. Note that, FIG. 18 illustrates an example where base station 700 transmits one transmission beam 1701 to terminal 1702. However, the number of transmission beams is not limited to one. Base station 700 may transmit a plurality of transmission beams (or may transmit a plurality of modulation signals) to terminal 1702.

Terminal 1702 performs the reception directivity control at "signal processor 405," "antennas 401-1 to 401-N," and/or "multipliers 603-1 to 603-L and the processor 605" to form reception directivity 1703. Terminal 1702 can thus receive and demodulate transmission beam 1701.

In order to generate transmission beams including transmission beam 1701, the base station performs precoding (weighted combination) at signal processor 102 (and/or weighting combiner 301) configured, for example, as illustrated in FIG. 1 or 3.

When terminal 1702 transmits a modulation signal to base station 700, terminal 1702 performs precoding (or weighted combination) and transmits transmission beam 1701. Base station 700 performs reception directivity control to form reception directivity 1703. Base station 700 can thus receive and demodulate transmission beam 1701.

Base station 700 transmits transmission beam 1202-1 for transmitting "modulation signal 1" and transmission beam 1203-1 for transmitting "modulation signal 2" using the same frequency (the same frequency band) and the same time. Base station 700 transmits transmission beam 1202-2 for transmitting "modulation signal 1" and transmission beam 1203-2 for transmitting "modulation signal 2" using the same frequency (the same frequency band) and the same time. Base station 700 transmits transmission beam 1202-3 for transmitting "modulation signal 1" and transmission beam 1203-3 for transmitting "modulation signal 2" using the same frequency (the same frequency band) and the same time.

Note that, transmission beams 1202-1, 1202-2, and 1202-3 for transmitting "modulation signal 1" may be beams of the same frequency (the same frequency band) or may be beams of frequencies (frequency bands) different from one another. Transmission beams 1203-1, 1203-2, and 1203-3 for transmitting "modulation signal 2" may be beams of the same frequency (the same frequency band) or may be beams of frequencies (frequency bands) different from one another.

Unicast transmission beam 1701 may be a beam of the same frequency (same frequency band) as transmission beams 1202-1, 1202-2, 1202-3, 1203-1, 1203-2, and 1203-3, or a beam of a frequency (frequency band) different from the frequency of transmission beams 1202-1, 1202-2, 1202-3, 1203-1, 1203-2, and 1203-3.

Note that, although the description of FIG. 18 has been given in which one terminal performs unicast communication, a plurality of terminals may perform unicast communication with the base station.

The operation of setter 158 of the base station illustrated in FIG. 1 or 3 for the above case will be described.

Configuration signal 160 is input to setter 158. Configuration signal 160 includes information indicating "whether to perform multicast transmission and/or to perform unicast transmission." When the base station performs transmission as illustrated in FIG. 18, configuration signal 160 provides input of the information "both multicast transmission and unicast transmission are to be performed" into setter 158.

Configuration signal 160 includes information indicating "the number of transmission streams for multicasting." When the base station performs transmission as illustrated in FIG. 18, configuration signal 160 provides input of the information "the number of transmission streams is 2" into setter 158.

Configuration signal 160 may include information indicating "how many transmission beams are used to transmit each stream." When the base station performs transmission as illustrated in FIG. 18, configuration signal 160 provides input of the information "the number of transmission beams for transmitting stream 1 is 3 and the number of transmission beams for transmitting stream 2 is 3" into setter 158.

The base station of FIG. 1 or 3 may transmit a control information symbol including information indicating whether data symbols are "multicast transmission and/or unicast transmission," information indicating "the number of transmission streams for multicasting," and/or information indicating "how many transmission beams are used to transmit each stream," and the like. It is thus possible for the terminal to perform suitable reception.

The base station may transmit, to the terminal with which the base station performs the unicast communication, a training control information symbol for the base station to perform the directivity control and/or a training control information symbol for the terminal to perform the directivity control.

Next, as a variation of Embodiment 1, a case in which the base station transmits a plurality of multicast data transmissions will be described.

Figure 19:
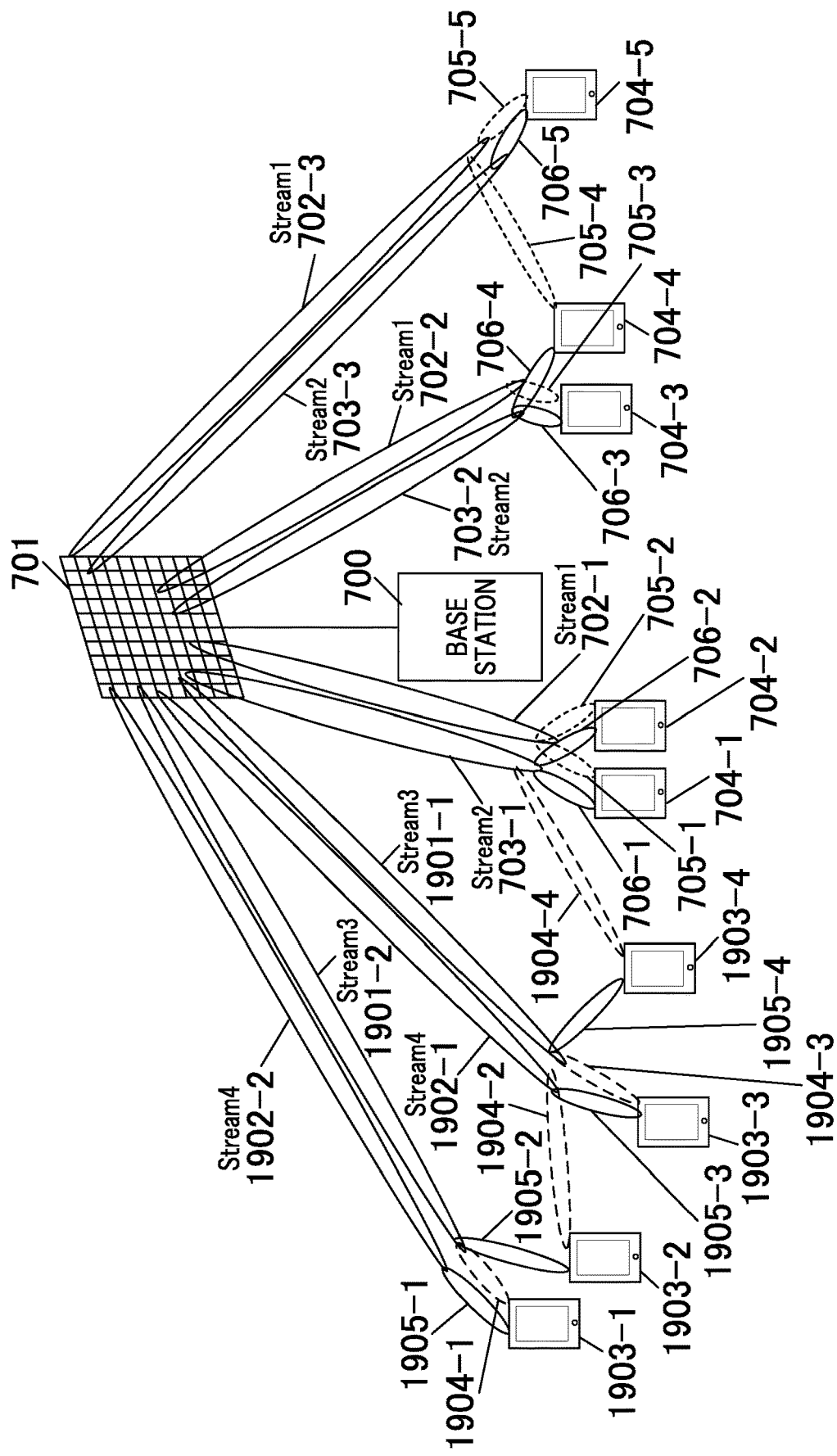
FIG. 19 illustrates an example of the communication state between the base station and the terminal.

FIG. 19 illustrates an example of a communication state between a base station (or access point or the like) and terminals. Components in FIG. 19 that operate in the same manner as those in FIG. 7 are provided with the same reference numerals, and the descriptions of those components are omitted below.

Base station 700 includes multiple antennas and transmits a plurality of transmission signals from transmission antenna 701. Base station 700 is configured, for example, as illustrated in FIG. 1 or 3 and performs, at signal processor 102 (and/or at weighting combiner 301), precoding (weighted combination) to perform transmission beamforming (directivity control) when transmitting a transmission signal.

Transmission beams 702-1, 702-2, 702-3, 703-1, 703-2, and 703-3 are as described with reference to FIG. 7 and, therefore, the descriptions thereof are omitted.

Terminals 704-1, 704-2, 704-3, 704-4, and 704-5 and reception directivities 705-1, 705-2, 705-3, 705-4, 705-5, 706-1, 706-2, 706-3, 706-4, and 706-5 are as described with reference to FIG. 7 and, therefore, the descriptions thereof are omitted.

Base station 700 transmits transmission beams 1901-1, 1901-2, 1902-1, and 1902-2 in addition to transmission beams 702-1, 702-2, 702-3, 703-1, 703-2, and 703-3.

Transmission beam 1901-1 is a transmission beam for transmitting data of stream 3. Transmission beam 1901-2 is also a transmission beam for transmitting the data in stream 3. Transmission beam 1902-1 is a transmission beam for transmitting data of stream 4. Transmission beam 1902-2 is also a transmission beam for transmitting the data of stream 4.

Terminals 704-1, 704-2, 704-3, 704-4, 704-5, 1903-1, 1903-2, and 1903-3 are configured, for example, as illustrated in FIGS. 4 and 5. Note that, the operations of terminals 704-1, 704-2, 704-3, 704-4, and 704-5 are as described with reference to FIG. 7.

Terminal 1903-1 performs reception directivity control at "signal processor 405," "antennas 401-1 to 401-N," and/or "multipliers 603-1 to 603-L and processor 605" to form reception directivity 1904-1 and reception directivity 1905-1. Reception directivity 1904-1 allows terminal 1903-1 to receive and demodulate transmission beam 1901-2 for transmitting the data of stream 3, and reception directivity 1905-1 allows terminal 1903-1 to receive and demodulate transmission beam 1902-2 for transmitting the data of stream 4.

Terminal 1903-2 performs the reception directivity control at "signal processor 405," "antennas 401-1 to 401-N," and/or "multipliers 603-1 to 603-L and processor 605" to form reception directivity 1904-2 and reception directivity 1905-2. Reception directivity 1904-2 allows terminal 1903-2 to receive and demodulate transmission beam 1902-1 for transmitting the data of stream 4, and reception directivity 1905-2 allows terminal 1903-2 to receive and demodulate transmission beam 1901-2 for transmitting the data of stream 3.

Terminal 1903-3 performs the reception directivity control at "signal processor 405," "antennas 401-1 to 401-N," and/or "multipliers 603-1 to 603-L and processor 605" to form reception directivity 1904-3 and reception directivity 1905-3. Reception directivity 1904-3 allows terminal 1903-3 to receive and demodulate transmission beam 1901-1 for transmitting the data of stream 3, and reception directivity 1905-3 allows terminal 1903-3 to receive and demodulate transmission beam 1902-1 for transmitting the data of stream 4.

Terminal 1903-4 performs the reception directivity control at "signal processor 405," "antennas 401-1 to 401-N," and/or "multipliers 603-1 to 603-L and processor 605" to form reception directivity 1904-4 and reception directivity 1905-4. Reception directivity 1904-4 allows terminal 1903-4 to receive and demodulate transmission beam 703-1 for transmitting the data of stream 2, and reception directivity 1905-4 allows terminal 1903-4 to receive and demodulate transmission beam 1901-1 for transmitting the data of stream 3.

In FIG. 19, the base station transmits a plurality of streams including multicast data. Further, each of the streams is transmitted by a plurality of transmission beams. Each of the terminals selectively receives a transmission beam of one or more streams among the plurality of streams.

Base station 700 transmits transmission beam 702-1 for transmitting the data of stream 1 and transmission beam 703-1 for transmitting the data of stream 2 using the same frequency (the same frequency band) and the same time. Base station 700 transmits transmission beam 702-2 for transmitting the data of stream 1 and transmission beam 703-2 for transmitting the data of stream 2 using the same frequency (the same frequency band) and the same time. Base station 700 transmits transmission beam 702-3 for transmitting the data of stream 1 and transmission beam 703-3 for transmitting the data of stream 2 using the same frequency (the same frequency band) and the same time.

Base station 700 transmits transmission beam 1901-1 for transmitting the data of stream 3 and transmission beam 1902-1 for transmitting the data of stream 4 using the same frequency (the same frequency band) and the same time. Base station 700 transmits transmission beams 1901-2 for transmitting the data of stream 3 and transmission beams 1902-2 for transmitting the data of stream 4 using the same frequency (the same frequency band) and the same time.

Note that, transmission beams 702-1, 702-2, and 702-3 for transmitting the data of stream 1 may be beams of the same frequency (the same frequency band), or may be beams of frequencies different from one another (frequency bands different from one another). Transmission beams 703-1, 703-2, and 703-3 for transmitting the data of stream 2 may be beams of the same frequency (the same frequency band), or may be beams of frequencies different from one another (frequency bands different from one another).

Transmission beams 1901-1 and 1901-2 for transmitting the data of stream 3 may be beams of the same frequency (the same frequency band) or beams of frequencies (frequency bands) different from each other. Transmission beams 1902-1 and 1902-2 for transmitting the data of stream 4 may be beams of the same frequency (the same frequency band) or beams of frequencies (frequency bands) different from each other.

Further, the data symbols of stream 1 and the data symbols of stream 2 may be generated from #1 information 101-1 in FIG. 1, and the data symbols of stream 3 and the data symbols of stream 4 may be generated from #2 information 101-2. Alternatively, the data symbols may be generated after error correction coding is performed on #1 information 101-1 and #2 information 101-2.

Further, the data symbols of stream 1 may be generated from #1 information 101-1 in FIG. 1, the data symbols of stream 2 may be generated from #2 information 101-2 in FIG. 1, the data symbols of stream 3 may be generated from #3 information 101-3 in FIG. 1, and the data symbols of stream 4 may be generated from #4 information 101-4 in FIG. 1. Note that, the data symbols may be generated after error correction coding is performed on #1 information 101-1, #2 information 101-2, #3 information 101-3, and #4 information 101-4.

That is, the data symbols of each of the streams may be generated from any information in FIG. 1. Thus, as an effect of the present embodiment, the terminal can selectively obtain a multicast stream.

The operation of setter 158 of the base station illustrated in FIG. 1 or 3 for the above case will be described.

Configuration signal 160 is input to setter 158. Configuration signal 160 includes information indicating "whether to perform multicast transmission and/or to perform unicast transmission." When the base station performs transmission as illustrated in FIG. 19, configuration signal 160 provides input of the information "multicast transmission is to be performed" into setter 158.

Configuration signal 160 includes information indicating "the number of transmission streams for multicasting." When the base station performs transmission as illustrated in FIG. 19, information "the number of transmission streams is 4" is input to setter 158 by configuration signal 160.

Configuration signal 160 may include information indicating "how many transmission beams are used to transmit each stream." When the base station performs transmission as illustrated in FIG. 19, configuration signal 160 provides input of the information "the number of transmission beams for transmitting stream 1 is 3, the number of transmission beams for transmitting stream 2 is 3, the number of transmission beams for transmitting stream 3 is 2, and the number of transmission beams for transmitting stream 4 is 2" into setter 158.

The base station of FIG. 1 or 3 may transmit a control information symbol including information indicating whether data symbols are "multicast transmission and/or unicast transmission," information indicating "the number of transmission streams for multicasting," and/or information indicating "how many transmission beams are used to transmit each stream," and the like. It is thus possible for the terminal to perform suitable reception.

Next, as a variation of Embodiment 1, a case in which the base station transmits a plurality of multicast data transmissions will be described.

Figure 20:
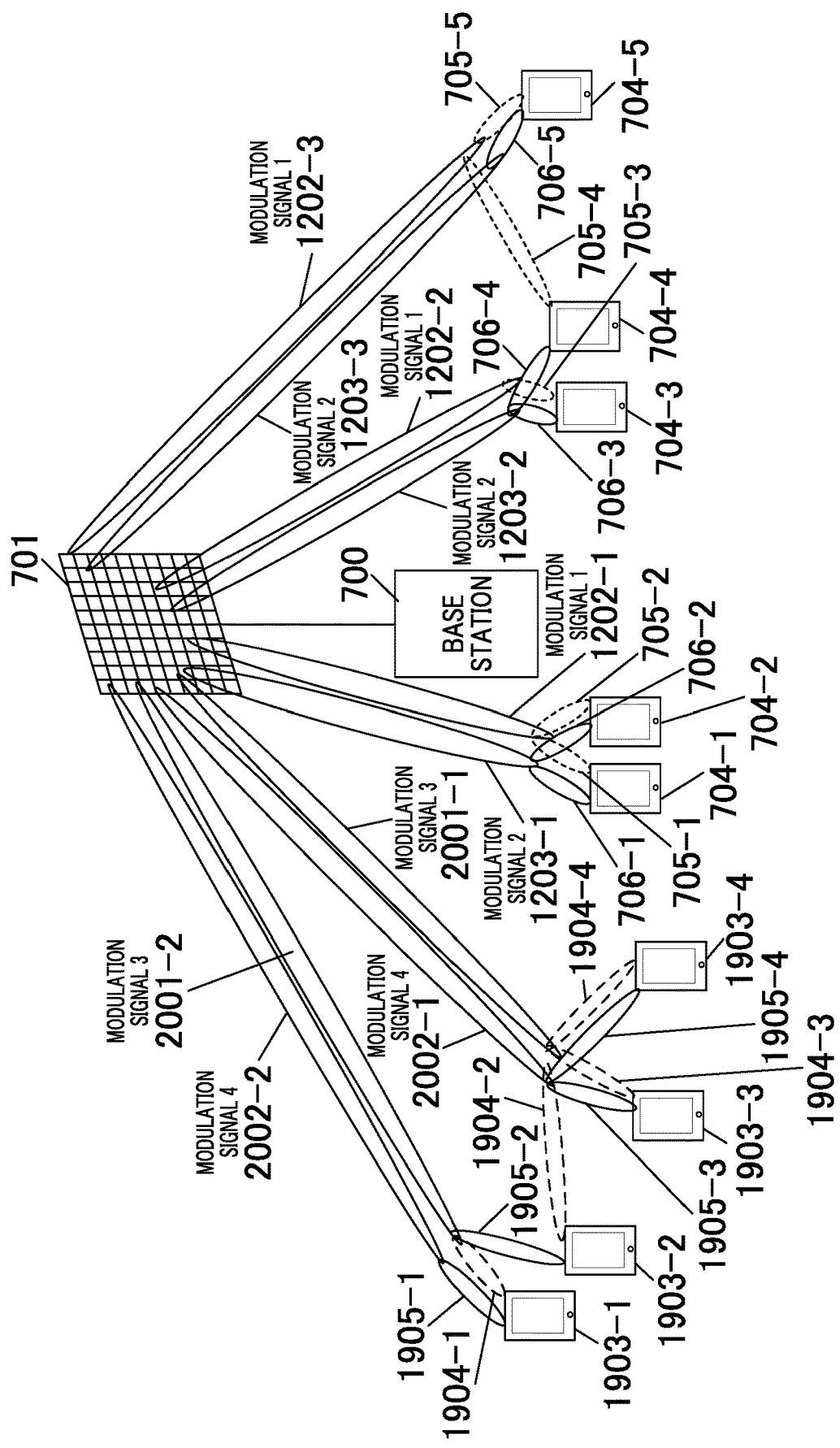
FIG. 20 illustrates an example of the communication state between the base station and the terminal.

FIG. 20 illustrates an example of a communication state between a base station (or an access point or the like) and terminals. Components in FIG. 20 that operate in the same manner as those in FIG. 7, 12, or 19 are provided with the same reference numerals, and the descriptions of those components are omitted below.

Base station 700 includes multiple antennas and transmits a plurality of transmission signals from transmission antenna 701. Base station 700 is configured, for example, as illustrated in FIG. 1 or 3 and performs, at signal processor 102 (and/or at weighting combiner 301), precoding (weighted combination) to perform transmission beamforming (directivity control) when transmitting a transmission signal.

Transmission beams 1202-1, 1202-2, 1202-3, 1203-1, 1203-2, and 1203-3 are as described with reference to FIG. 12 and, therefore, the descriptions thereof are omitted.

Terminals 704-1, 704-2, 704-3, 704-4, and 704-5 and reception directivities 705-1, 705-2, 705-3, 705-4, 705-5, 706-1, 706-2, 706-3, 706-4, and 706-5 are as described with reference to FIG. 12 and, therefore, the descriptions thereof are omitted.

Base station 700 transmits transmission beams 2001-1, 2001-2, 2002-1, and 2002-2 in addition to transmission beams 1202-1, 1202-2, 1202-3, 1203-1, 1203-2, and 1203-3.

Transmission beam 2001-1 is a transmission beam for transmitting "modulation signal 3." Transmission beam 2001-2 is also a transmission beam for transmitting "modulation signal 3."

Transmission beam 2002-1 is a transmission beam for transmitting "modulation signal 4." Transmission beam 2002-2 is also a transmission beam for transmitting "modulation signal 4."

Terminals 704-1, 704-2, 704-3, 704-4, 704-5, 1903-1, 1903-2, and 1903-3 have, for example, the same configurations as in FIGS. 4 and 5. Note that, the operations of terminals 704-1, 704-2, 704-3, 704-4, and 704-5 are the same as those described with reference to FIG. 7.

Terminal 1903-1 performs directivity control for reception by "signal processor 405," "antenna 401-1 to antenna 401-N," and/or "multiplier 603-1 to multiplier 603-L, and processor 605," to form reception directivity 1904-1 and reception directivity 1905-1. Reception directivity 1904-1 allows terminal 1903-1 to receive and demodulate transmission beam 2001-2 for transmitting "modulation signal 3," and reception directivity 1905-1 allows terminal 1903-1 to receive and demodulate transmission beam 2002-2 for transmitting "modulation signal 4."

Terminal 1903-2 performs directivity control for reception by "signal processor 405," "antenna 401-1 to antenna 401-N," and/or "multiplier 603-1 to multiplier 603-L, and processor 605," to form reception directivity 1904-2 and reception directivity 1905-2.

Reception directivity 1904-2 allows terminal 1903-2 to receive and demodulate transmission beam 2002-1 for transmitting "modulation signal 4," and reception directivity 1905-2 allows terminal 1903-2 to receive and demodulate transmission beam 2001-2 for transmitting "modulation signal 3."

Terminal 1903-3 performs directivity control for reception by "signal processor 405," "antenna 401-1 to antenna 401-N," and/or "multiplier 603-1 to multiplier 603-L, and processor 605," to form reception directivity 1904-3 and reception directivity 1905-3. Reception directivity 1904-3 allows terminal 1903-3 to receive and demodulate transmission beam 2001-1 for transmitting "modulation signal 3," and reception directivity 1905-3 allows terminal 1903-3 to receive and demodulate transmission beam 2002-1 for transmitting "modulation signal 4."

Terminal 1903-4 performs directivity control for reception by "signal processor 405," "antenna 401-1 to antenna 401-N," and/or "multiplier 603-1 to multiplier 603-L, and processor 605," to form reception directivity 1904-4 and reception directivity 1905-4. Reception directivity 1904-4 allows terminal 1903-4 to receive and demodulate transmission beam 2001-1 for transmitting "modulation signal 3," and reception directivity 1905-4 allows terminal 1903-4 to receive and demodulate transmission beam 2002-1 for transmitting "modulation signal 4."

In FIG. 20, the base station transmits a plurality of modulation signals including multicast data. Each of the modulation signals is transmitted by a plurality of transmission beams. Each of the terminals selectively receives a transmission beam of one or more streams among the plurality of modulation signals.

Base station 700 transmits transmission beam 1202-1 for transmitting "modulation signal 1" and transmission beam 1203-1 for transmitting "modulation signal 2" using the same frequency (the same frequency band) and the same time. Base station 700 transmits transmission beam 1202-2 for transmitting "modulation signal 1" and transmission beam 1203-2 for transmitting "modulation signal 2" using the same frequency (the same frequency band) and the same time. Base station 700 transmits transmission beam 1202-3 for transmitting "modulation signal 1" and transmission beam 1203-3 for transmitting "modulation signal 2" using the same frequency (the same frequency band) and the same time.

Base station 700 transmits transmission beam 2001-1 for transmitting "modulation signal 3" and transmission beam 2002-1 for transmitting "modulation signal 4" using the same frequency (the same frequency band) and the same time. Base station 700 transmits transmission beam 2001-2 for transmitting "modulation signal 3" and transmission beam 2002-2 for transmitting "modulation signal 4" using the same frequency (the same frequency band) and the same time.

Note that, transmission beams 702-1, 702-2, and 702-3 for transmitting the data of stream 1 may be beams of the same frequency (the same frequency band), or may be beams of frequencies (frequency bands) different from one another. Transmission beams 703-1, 703-2, and 703-3 for transmitting the data of stream 2 may be beams of the same frequency (the same frequency band), or may be beams of frequencies (frequency bands) different from one another.

Transmission beams 2001-1 and 2001-2 for transmitting "modulation signal 3" may be beams of the same frequency (the same frequency band), or may be beams of frequencies (frequency bands) different from one another. Transmission beams 2002-1 and 2002-2 for transmitting "modulation signal 4" may be beams of the same frequency (the same frequency band), or may be beams of frequencies (frequency bands) different from one another.

The operation of setter 158 in the configuration of the base station illustrated in FIG. 1 or 3 will be described.

Configuration signal 160 is input to setter 158. Configuration signal 160 includes information indicating "whether to perform multicast transmission and/or to perform unicast transmission." When the base station performs transmission as illustrated in FIG. 19, configuration signal 160 provides input of the information "multicast transmission is to be performed" into setter 158.

Configuration signal 160 includes information indicating "the number of transmission modulation signals for multicasting." When the base station performs the transmission illustrated in FIG. 20, configuration signal 160 provides input of the information "the number of transmission modulation signals is 4" into setter 158.

Configuration signal 160 may include information indicating "how many transmission beams are used to transmit each modulation signal." When the base station performs transmission as illustrated in FIG. 20, configuration signal 160 provides input of the information "the number of transmission beams for transmitting modulation signal 1 is 3, the number of transmission beams for transmitting modulation signal 2 is 3, the number of transmission beams for transmitting modulation signal 3 is 2, and the number of transmission beams for transmitting modulation signal 4 is 2" into setter 158.

Note that, the base station of FIG. 1 or 3 may transmit a control information symbol including information indicating whether data symbols are "multicast transmission/unicast transmission," information indicating "the number of transmission streams for multicasting," and/or information indicating "how many transmission beams are used to transmit each stream," and the like. It is thus possible for the terminal to perform suitable reception.

In FIG. 20, the terminal can obtain the data of stream 1 and the data of stream 2 with high reception quality when receiving both the transmission beam of "modulation signal 1" and the transmission beam of "modulation signal 2." Similarly, the terminal can obtain the data of stream 3 and the data of stream 4 with high reception quality when receiving both the transmission beam of "modulation signal 3" and the transmission beam of "modulation signal 4."

FIG. 20 illustrates an example in which the base station transmits "modulation signal 1," "modulation signal 2," "modulation signal 3," and "modulation signal 4," but this is an example. The base station may further transmit "modulation signal 5" and "modulation signal 6" for transmitting the data of stream 5 and the data of stream 6, respectively, or may also transmit more modulation signals for transmitting more streams than mentioned above. Note that, each of the modulation signals is transmitted using one or more transmission beams.

Note also that, as described with reference to FIGS. 17 and 18, there may be one or more unicast transmission beams (or one or more unicast reception directivity controls) in FIG. 20.

Figure 21:
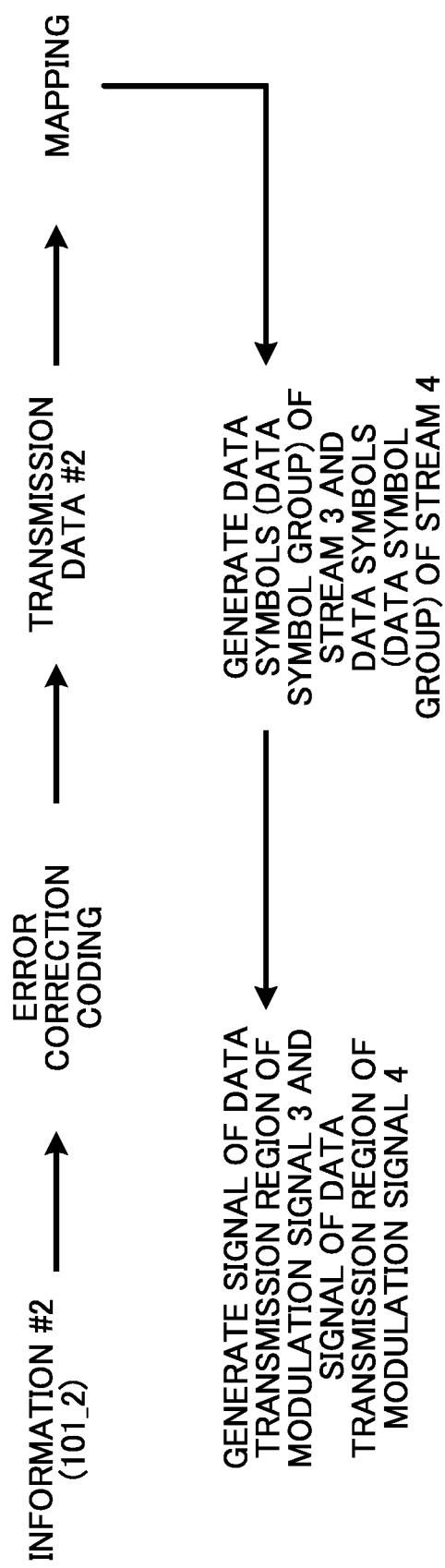
FIG. 21 illustrates the relationship between a plurality of modulation signals.

The relationship between "modulation signal 1" and "modulation signal 2" is as described with reference to FIG. 13 and, therefore, the description thereof is omitted. Here, the relationship between "modulation signal 3" and "modulation signal 4" will be described with reference to FIG. 21.

For example, processing such as error correction coding is performed on #2 information 101-2 to obtain data after the error correction coding. This data after the error correction coding is called "#2 transmission data." Then, mapping is performed on the #2 transmission data to obtain data symbols. Then, the data symbols are distributed to stream 3 and stream 4 to obtain data symbols (data symbol group) of stream 3 and data symbols (data symbol group) of stream 4. One of the data symbols of stream 3 with symbol number i is expressed as $s3(i)$, and one of the data symbols of stream 4 with symbol number i is expressed as $s4(i)$. In this case, "modulation signal 3" $tx3(i)$ with symbol number i is expressed, for example, as follows.

[5]

$$tx3(i) = e(i) \times s3(i) + f(i) \times s4(i) \quad \text{(Equation 5)}$$

The "modulation signal 4" $tx4(i)$ with symbol number i is expressed, for example, as follows.

[6]

$$tx4(i) = g(i) \times s3(i) + h(i) \times s4(i) \quad \text{(Equation 6)}$$

In Equations 5 and 6, $e(i)$, $f(i)$, $g(i)$, and $h(i)$ are defined by complex numbers and may be real numbers, respectively. In addition, each of $e(i)$, $f(i)$, $g(i)$, and $h(i)$ does not have to be a function of symbol number i, and may be a fixed value.

The "symbol group of modulation signal 3" including a "signal of a data transmission region of modulation signal 3" composed of data symbols is transmitted from the base station of FIG. 1 or 3. Further, the "symbol group of modulation signal 4" including a "signal of a data transmission region of modulation signal 4" composed of data symbols is transmitted from the base station of FIG. 1 or 3.

(Supplement)

It is needless to say that the embodiments described in the present specification may be implemented by combining a plurality of miscellaneous contents.

The embodiments and the miscellaneous contents are merely examples. For example, the present disclosure can be implemented with the same configuration as described above even when a different "modulation scheme, error correction coding scheme (error correction code, code length, coding rate, and the like for use), control information, and the like" are applied instead of the illustrations of "modulation scheme, error correction coding scheme (used error correction code, code length, coding rate, and the like for use), control information, and the like."

The embodiments and miscellaneous contents described in the present specification can also be implemented using a modulation scheme other than the modulation scheme described in the present specification. For example, Amplitude Phase Shift Keying (APSK), Pulse Amplitude Modulation (PAM), Phase Shift Keying (PSK), and/or Quadrature Amplitude Modulation (QAM) may be applied, and uniform mapping and non-uniform mapping may be used in each of the modulation schemes. APSK includes 16APSK, 64APSK, 128APSK, 256APSK, 1024APSK, and 4096APSK, for example. PAM includes 4PAM, 8PAM, 16PAM, 64PAM, 128PAM, 256PAM, 1024PAM, and 4096PAM, for example. PSK includes BPSK, QPSK, 8PSK, 16PSK, 64PSK, 128PSK, 256PSK, 1024PSK, and 4096PSK, for example. QAM includes 4QAM, 8QAM, 16QAM, 64QAM, 128QAM, 256QAM, 1024QAM, and 4096QAM, for example.

The method of arranging signal points (e.g., 2, 4, 8, 16, 64, 128, 256, or 1024 signal points) on the I-Q plane (modulation scheme with 2, 4, 8, 16, 64, 128, 256, or 1024 signal points or other number of signal points) is not limited to the signal-point arrangement method of the modulation scheme indicated in the present specification.

The "base station" described in the present specification may be, for example, a broadcasting station, a base station, an access point, a terminal, a mobile phone, or the like. The "terminal" described in the present specification may be a television, a radio, a terminal, a personal computer, a mobile phone, an access point, a base station, or the like. The "base station" and the "terminal" in the present disclosure may be devices having a communication function, and the devices may be configured to be capable of being connected via some interface to an apparatus for executing an application of a television, a radio, a personal computer, a mobile phone, or the like. In addition, symbols other than data symbols (e.g., a pilot symbol, a control information symbol, and the like) may be arranged in any manner in a frame in the present embodiment.

The pilot symbol and/or the control information symbol may be called by any name. The pilot symbol may be a known symbol modulated using PSK modulation in a transceiver, for example. Alternatively, in the transceiver, a receiver may synchronize with a transmitter to be able to know a symbol transmitted by the transceiver. The receiver performs frequency synchronization, time synchronization, channel estimation of each modulation signal (estimation of Channel State Information (CSI)), signal detection, and the like using this symbol. Note that, the pilot symbol may be referred to as a preamble, a unique word, a postamble, a reference symbol, or the like.

The control information symbol is a symbol for transmitting information other than data (data of an application or the like) that is to be transmitted to a communication partner (for example, a modulation scheme, an error correction coding scheme, a coding rate of the error correction coding scheme, configuration information of a higher layer, and/or the like used for communication) for realizing communication.

Note that the present disclosure is not limited to each of the embodiments, and can be implemented with various modifications. For example, each of the embodiments has been described in relation to a case where a communication apparatus performs the communication method, but the present invention is not limited to this, and the communication method can be performed as software processing.

For example, a program for executing the above-described communication method may be stored in a Read Only Memory (ROM) in advance, and the program may be operated by a Central Processor Unit CPU).

Alternatively, a computer may be operated in accordance with the program for executing the above-described communication method, which is stored in a computer-readable storage medium and recorded in a Random Access Memory (RAM) of the computer.

The configurations of each of the above-described embodiments may typically be implemented as a Large Scale Integration (LSI) that is an integrated circuit having an input terminal and an output terminal. These configurations may be individually formed into single chips, or may be formed into one chip to include all or some of the configurations of each of the embodiments. The LSI may be referred to as an Integrated Circuit (IC), a system LSI, a super LSI, or an ultra LSI depending on a difference in the degree of integration. In addition, the technique of circuit integration is not limited to the LSI, and it may be realized by a dedicated circuit or a general-purpose processor. A Field Programmable Gate Array (FPGA) that can be programmed after LSI fabrication or a reconfigurable processor that can reconfigure connections and settings of circuit cells inside the LSI may be used. If future integrated circuit technology replaces LSIs as a result of the advancement of semiconductor technology or other derivative technology, the functional blocks could be integrated using the future integrated circuit technology. Biotechnology can also be applied.

Embodiment 3

The present embodiment will be described in relation to a multicast communication method in which beamforming different from that in Embodiment 1 and/or Embodiment 2 is applied.

The configuration of the base station is the same as that of Embodiment 1 described with reference to FIGS. 1 to 3 and, therefore, the description of a portion of the operation of the base station the same as in Embodiment 1 is omitted. In addition, the configuration of the terminal that communicates with the base station is the same as that described with reference to FIGS. 4 to 6 of Embodiment 1 and, therefore, the description of a portion of the operation of the terminal the same as in Embodiment 1 is omitted.

Hereinafter, an example of the operation of a base station and a terminal in the present embodiment will be described.

Figure 22:
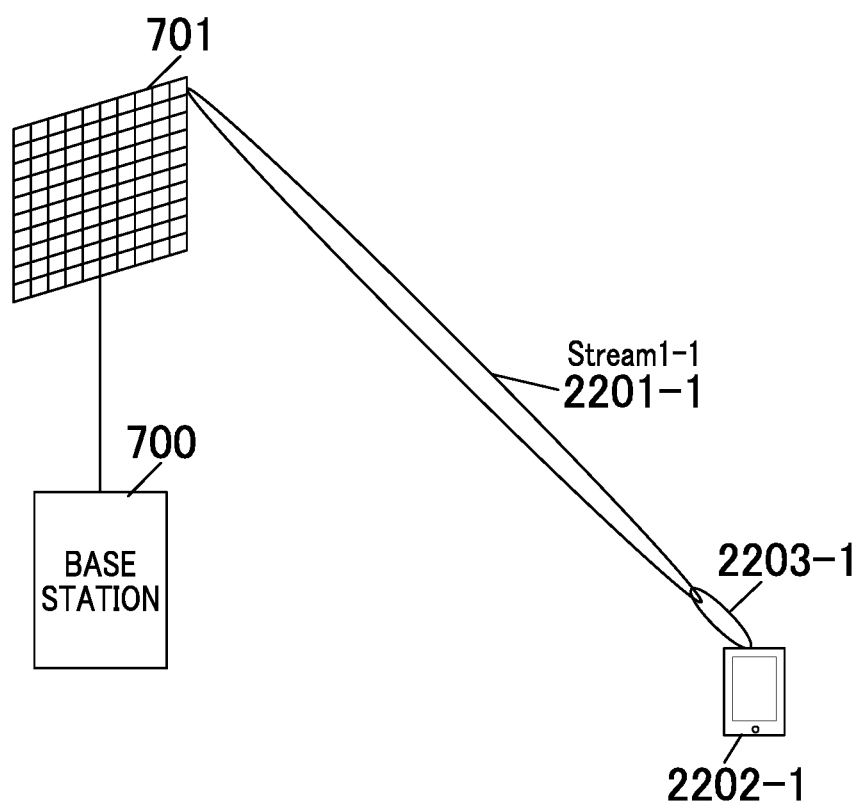
FIG. 22 illustrates an example of the communication state between the base station and the terminal.

FIG. 22 illustrates a case where the base station transmits a multicast transmission stream to one terminal.

In FIG. 22, base station 700 transmits transmission beam 2201-1 of "(multicast) stream 1-1 (first beam of stream 1)" from a transmission antenna to terminal 2202-1. Terminal 2202-1 performs directivity control to generate reception directivity 2203-1, and receives transmission beam 2201-1 of "stream 1-1."

Figure 23:
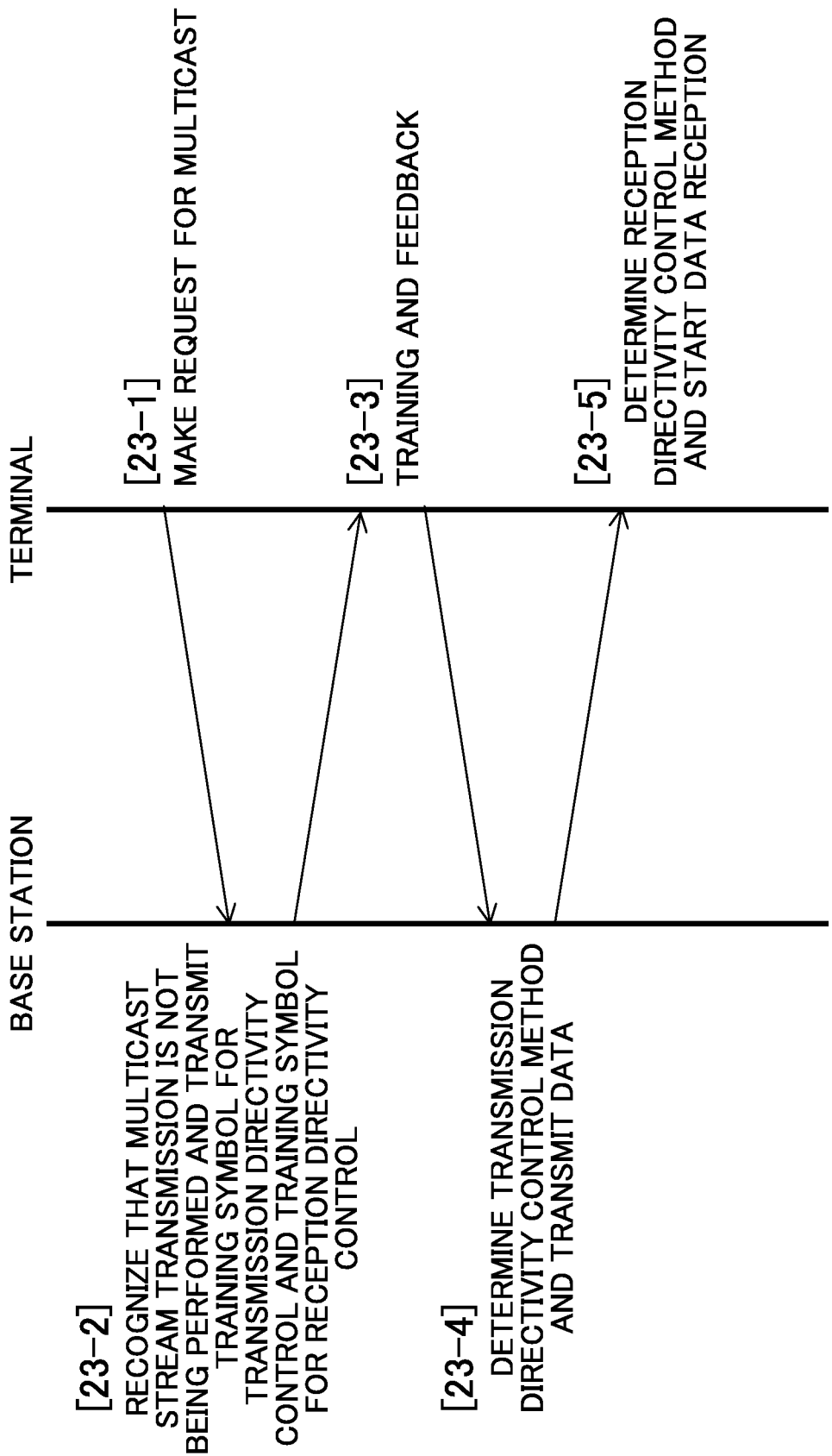
FIG. 23 illustrates a procedure for performing communication between the base station and the terminal.

FIG. 23 explains a "procedure for performing communication between the base station and the terminal" which is to be performed for the communication state between the base station and the terminal as illustrated in FIG. 22.

[23-1] To begin with, the terminal makes a "request for multicast transmission of stream 1" to the base station.

[23-2] On the occasion of [23-1], the base station recognizes that "multicast transmission of stream 1 is not being performed." Accordingly, the base station transmits to the terminal a training symbol for transmission directivity control and a training symbol for reception directivity control in order to perform multicast transmission of stream 1.

[23-3] The terminal receives the training symbol for transmission directivity control and the training symbol for reception directivity control transmitted by the base station. Then, the terminal transmits feedback information to the base station in order for the base station to perform transmission directivity control and for the terminal to perform reception directivity control.

[23-4] The base station determines a transmission directivity control method (for example, determines a weighting factor used for performing directivity control) based on the feedback information transmitted by the terminal. The base station then performs transmission directivity control and transmits data symbols of stream 1.

[23-5] The terminal determines a reception directivity control method (for example, determines a weighting factor used for performing directivity control). The terminal then starts receiving the data symbols of stream 1 transmitted by the base station.

Note that the "procedure for performing communication between the base station and the terminal" in FIG. 23 is an example, and the order of transmissions of information is not limited to that of FIG. 23. For example, it is possible to perform the same operation even when the order of transmissions of information is changed.

In addition, although the example in which the terminal performs the reception directivity control has been described with reference to FIG. 23, the terminal does not have to perform the reception directivity control. In this case, the base station does not have to transmit the training symbol for reception directivity control, and the terminal does not have to determine the reception directivity control method in FIG. 23.

In the case where the base station performs transmission directivity control and the base station has the configuration of FIG. 1, multiplication factors of multipliers 204-1, 204-2, 204-3, and 204-4 in FIG. 2 may be set, for example. In the case where the base station has the configuration of FIG. 3, weighting factors for weighting-combiner 301 may be set, for example. Note that, the number of streams to be transmitted is "1" in the case of FIG. 22, but is not limited thereto.

In the case where the terminal performs reception directivity control and the terminal has the configuration of FIG. 4, multiplication factors of multipliers 503-1, 503-2, 503-3, and 503-4 in FIG. 5 may be set, for example. In the case where the terminal has the configuration of FIG. 6, multiplication factors of multipliers 603-1, 603-2, . . . , and 603-L may be set, for example.

Figure 24:
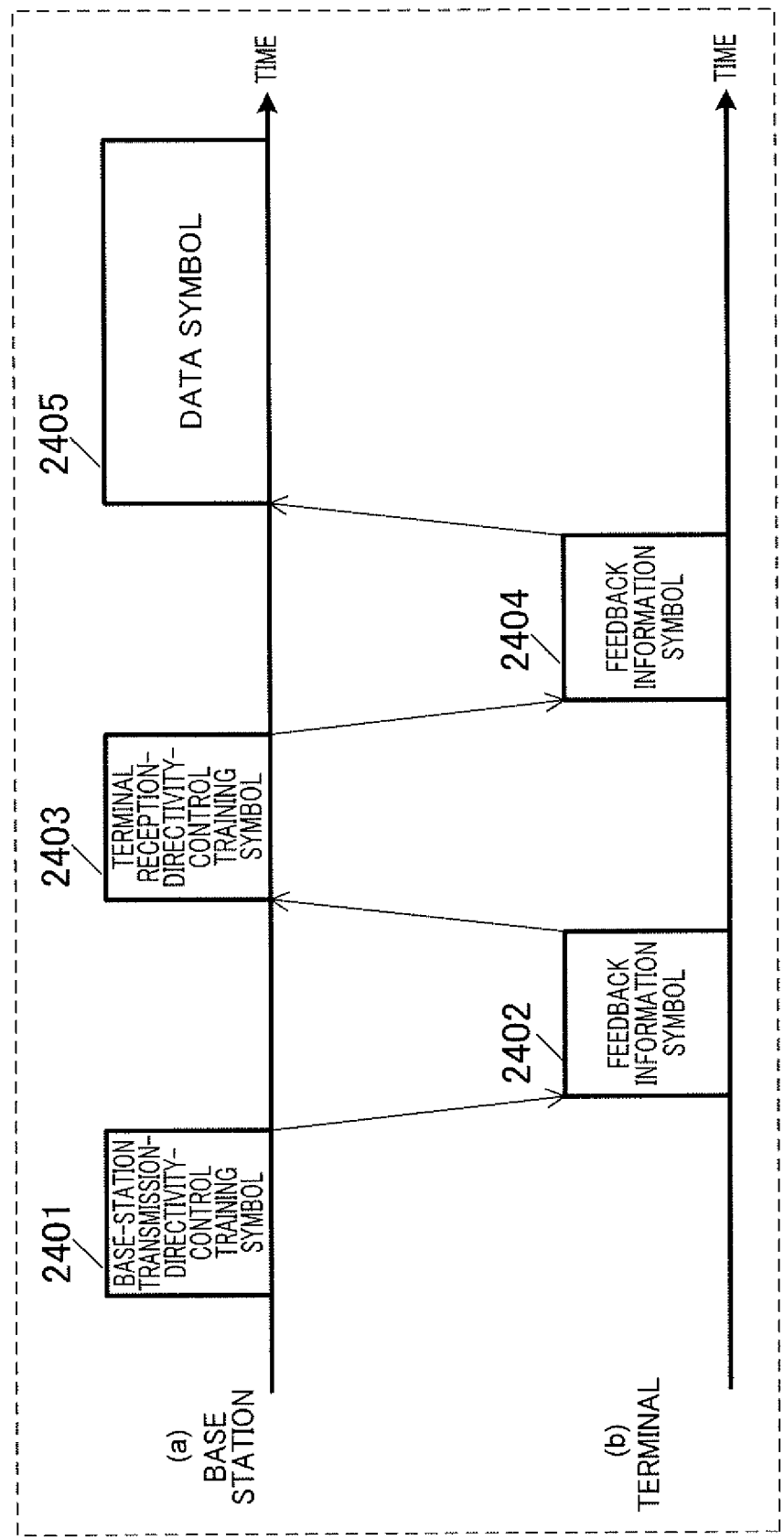
FIG. 24 illustrates an example of symbols transmitted by the base station and the terminal.

FIG. 24 illustrates an example in which symbols transmitted by the base station and symbols transmitted by the terminal are arranged in the time direction in a case where the base station in FIG. 23 transmits the transmission directivity control symbol, the reception directivity control symbol, and the data symbols. FIG. 24 illustrates, at (a), an example in which the symbols transmitted by the base station are arranged in the time direction. FIG. 24 illustrates, at (b), an example in which the symbols transmitted by the terminal are arranged in the time direction. At (a) and (b) in FIG. 24, the horizontal axis represents the time direction.

When communication is performed between the base station and the terminal as illustrated in FIG. 23, the base station first transmits "base-station transmission-directivity-control training symbol" 2401 as illustrated in FIG. 24. For example, base-station transmission-directivity-control training symbol 2401 is composed of a control information symbol and a known PSK symbol.

Then, the terminal receives "base-station transmission-directivity-control training symbol" 2401 transmitted by the base station, and transmits, for example, information on an antenna used by the base station for transmission and information on the multiplication factor (or the weighting factor) used in directivity control as feedback information symbol 2402.

The base station receives "feedback information symbol" 2402 transmitted by the terminal, and determines an antenna to be used for transmission from feedback information symbol 2402. The base station also determines a factor to be used for transmission directivity control from feedback information symbol 2402. Then, the base station transmits "terminal reception-directivity-control training symbol" 2403. For example, "terminal reception-directivity-control training symbol" 2403 is composed of a control information symbol and a known PSK symbol.

The terminal receives "terminal reception-directivity-control training symbol" 2403 transmitted by the base station, and determines, for example, an antenna used by the terminal for reception and a multiplication factor used by the terminal for reception directivity control. The terminal transmits feedback information symbol 2404 to indicate completion of preparation for receiving data symbols.

The base station receives "feedback information symbol" 2404 transmitted by the terminal, and outputs data symbols 2405 based on feedback information symbol 2404.

Note that the communication between the base station and the terminal illustrated in FIG. 24 is an example. For example, the order of transmissions of the symbols or the order of transmissions of the base station and transmissions of the terminal is not limited to the example. Each of "base-station transmission-directivity-control training symbol" 2401, "feedback information symbol" 2402, "terminal reception-directivity-control training symbol" 2403, "feedback information symbol" 2404, and "data symbols" 2405 may include: a preamble, a reference symbol, and a pilot symbol for signal detection, time synchronization, frequency synchronization, frequency offset estimation, and channel estimation; a symbol for transmitting control information; and/or the like.

Figure 25:
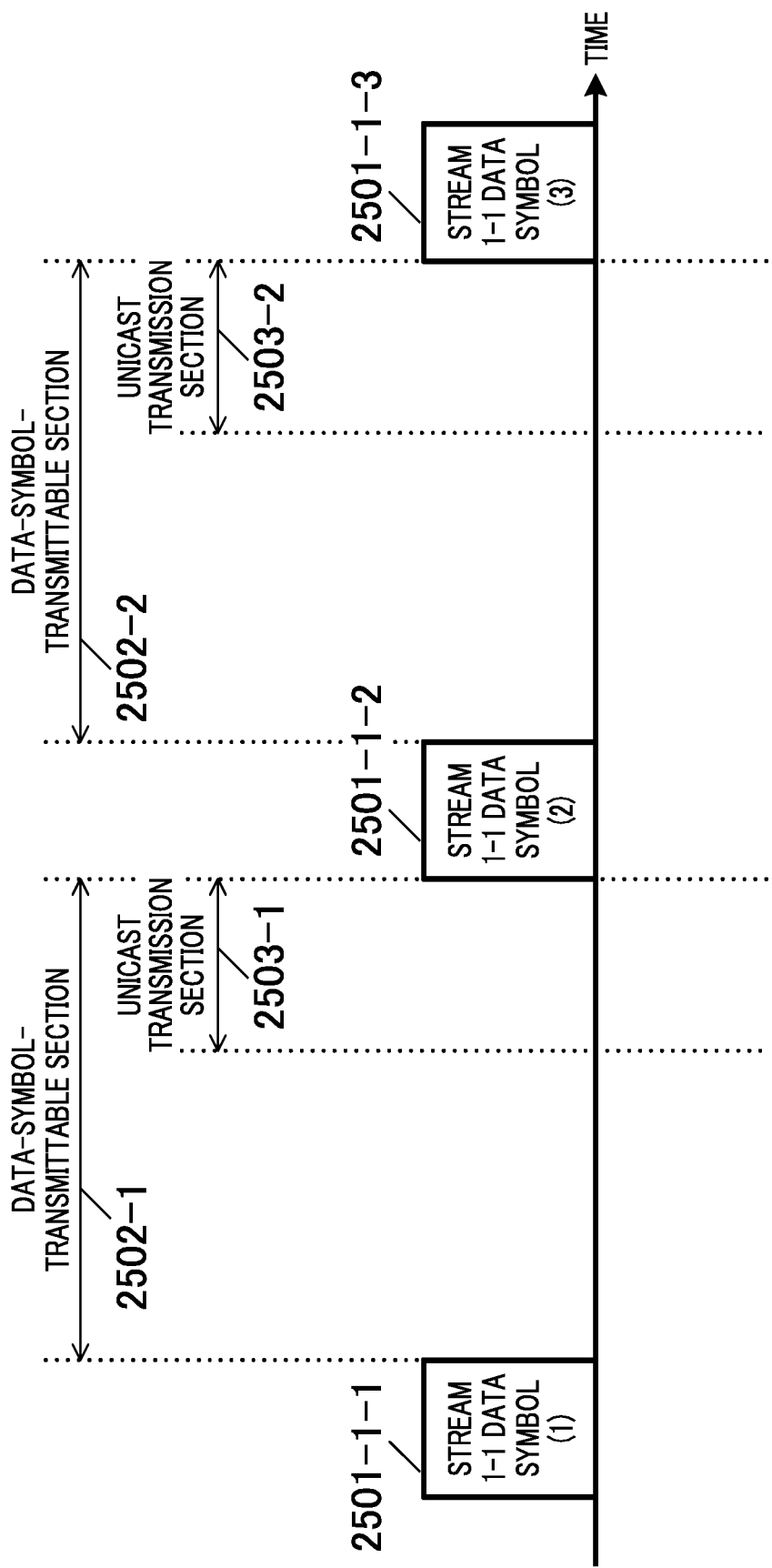
FIG. 25 illustrates an example of symbols transmitted by the base station.

FIG. 25 is an example of symbols transmitted by the base station when the base station transmits the data symbols of stream 1 after the communication between the base station and the terminal in FIG. 23 is completed. In FIG. 25, the horizontal axis represents the time direction.

In FIG. 25, the base station transmits the first data symbol of transmission beam 1 of stream 1 as "(multicast) stream 1-1 data symbol (1)" 2501-1-1. A section in which data symbols are transmittable (hereinafter, referred to as "data-symbol-transmittable section") 2502-1 is arranged behind the first data symbol.

Thereafter, the base station transmits the second data symbol of transmission beam 1 of (multicast) stream 1 as "(multicast) stream 1-1 data symbol (2)" 2501-1-2. Data-symbol-transmittable section 2502-2 is arranged behind the second data symbol.

Thereafter, the base station transmits the third data symbol of transmission beam 1 of (multicast) stream 1 as "(multicast) stream 1-1 data symbol (3)" 2501-1-3.

In this manner, the base station transmits the data symbols of "(multicast) stream 1-1" 2201-1 illustrated in FIG. 22. Note that, in FIG. 25, "(multicast) stream 1-1 data symbol (1)" 2501-1-1, "(multicast) stream 1-1 data symbol (2)" 2501-1-2, "(multicast) stream 1-1 data symbol (3)" 2501-1-3, and the like may include, in addition to the data symbols, a preamble, a reference symbol, a pilot symbol for signal detection, time synchronization, frequency synchronization, frequency offset estimation, and channel estimation, a symbol for transmitting control information, and/or the like.

In FIG. 25, data-symbol-transmittable section 2502-1 includes unicast transmission section 2503-1. In addition, data-symbol-transmittable section 2502-2 includes unicast transmission section 2503-2.

In FIG. 25, the frame includes unicast transmission sections 2503-1 and 2503-2. For example, in FIG. 25, the base station may transmit multicast symbols in a section of data-symbol-transmittable section 2502-1 other than unicast transmission section 2503-1 and a section of data-symbol-transmittable section 2502-2 other than unicast transmission section 2503-2. Note that, a description in this respect will be given below using an example.

Providing a frame with unicast transmission sections as described above is a useful configuration requirement for stably operating a radio communication system. Note that, a description in this respect will be given below using an example. Note also that, the unicast transmission sections do not have to be in the temporal positions as illustrated in FIG. 25, and may be arranged in any temporal position. In the unicast transmission sections, the base station may transmit a symbol or the terminal may transmit a symbol.

In addition, the base station may be able to directly set a unicast transmission section. Alternatively, the base station may set a maximum transmit data rate for transmitting multicast symbols.

For example, when the transmission rate for data transmittable by the base station is 2 Gbps (bps: bits per second) and the maximum transmission rate for data that the base station can allocate for transmission of multicast symbols is 1.5 Gbps, a unicast transmission section equivalent to 500 Mbps can be set.

In this manner, the base station may be configured to indirectly set the unicast transmission section. Note that, another specific example will be described below.

Note that, correspondingly to the state of FIG. 22, FIG. 25 illustrates the frame configuration in which "(multicast) stream 1-1 data symbol (1)" 2501-1-1, "(multicast) stream 1-1 data symbol (2)" 2501-1-2, and "(multicast) stream 1-1 data symbol (3)" 2501-1-3 are present, but the present disclosure is not limited thereto. For example, there may be data symbols of a multicast stream other than stream 1 (stream 1-1), data symbols of stream 1-2 that is the second transmission beam of stream 1, and/or data symbols of stream 1-3 that is the third transmission beam of stream 1. A description will be given below in this respect.

Figure 26:
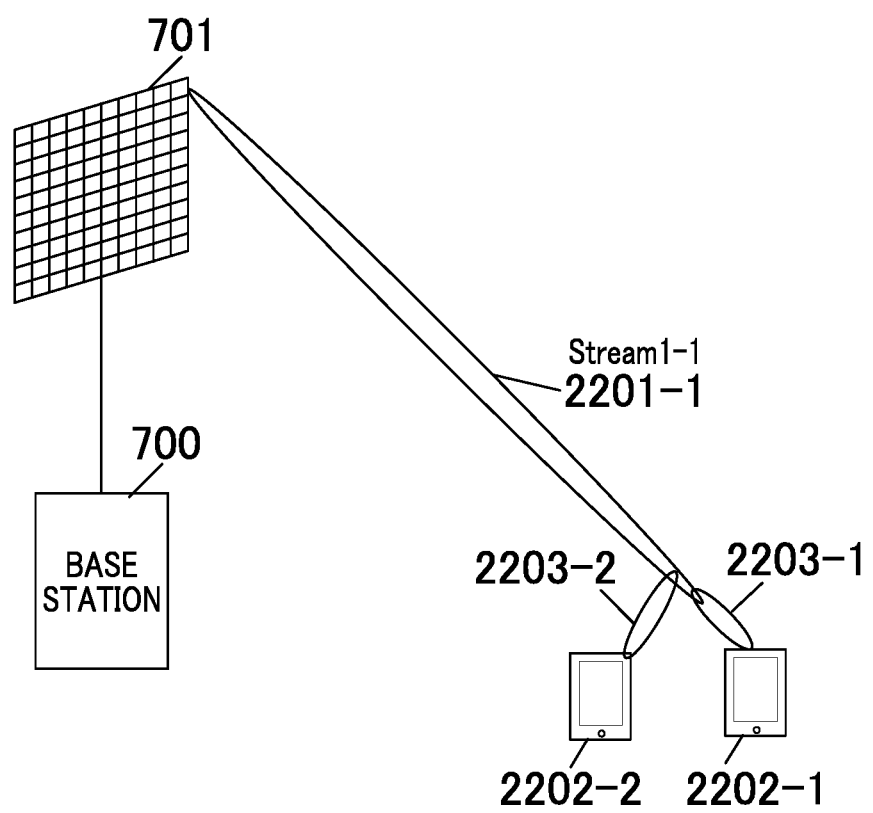
FIG. 26 illustrates an example of the communication state between the base station and the terminal.

FIG. 26 illustrates the state in which the base station illustrated in FIG. 22 is transmitting a multicast transmission stream to one terminal and to which one new terminal is added. Note that, components in FIG. 26 that operate in the same manner as those in FIG. 22 are provided with the same reference numerals.

In FIG. 26, terminal 2202-2 is newly added. Terminal 2202-2 performs directivity control to generate reception directivity 2203-2, and receives transmission beam 2201-1 of "(multicast) stream 1-1."

Next, a description will be given with reference to FIG. 26.

Figure 27:
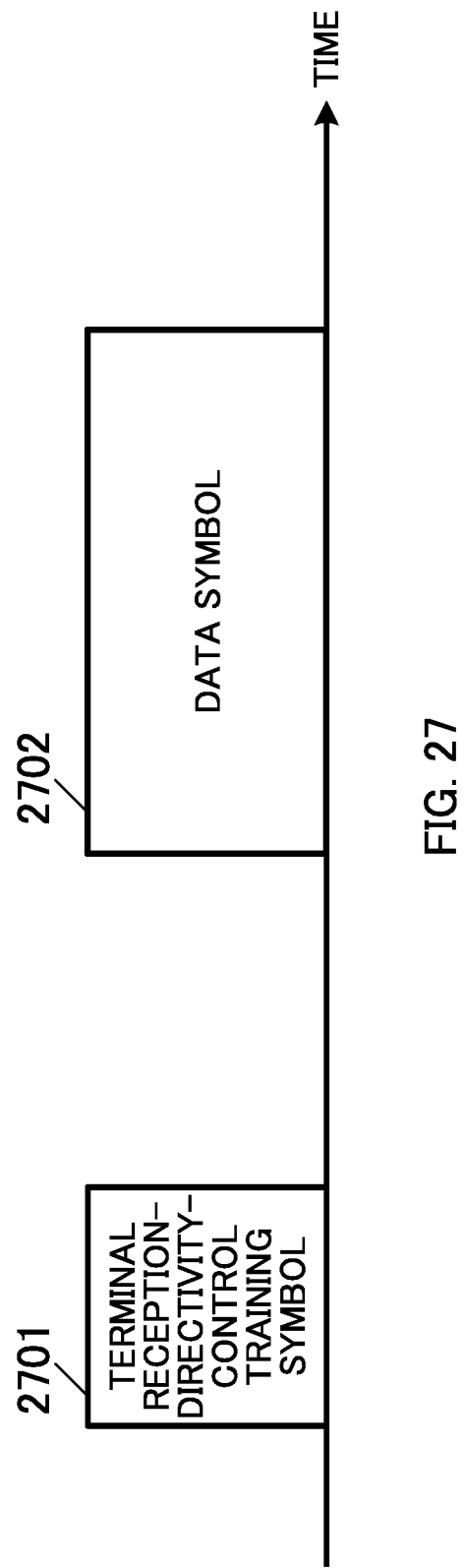
FIG. 27 illustrates an example of symbols transmitted by the base station.

FIG. 26 illustrates the state in which terminal 2202-2 newly participates in the multicast communication performed between base station 700 and terminal 2202-1. Hereinafter, the state illustrated in FIG. 26 will be described as an example. As is understood, the base station transmits the "terminal reception-directivity-control training symbol" 2701 and the "data symbols" 2702 as illustrated in FIG. 27, but does not transmit the "base-station transmission training symbol" illustrated in FIG. 24. Note that, the horizontal axis represents the time direction in FIG. 27.

Figure 28:
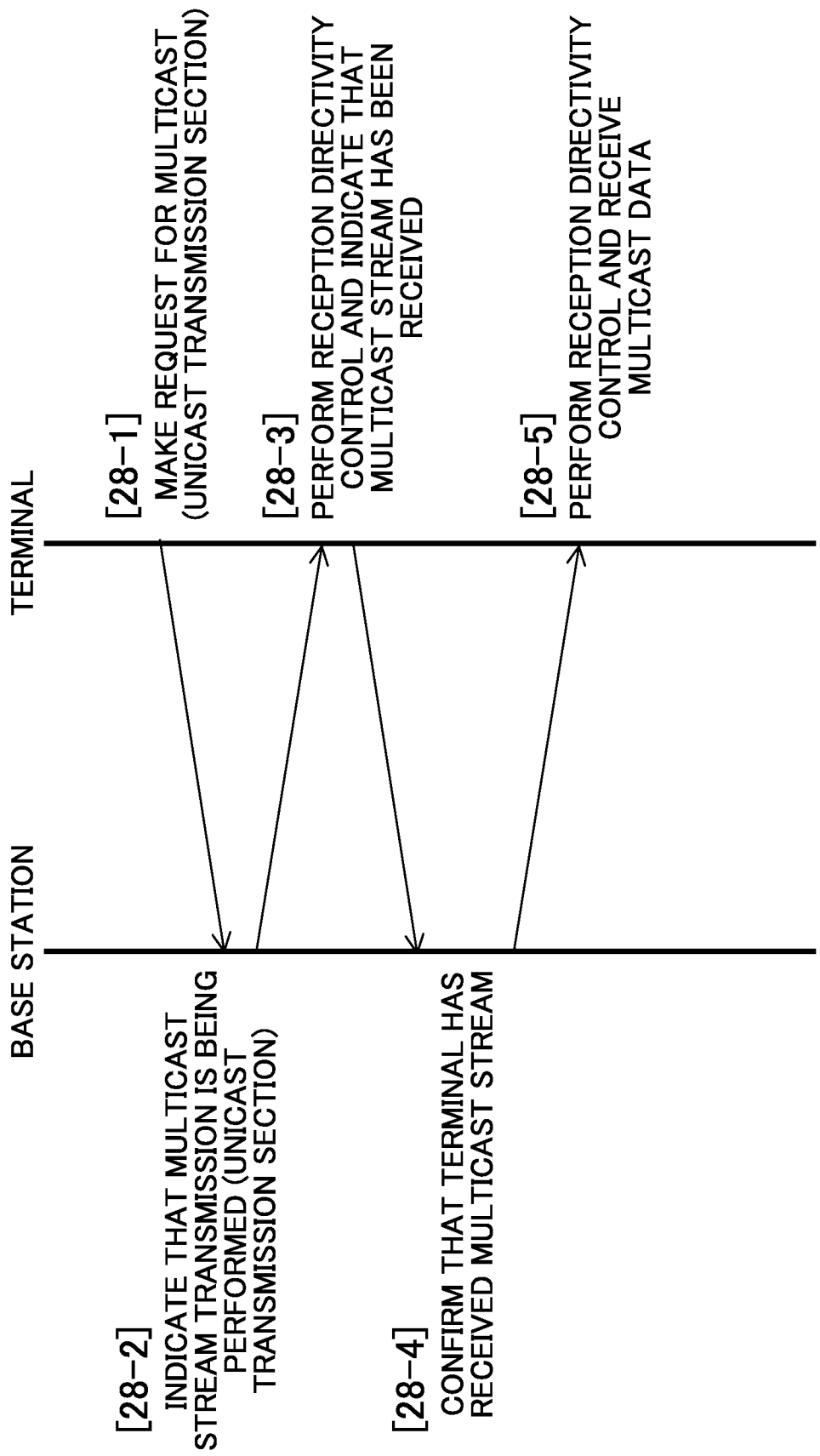
FIG. 28 illustrates a procedure for performing communication between the base station and the terminal.

FIG. 28 illustrates an example of an operation performed by the base station and the terminal in order to achieve the state as illustrated in FIG. 26, that is, a state in which the base station transmits the multicast transmission beam to two terminals.

[28-1] Terminal 2202-2 makes a "request for multicast transmission of stream 1" to the base station. The "request for multicast transmission of stream 1" is transmitted in one of the unicast transmission sections illustrated in FIG. 25.

[28-2] In response to the request indicated at above [28-1], the base station indicates to terminal 2202-2 that "multicast stream 1 is being transmitted." The indication "multicast stream 1 is being transmitted" is transmitted in one of the unicast transmission sections illustrated in FIG. 25.

[28-3] In response to the indication indicated at above [28-2], terminal 2202-2 performs reception directivity control in order to start receiving multicast stream 1.

Terminal 2202-2 performs the reception directivity control and indicates to the base station that "multicast stream 1" has been received successfully.

[28-4] In response to the indication indicated at above [28-3], the base station confirms that the terminal has successfully received "multicast stream 1."

[28-5] Terminal 2202-2 performs the reception directivity control and start receiving "multicast stream 1."

Figure 29:
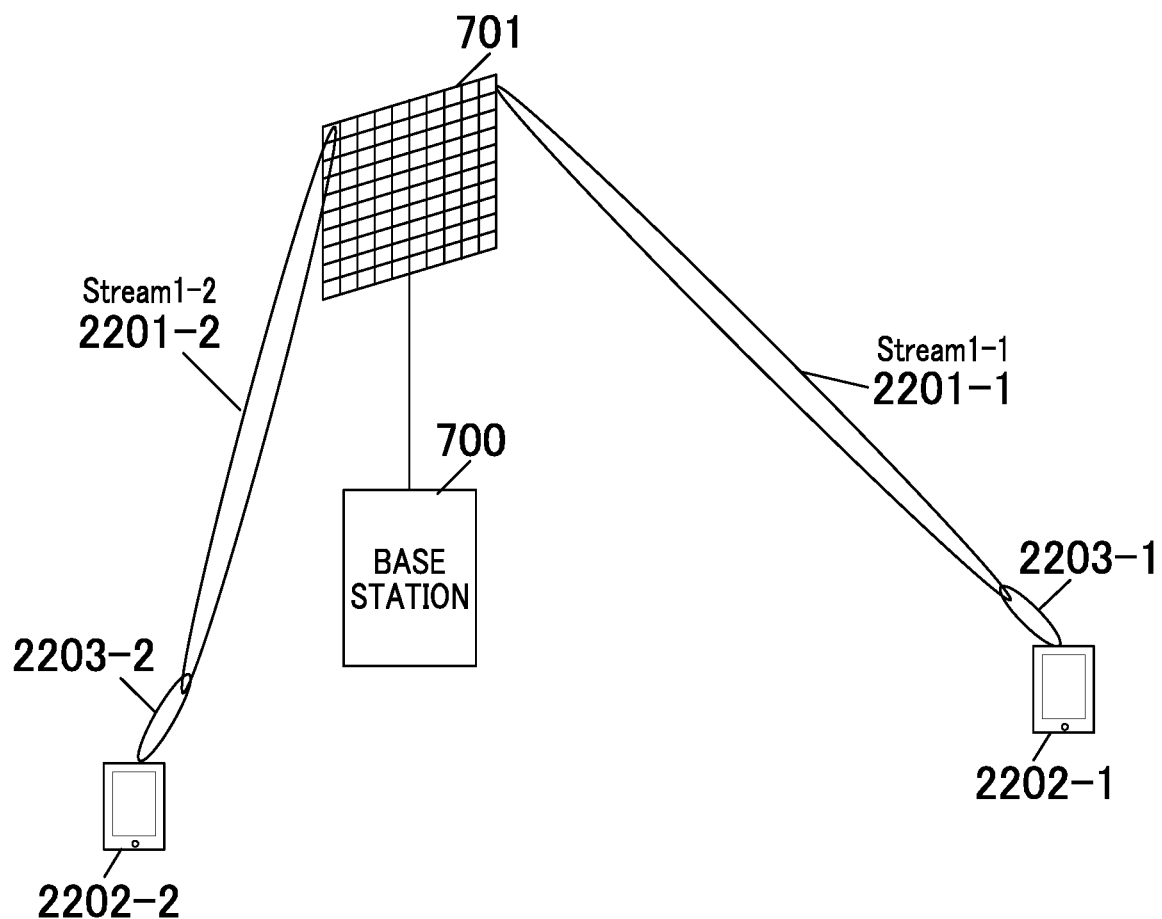
FIG. 29 illustrates an example of the communication state between the base station and the terminal.

FIG. 29 illustrates the state in which the base station illustrated in FIG. 22 is transmitting a multicast transmission stream to one terminal and to which one new terminal is added. Note that, components in FIG. 29 that operate in the same manner as those in FIG. 22 are provided with the same reference numerals.

In FIG. 29, terminal 2202-2 is newly added. FIG. 29 differs from FIG. 26 in that base station 700 newly transmits transmission beam 2201-2 of "(multicast) stream 1-2" (second transmission beam of stream 1), and terminal 2202-2 performs directivity control to generate reception directivity 2203-2 and receive transmission beam 2201-2 of (multicast) stream 1-2.

Next, control performed by the base station and the terminal in order to achieve the state illustrated in FIG. 29 will be described.

FIG. 29 illustrates the state in which terminal 2202-2 newly participates in the multicast communication performed between base station 700 and terminal 2202-1. Hereinafter, the state illustrated in FIG. 29 will be described as an example.

Figure 30:
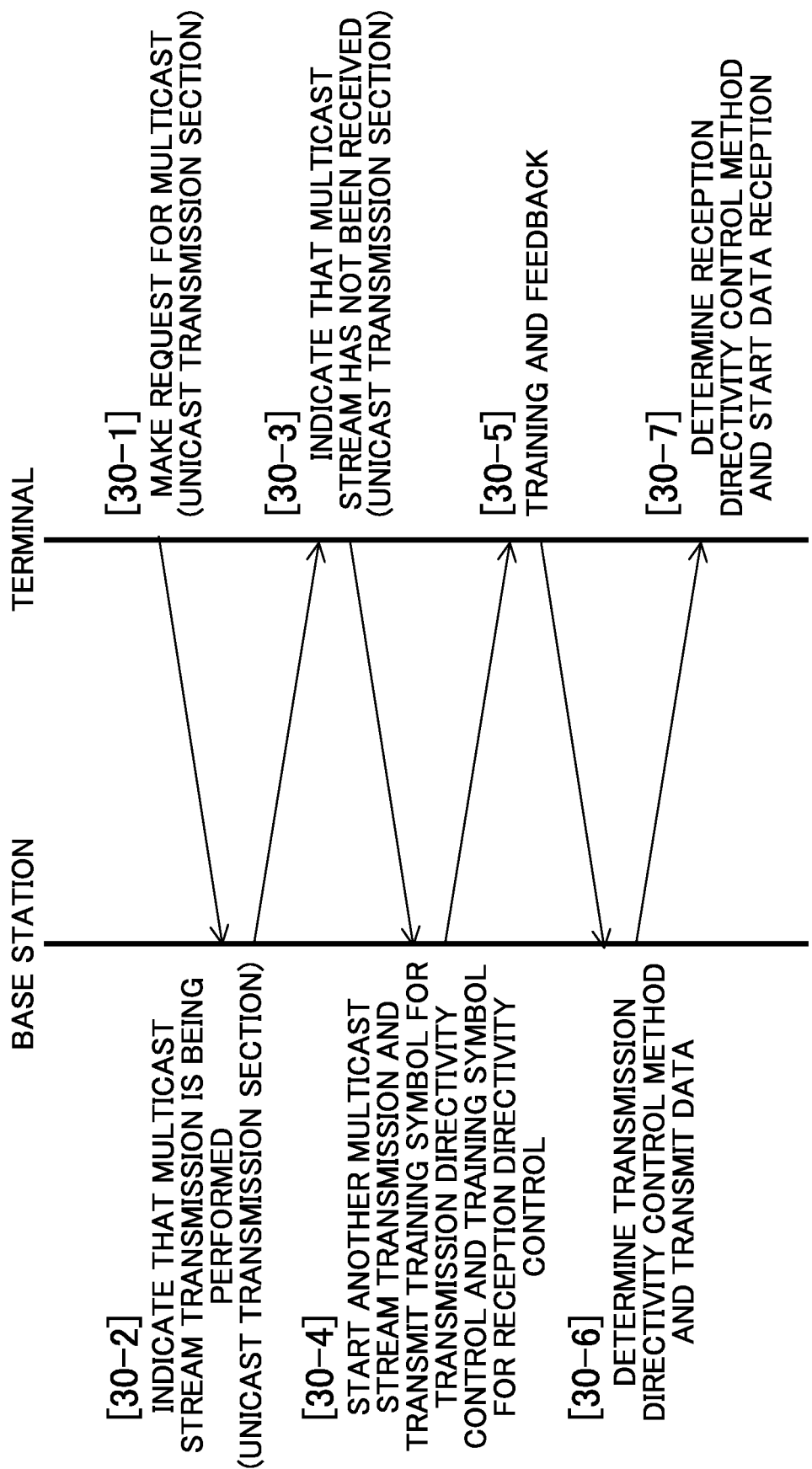
FIG. 30 illustrates a procedure for performing communication between the base station and the terminal.

FIG. 30 illustrates an example of an operation performed by the base station and the terminal in order to achieve the state as illustrated in FIG. 29, that is, a state in which the base station transmits the multicast transmission beams to two terminals.

[30-1] Terminal 2202-2 makes a "request for multicast transmission of stream 1" to the base station. The "request for multicast transmission of stream 1" is transmitted in one of the unicast transmission sections illustrated in FIG. 25.

[30-2] In response to the request indicated at above [30-1], the base station indicates to terminal 2202-2 that "multicast stream 1 is being transmitted." The indication "multicast stream 1 is being transmitted" is transmitted in one of the unicast transmission sections illustrated in FIG. 25.

[30-3] In response to the indication indicated at above [30-2], terminal 2202-2 indicates to the base station that "multicast stream 1 has not been received." The indication "multicast stream 1 has not been received" is transmitted in one of the unicast transmission sections illustrated in FIG. 25.

[30-4] In response to the indication indicated at above [30-3], the base station determines to transmit another transmission beam of multicast stream 1 (i.e., transmission beam 2201-2 in FIG. 29). Note that, although another transmission beam of multicast stream 1 is here determined to be transmitted, the other transmission beam of multicast stream 1 may be determined not to be transmitted. A description will be given below in this respect.

The base station then transmits to terminal 2202-2 a training symbol for transmission directivity control and a training symbol for reception directivity control in order to perform multicast transmission of stream 1. Note that the base station transmits the transmission beam of stream 1-1 in FIG. 29 in addition to the transmission of these symbols. A description will be given below in this respect.

[30-5] Terminal 2202-2 receives the training symbol for transmission directivity control and the training symbol for reception directivity control transmitted by the base station. Terminal 2202-2 then transmits feedback information to the base station in order for the base station to perform the transmission directivity control and for terminal 2202-2 to perform the reception directivity control.

[30-6] Based on the feedback information transmitted by terminal 2202-2, the base station determines a transmission directivity control method (for example, determines a weighting factor used for performing directivity control). Then, the base station transmits the data symbols of stream 1 (transmission beam 2201-2 of stream 1-2 in FIG. 29).

[30-7] Terminal 2202-2 determines a reception directivity control method (for example, determines a weighting factor used for performing directivity control). Then, terminal 2202-2 starts receiving the data symbols of stream 1 transmitted by the base station (transmission beam 2201-2 of stream 1-2 in FIG. 29).

Note that the "procedure for performing communication between the base station and the terminal" in FIG. 30 is an example, and the order of transmissions of information is not limited to that of FIG. 30. For example, it is possible to perform the same operation even when the order of transmissions of information is changed.

In addition, although the example in which the terminal performs the reception directivity control has been described with reference to FIG. 30, the terminal does not have to perform the reception directivity control. In this case, the base station does not have to transmit the training symbol for reception directivity control, and the terminal does not have to determine the reception directivity control method in FIG. 30.

In the case where the base station performs transmission directivity control and the base station has the configuration of FIG. 1, multiplication factors of multipliers 204-1, 204-2, 204-3, and 204-4 in FIG. 2 may be set, for example. In the case where the base station has the configuration of FIG. 3, a weighting factor of weighting-combiner 301 may be set, for example. Note that, the number of streams to be transmitted is "2" in the case of FIG. 29, but is not limited thereto.

In the case where terminals 2202-1 and 2202-2 perform reception directivity control and each of the terminals has the configuration of FIG. 4, multiplication factors of multipliers 503-1, 503-2, 503-3, and 503-4 in FIG. 5 may be set, for example. In the case where the terminal has the configuration of FIG. 6, multiplication factors of multipliers 603-1, 603-2, . . . , and 603-L may be set, for example.

Figure 31:
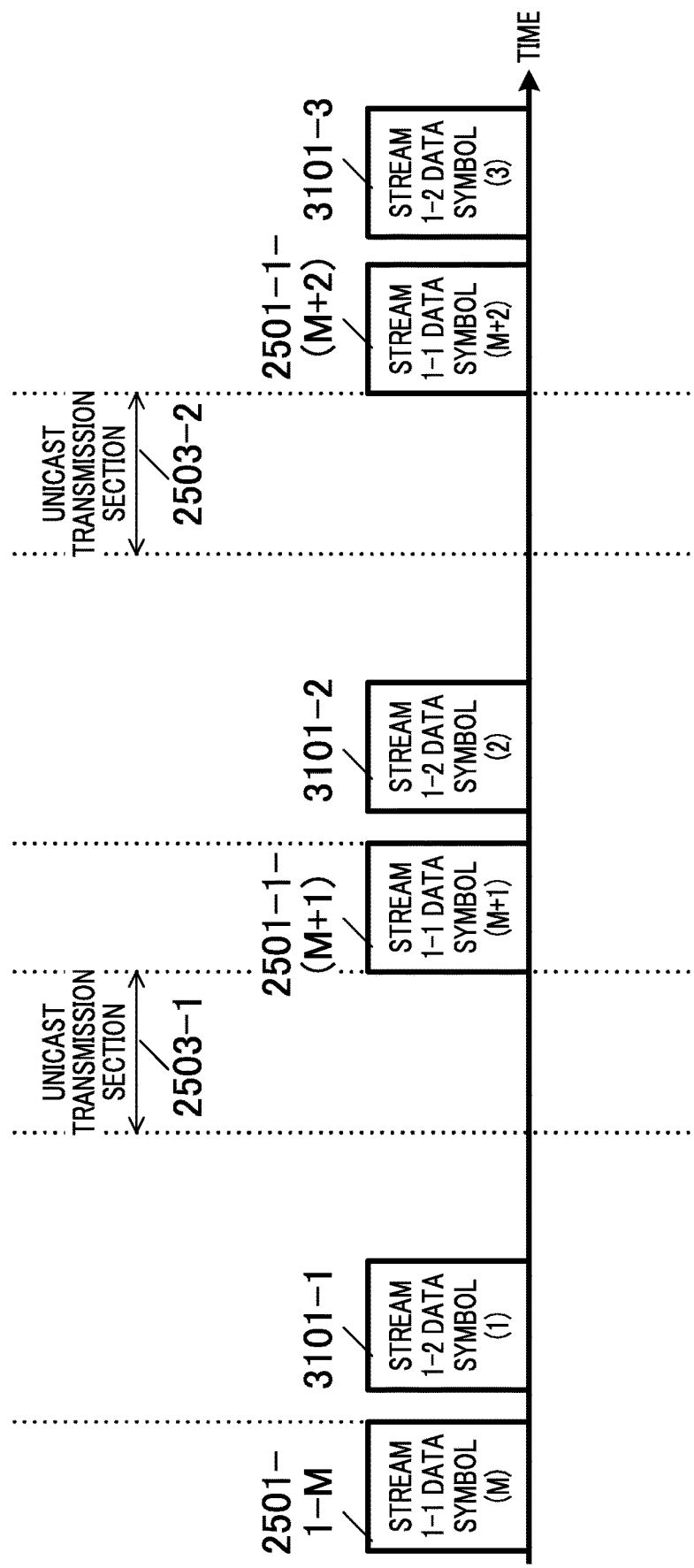
FIG. 31 illustrates an example of symbols transmitted by the base station.

FIG. 31 illustrates an example of symbols transmitted by the base station when the base station transmits data symbols of stream 1 after the communication between the base station and the terminal in FIG. 30 is completed. In FIG. 31, the horizontal axis represents the time direction.

Since "stream 1-1" of FIG. 29 is present, there are "(multicast) stream 1-1 data symbol (M)" 2501-1-M, "(multicast) stream 1-1 data symbol (M+1)" 2501-1-(M+1), and "(multicast) stream 1-1 data symbol (M+2)" 2501-1-M+2 in FIG. 31 as in FIG. 25. Note that, the reason for the description of "(M), (M+1), (M+2)" is because (multicast) stream 1-1 exists before (multicast) stream 1-2 exists. Accordingly, M denotes an integer equal to or greater than 2 in FIG. 31.

As illustrated in FIG. 31, there are "(multicast) stream 1-2 data symbol (1)" 3101-1, "(multicast) stream 1-2 data symbol (2)" 3101-2, and "(multicast) stream 1-2 data symbol (3)" 3101-3 in a section other than unicast transmission sections 2503-1 and 2503-2.

Similarly to the symbols described above, the symbols illustrated in FIG. 31 are configured as follows.

The "(multicast) stream 1-1 data symbol (M)" 2501-1-M, "(multicast) stream 1-1 data symbol (M+1)" 2501-1-(M+1), "(multicast) stream 1-1 data symbol (M+2)" 2501-1-(M+2), "(multicast) stream 1-2 data symbol (1)" 3101-1, "(multicast) stream 1-2 data symbol (2)" 3101-2, and "(multicast) stream 1-2 data symbol (3)" 3101-3 are data symbols for transmitting "stream 1."

The terminal obtains the "data symbols of stream 1-1" to obtain the "data of stream 1." The terminal also obtains the "data symbols of stream 1-2" to obtain the "data of stream 1."

The directivities of the transmission beams of "(multicast) stream 1-1 data symbol (M)" 2501-1-M, "(multicast) stream 1-1 data symbol (M+1)" 2501-1-(M+1), "(multicast) stream 1-1 data symbol (M+2)" 2501-1-(M+2) are different from the directivities of the transmission beams of and "(multicast) stream 1-2 data symbol (1)" 3101-1, "(multicast) stream 1-2 data symbol (2)" 3101-2, and "(multicast) stream 1-2 data symbol (3)" 3101-3. Thus, a set of multiplication factors (or weighting factors) of the transmission apparatus of the base station used to generate the transmission beams of "(multicast) stream 1-1 data symbol (M)" 2501-1-M, "(multicast) stream 1-1 data symbol (M+1)" 2501-1-(M+1), "(multicast) stream 1-1 data symbol (M+2)" 2501-1-(M+2) is different from a set of multiplication factors (or weighting factors) of the transmission apparatus of the base station used to generate the transmission beams of "(multicast) stream 1-2 data symbol (1)" 3101-1, "(multicast) stream 1-2 data symbol (2)" 3101-2, and "(multicast) stream 1-2 data symbol (3)" 3101-3.

With the above configuration, two terminals can receive multicast streams transmitted by the base station. At this time, the directivity control is performed through transmission and reception, so that, as an effect of the present embodiment, it is possible to broaden the area in which the multicast streams can be received. Moreover, the addition of a stream and/or the addition of a transmission beam are adaptively performed, so that, as an effect of the present embodiment, it is possible to effectively utilize the frequency resource, time resource, and/or spatial resource for transmitting data.

Note that, such control as described below may also be performed. Details of the control are as follows.

Figure 32:
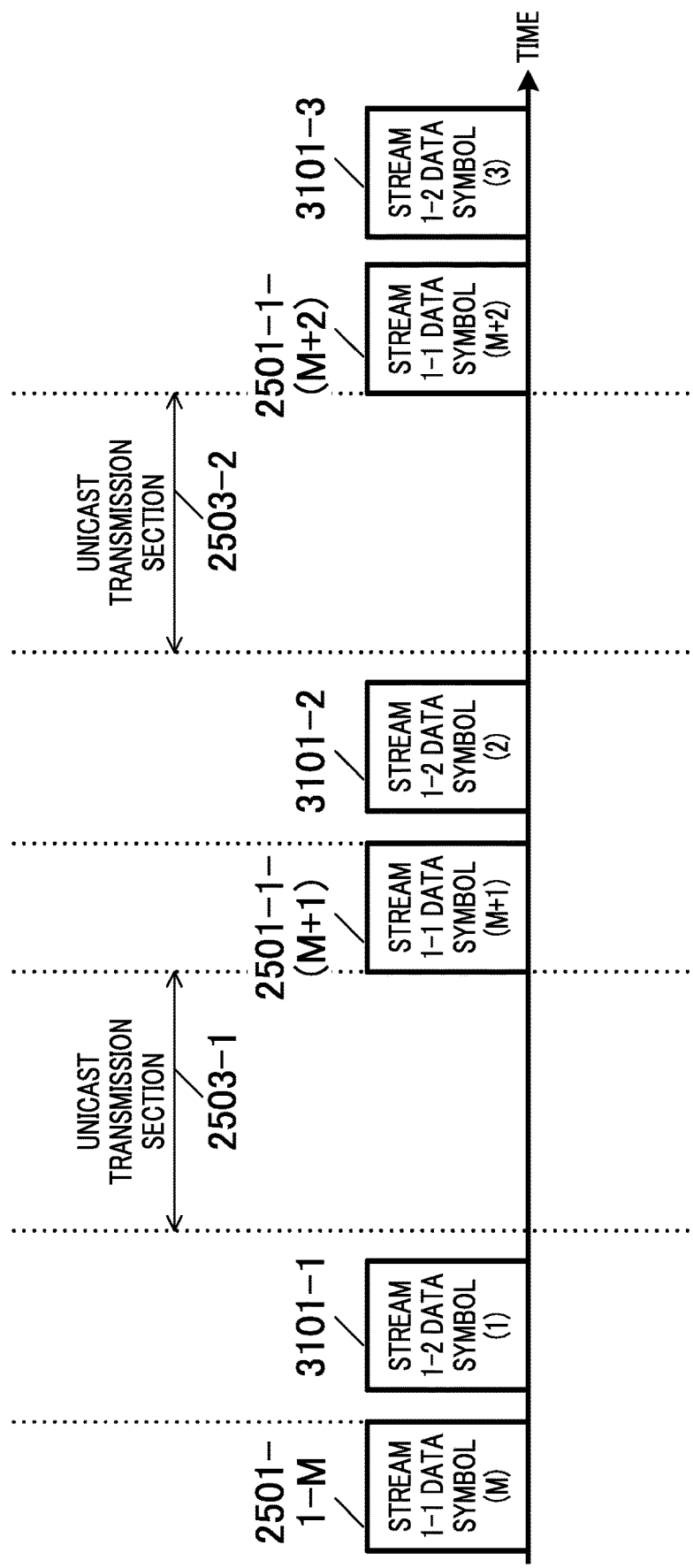
FIG. 32 illustrates an example of symbols transmitted by the base station.

FIG. 32 is an "example of symbols transmitted by a base station when the base station transmits data symbols (of stream 1) after the communication between the base station and the terminal in FIG. 30 is completed," which is an example different from that in FIG. 31. In FIG. 32, the horizontal axis represents the time direction. Note that, components in FIG. 32 that operate in the same manner as those in FIG. 25 or 31 are provided with the same reference numerals.

FIG. 32 differs from FIG. 31 in that unicast transmission sections 2503-1 and 2503-2 are set longer in time, so that the base station does not transmit a further multicast symbol additionally.

Figure 33:
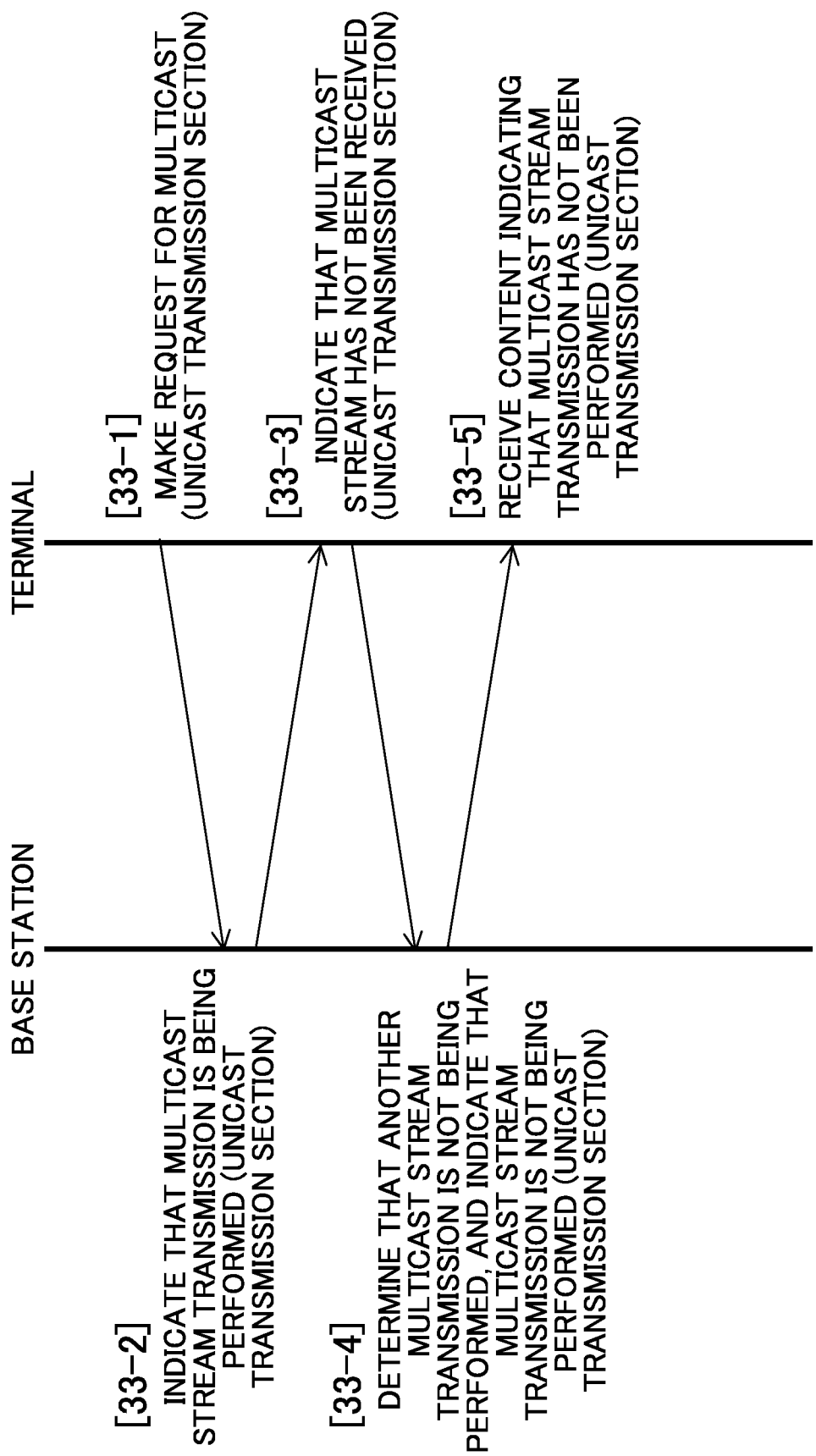
FIG. 33 illustrates a procedure for performing communication between the base station and the terminal.

FIG. 33 illustrates an example of an operation in which the base station transmits multicast transmission beams to two terminals (terminals 2202-1 and 2202-2) as illustrated in FIG. 29 and, further, new terminal 2202-3 requests, from the base station, addition of a transmission beam. Note that, the frame of a modulation signal transmitted by the base station is illustrated in FIG. 32.

[33-1] Terminal 2202-3 makes a "request for multicast transmission of stream 1" to the base station. The "request for multicast transmission of stream 1" is transmitted in one of the unicast transmission sections illustrated in FIG. 32.

[33-2] In response to the request indicated at above [33-1], the base station indicates to terminal 2202-3 that multicast stream 1 is being transmitted. The "indication of multicast stream 1 being transmitted" is transmitted in one of the unicast transmission sections illustrated in FIG. 32.

[33-3] In response to the indication indicated at above [33-2], terminal 2202-3 indicates to the base station that "multicast stream 1 has not been received." The "indication that multicast stream 1 has not been received" is transmitted in one of the unicast transmission sections illustrated in FIG. 32.

[33-4] In response to the indication indicated at above [33-3], the base station determines whether or not a transmission beam different from the transmission beam of stream 1-1 and the transmission beam of stream 1-2 can be transmitted as one of the transmission beams of multicast stream 1. In this case, considering that the frame is as illustrated in FIG. 32, the base station determines not to transmit another transmission beam of multicast stream 1. Accordingly, the base station indicates to terminal 2202-3 that "another transmission beam of multicast stream 1 is not transmitted." Note that the "indication of not transmitting another transmission beam of multicast stream 1" is transmitted in one of the unicast transmission sections illustrated in FIG. 32.

[33-5] Terminal 2202-3 receives the "indication of not transmitting another transmission beam of multicast stream 1."

Note that the "procedure for performing communication between the base station and the terminal" in FIG. 33 is an example, and the order of transmissions of information is not limited to that of FIG. 33. For example, it is possible to perform the same operation even when the order of transmissions is changed. As in this example, when communication resources for multicast transmission are insufficient, addition of a multicast transmission beam does not have to be performed.

Figure 34:
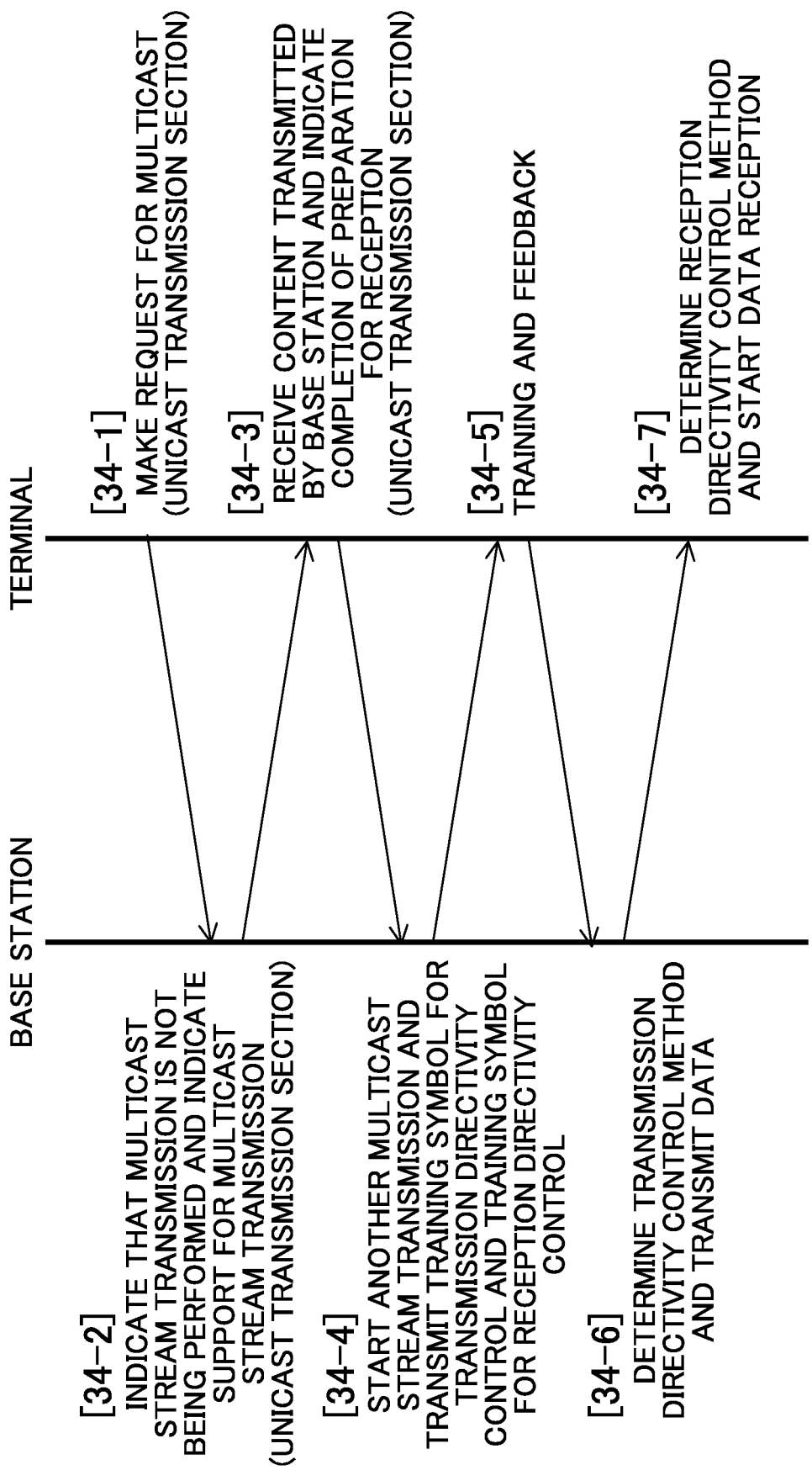
FIG. 34 illustrates a procedure for performing communication between the base station and the terminal.

FIG. 34 illustrates an example of an operation in which the base station transmits multicast transmission beams to two terminals (terminals 2202-1 and 2202-2) as illustrated in FIG. 29 and, further, new terminal 2202-3 requests, from the base station, addition of a transmission beam of another multicast stream (stream 2). Note that, the frame of a modulation signal transmitted by the base station is as illustrated in FIG. 31.

[34-1] Terminal 2202-3 makes a "request for multicast transmission of stream 2" to the base station. The "request for multicast transmission of stream 2" is transmitted in one of unicast transmission sections 2503 illustrated in FIG. 31.

[34-2] In response to the request indicated at above [34-1], the base station indicates to terminal 2202-3 that "multicast stream 2 is not being transmitted." In addition, the base station determines whether or not the base station can additionally transmit a transmission beam of multicast stream 2. In this case, considering the frame state as illustrated in FIG. 31, the base station indicates to terminal 2202-3 the "support for transmission of the transmission beam of multicast stream 2." The "indication that multicast stream 2 is not being transmitted" and the "indication that multicast stream 2 can be transmitted" are transmitted in one of unicast transmission sections 2503 illustrated in FIG. 31.

[34-3] In response to the indication indicated at above [34-2], terminal 2203-3 indicates to the base station "completion of preparation for receiving multicast stream 2." The indication of the "completion of preparation for receiving multicast stream 2" is transmitted in one of unicast transmission sections 2503 illustrated in FIG. 31.

[34-4] In response to the indication indicated at above [34-3], the base station determines to transmit the transmission beam of multicast stream 2. The base station then transmits to terminal 2202-3 a training symbol for transmission directivity control and a training symbol for reception directivity control in order to perform multicast transmission of stream 2. Note that the base station transmits the transmission beam of stream 1-1 and the transmission beam of stream 1-2 as in FIG. 31, separately from the transmission of the training symbols. A description will be given below in this respect.

[34-5] Terminal 2202-3 receives the training symbol for transmission directivity control and the training symbol for reception directivity control transmitted by the base station. Terminal 2202-3 then transmits feedback information to the base station in order for the base station to perform the transmission directivity control and for terminal 2202-3 to perform the reception directivity control.

[34-6] Based on the feedback information transmitted by terminal 2202-3, the base station determines a transmission directivity control method (for example, determines a weighting factor used for performing directivity control) and transmits data symbols of stream 2.

[34-7] Terminal 2202-3 determines a reception directivity control method (for example, determines a weighting factor used for performing directivity control) and starts receiving the data symbols of stream 2 transmitted by the base station.

Note that the "procedure for performing communication between the base station and the terminal" in FIG. 34 is an example, and the order of transmissions of information is not limited to that of FIG. 34. For example, it is possible to perform the same operation even when the order of transmissions of information is changed.

In addition, although the example in which the terminal performs the reception directivity control has been described with reference to FIG. 34, the terminal does not have to perform the reception directivity control. In this case, the base station does not have to transmit the training symbol for reception directivity control, and the terminal does not have to determine the reception directivity control method in FIG. 34.

In the case where the base station performs transmission directivity control and the base station has the configuration of FIG. 1, multiplication factors of multipliers 204-1, 204-2, 204-3, and 204-4 in FIG. 2 may be set, for example.

In the case where terminals 2202-1, 2202-2, and 2202-3 perform reception directivity control and the terminal has the configuration of FIG. 4, multiplication factors of multipliers 503-1, 503-2, 503-3, and 503-4 in FIG. 5 may be set, for example. In the case where the terminal has the configuration of FIG. 6, multiplication factors of multipliers 603-1, 603-2, . . . , and 603-L may be set, for example.

Figure 35:
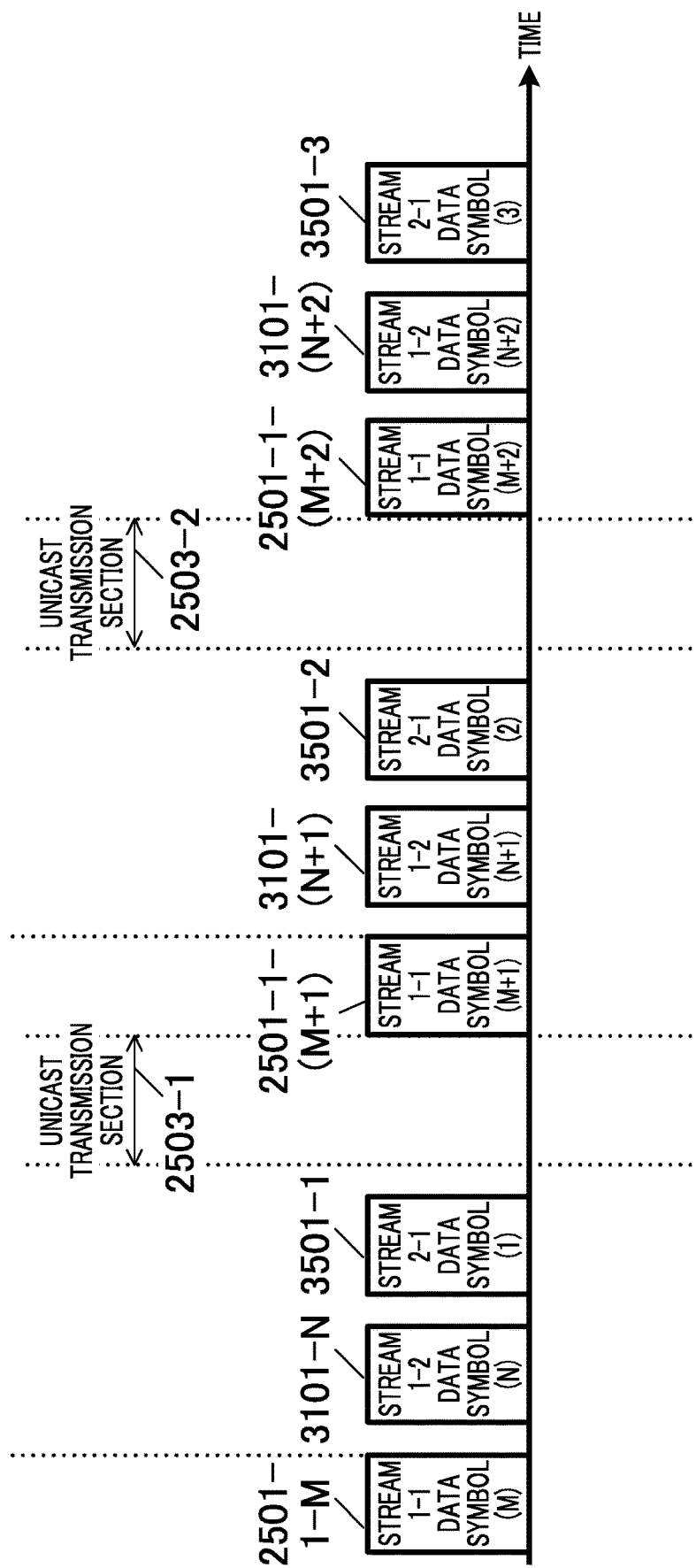
FIG. 35 illustrates an example of symbols transmitted by the base station.

FIG. 35 is an example of symbols transmitted by the base station when the base station transmits the data symbols of stream 1 and stream 2 after the communication between the base station and the terminal in FIG. 34 is completed. In FIG. 35, the horizontal axis represents the time direction.

Since "stream 1-1" and "stream 1-2" illustrated in FIG. 31 exist, there are "(multicast) stream 1-1 data symbol (M)" 2501-1-M, "(multicast) stream 1-1 data symbol (M+1)" 2501-1-(M+1), and "(multicast) stream 1-1 data symbol (M+2)" 2501-1-(M+2) in FIG. 35. Further, there are "(multicast) stream 1-2 data symbol (N)" 3101-N, "(multicast) stream 1-2 data symbol (N+1)" 3101-(N+1), and "(multicast) stream 1-2 data symbol (N+2)" 3101-(N+2). Note that, N and M are an integer equal to or greater than 2.

As illustrated in FIG. 35, there are "(multicast) stream 2-1 data symbol (1)" 3501-1, "(multicast) stream 2-1 data symbol (2)" 3501-2, and "(multicast) stream 2-1 data symbol (3)" 3501-3 in sections other than unicast transmission sections 2503-1 and 2503-2.

Similarly to the symbols described above, the symbols illustrated in FIG. 35 are configured as follows.

The "(multicast) stream 1-1 data symbol (M)" 2501-1-M, "(multicast) stream 1-1 data symbol (M+1)" 2501-1-(M+1), "(multicast) stream 1-1 data symbol (M+2)" 2501-1-(M+2), "(multicast) stream 1-2 data symbol (N)" 3101-N, "(multicast) stream 1-2 data symbol (N+1)" 3101-(N+1), and "(multicast) stream 1-2 data symbol (N+2)" 3101-(N+2) are data symbols for transmitting "stream 1."

The terminal obtains the "data symbols of stream 1-1" to obtain the "data of stream 1." The terminal also obtains the "data symbols of stream 1-2" to obtain the "data of stream 1."

The directivities of the transmission beams of "(multicast) stream 1-1 data symbol (M)" 2501-1-M, "(multicast) stream 1-1 data symbol (M+1)" 2501-1-(M+1), "(multicast) stream 1-1 data symbol (M+2)" 2501-1-(M+2) are different from the directivities of the transmission beams of and "(multicast) stream 1-2 data symbol (1)" 3101-1, "(multicast) stream 1-2 data symbol (2)" 3101-2, and "(multicast) stream 1-2 data symbol (3)" 3101-3. Thus, a set of multiplication factors (or weighting factors) of the transmission apparatus of the base station used to generate the transmission beams of "(multicast) stream 1-1 data symbol (M)" 2501-1-M, "(multicast) stream 1-1 data symbol (M+1)" 2501-1-(M+1), "(multicast) stream 1-1 data symbol (M+2)" 2501-1-(M+2)

is different from a set of multiplication factors (or weighting factors) of the transmission apparatus of the base station used to generate the transmission beams of "(multicast) stream 1-2 data symbol (1)" 3101-1, "(multicast) stream 1-2 data symbol (2)" 3101-2, and "(multicast) stream 1-2 data symbol (3)" 3101-3.

The "(multicast) stream 2-1 data symbol (1)" 3501-1, "(multicast) stream 2-1 data symbol (2)" 3501-2, and "(multicast) stream 2-1 data symbol (3)" 3501-3 are data symbols for transmitting "stream 2."

The terminal obtains the data symbols of stream 2-1 to obtain the data of stream 2.

With the above configuration, the terminal can receive a plurality of multicast streams (stream 1 and stream 2) transmitted by the base station. At this time, the directivity control is performed through transmission and reception, so that, as an effect of the present embodiment, it is possible to broaden the area in which the multicast streams can be received. Moreover, the addition of a stream and/or the addition of a transmission beam are adaptively performed, so that, as an effect of the present embodiment, it is possible to effectively utilize the frequency resource, time resource, and/or spatial resource for transmitting data.

Note that, such control as described below may also be performed. Details of the control are as follows.

FIG. 32 is the "example of symbols transmitted by a base station when the base station transmits data symbols (of stream 1)," which is an example different from that in FIG. 35. In FIG. 32, the horizontal axis represents the time direction. Note that, components in FIG. 32 that operate in the same manner as those in FIG. 25 or 31 are provided with the same reference numerals.

FIG. 32 differs from FIG. 35 in that unicast transmission sections 2503-1 and 2503-2 are set longer in time, so that the base station does not add and transmit a further multicast symbol (e.g., a symbol of a new stream).

Figure 36:
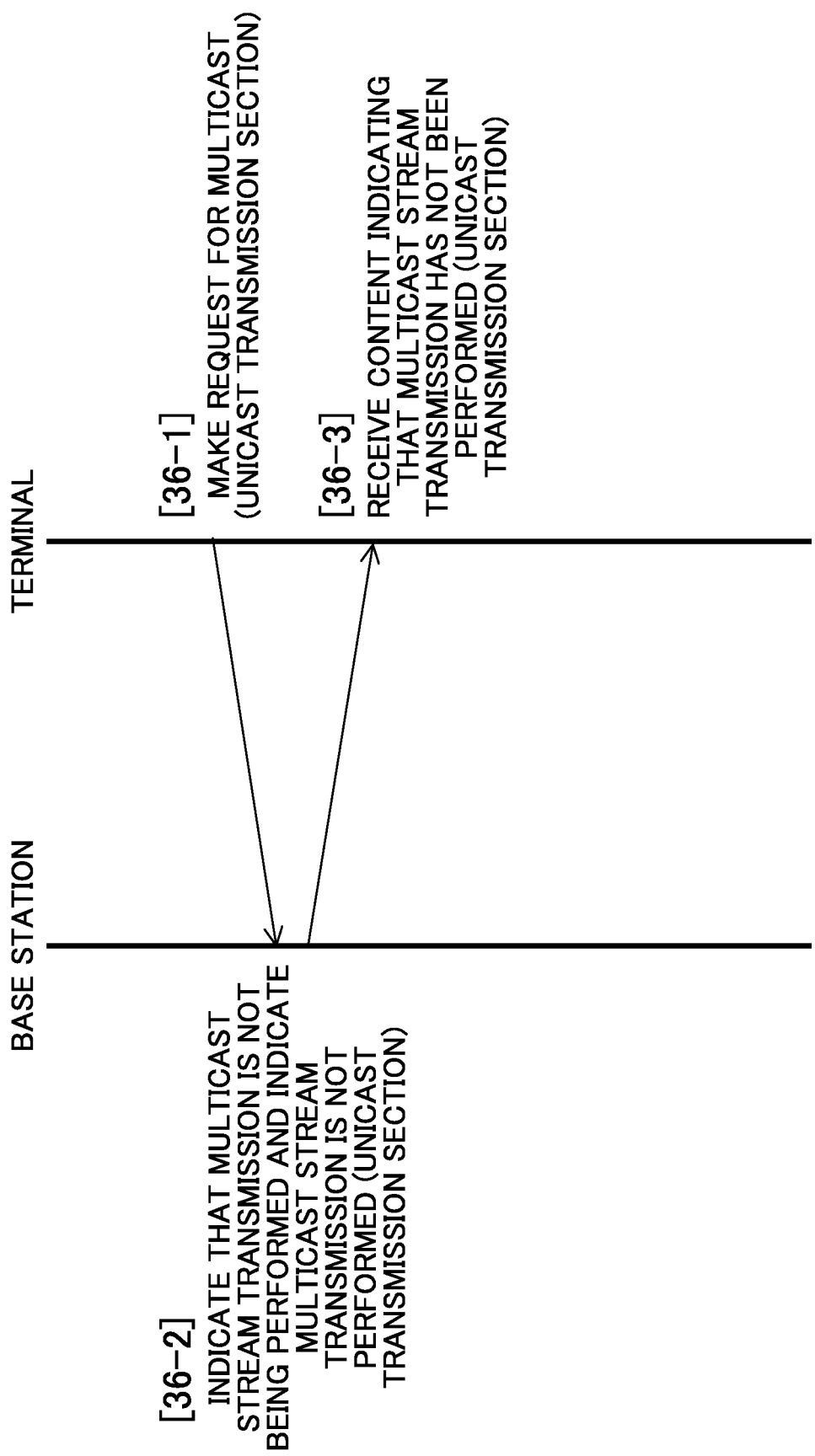
FIG. 36 illustrates a procedure for performing communication between the base station and the terminal.

FIG. 36 illustrates an example of an operation in which the base station transmits multicast transmission beams to two terminals (terminals 2202-1 and 2202-2) as illustrated in FIG. 29 and, further, new terminal 2202-3 requests, from the base station, addition of a transmission beam of another multicast stream (stream 2). Note that, the frame of a modulation signal transmitted by the base station is illustrated in FIG. 32.

[36-1] Terminal 2202-3 makes a "request for multicast transmission of stream 2" to the base station. The "request for multicast transmission of stream 2" is transmitted in one of the unicast transmission sections illustrated in FIG. 32.

[36-2] In response to the request indicated at above [36-1], the base station indicates to terminal 2202-3 that "multicast stream 2 is not being transmitted." The indication "multicast stream 2 is not being transmitted" is transmitted in one of the unicast transmission sections illustrated in FIG. 32. In addition, the base station determines whether or not the transmission beam of multicast stream 2 can be transmitted. Considering the frame illustrated in FIG. 32, the base station determines not to transmit the transmission beam of multicast stream 2. Accordingly, the base station indicates to terminal 2202-3 that "the transmission beam of multicast stream 2 is not transmitted." Note that, the "indication of not transmitting the transmission beam of multicast stream 2" is transmitted in one of the unicast transmission sections illustrated in FIG. 32.

[36-3] Terminal 2202-3 receives the "indication of not transmitting the transmission beam of multicast stream 2."

Note that the "procedure for performing communication between the base station and the terminal" in FIG. 36 is an example, and the order of transmissions of information is not limited to that of FIG. 36. For example, it is possible to perform the same operation even when the procedure of transmissions is changed. As in this example, when communication resources for multicast transmission are insufficient, addition of a stream and/or addition of a multicast transmission beam do not have to be performed.

Note that, a supplementary description will be given of a method of setting unicast transmission sections 2503-1 and 2503-2 illustrated in FIG. 35 and the like.

For example, in FIG. 35, the maximum number of multicast transmission beams is determined or set in advance.

Then, in response to requests by terminals, the base station transmits multicast transmission beams, the number of which is equal to or less than the maximum number of multicast transmission beams. For example, in the case of FIG. 35, the number of multicast transmission beams is 3. Then, the base station transmits a plurality of multicast transmission beams, and determines, as a unicast transmission section, a temporally idle time after the transmission of each of the plurality of transmission beams.

The unicast transmission sections may be defined as described above.

(Supplement 1)

Supplement 1 describes a case where the base station performs unicast communication (that is, specific communication) with a plurality of terminals.

For example, #1 symbol group 901-1 of stream 1, #2 symbol group 901-2 of stream 1, and #3 symbol group 901-3 of stream 1 in FIG. 9 may be control information broadcast by the base station to a plurality of terminals in order for the base station to perform data communication with the plurality of terminals. That is, these symbol groups may be information on a broadcast channel. Note that, the control information is information that can be used, for example, to realize data communication between the base station and the terminal.

For example, #1 symbol group 901-1 of stream 1, #2 symbol group 901-2 of stream 1, and #3 symbol group 901-3 of stream 1 in FIG. 9 may be common search spaces. Note that the common search spaces are control information for performing cell control. Note also that the common search spaces are control information to be broadcast to a plurality of terminals.

For example, #1 symbol group 902-1 of stream 2, #2 symbol group 902-2 of stream 2, and #3 symbol group 902-3 of stream 2 in FIG. 9 may be control information broadcast by the base station to a plurality of terminals in order for the base station to perform data communication with the plurality of terminals. That is, these symbol groups may be broadcast channel information.

For example, #1 symbol group 902-1 of stream 2, #2 symbol group 902-2 of stream 2, and #3 symbol group 902-3 of stream 2 in FIG. 9 may be common search spaces.

The #1 symbol group 901-1 of stream 1, #2 symbol group 901-2 of stream 1, and #3 symbol group 901-3 of stream 1, #1 symbol group 902-1 of stream 2, #2 symbol group 902-2 of stream 2, and #3 symbol group 902-3 of stream 2 in FIG. 9 are the same as those described in relation to the previous embodiments and, therefore, the descriptions thereof are omitted.

For example, #1 symbol group 1401-1 of modulation signal 1, #2 symbol group 1401-2 of modulation signal 1, and #3 symbol group 1401-3 of modulation signal 1 in FIG. 14 may be control information broadcast by the base station to a plurality of terminals in order for the base station to perform data communication with the plurality of terminals. That is, these symbol groups may be broadcast channel information.

For example, #1 symbol group 1401-1 of modulation signal 1, #2 symbol group 1401-2 of modulation signal 1, and #3 symbol group 1401-3 of modulation signal 1 in FIG. 14 may be common search spaces.

For example, #1 symbol group 1402-1 of modulation signal 2, #2 symbol group 1402-2 of modulation signal 2, and #3 symbol group 1402-3 of modulation signal 2 in FIG. 14 may be control information broadcast by the base station to a plurality of terminals in order for the base station to perform data communication with the plurality of terminals. That is, these symbol groups may be broadcast channel information.

For example, #1 symbol group 1402-1 of modulation signal 2, #2 symbol group 1402-2 of modulation signal 2, and #3 symbol group 1402-3 of modulation signal 2 in FIG. 14 may be common search spaces.

The #1 symbol group 1401-1 of modulation signal 1, #2 symbol group 1401-2 of modulation signal 1, and #3 symbol group 1401-3 of modulation signal 1 in FIG. 14 are as described in relation to the previous embodiments. The #1 symbol group 1402-1 of modulation signal 2, #2 symbol group 1402-2 of modulation signal 2, and #3 symbol group 1402-3 of modulation signal 2 in FIG. 14 are as described in relation to the previous embodiments.

For example, stream 1-1 data symbol (1) 2501-1-1, stream 1-1 data symbol (2) 2501-1-2, and stream 1-1 data symbol (3) 2501-1-3 in FIG. 25 may be control information broadcast by the base station to a plurality of terminals in order for the base station to perform data communication with the plurality of terminals. That is, these symbols may be broadcast channel information.

For example, stream 1-1 data symbol (1) 2501-1-1, stream 1-1 data symbol (2) 2501-1-2, and stream 1-1 data symbol (3) 2501-1-3 in FIG. 25 may be common search spaces.

Note that, stream 1-1 data symbol (1) 2501-1-1, stream 1-1 data symbol (2) 2501-1-2, and stream 1-1 data symbol (3) 2501-1-3 in FIG. 25 are as described in relation to the previous embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be control information broadcast by the base station to a plurality terminals in order for the base station to perform data communication with the plurality of terminals. That is, these symbols may be broadcast channel information.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be common search spaces.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in relation to the previous embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be control information broadcast by the base station to a plurality of terminals in order for the base station to perform data communication with the plurality of terminals. That is, these symbols may be broadcast channel information.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be common search spaces.

For example, stream 2-1 data symbol (1) 3501-1, stream 2-1 data symbol (2) 3501-2, and stream 2-1 data symbol (3) 3501-3 in FIG. 35 may be control information broadcast by the base station to a plurality of terminals in order for the base station to perform data communication with the plurality of terminals. That is, these symbols may be broadcast channel information.

For example, stream 2-1 data symbol (1) 3501-1, stream 2-1 data symbol (2) 3501-2, and stream 2-1 data symbol (3) 3501-3 in FIG. 35 may be common search spaces.

Note that, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) are as described in relation to the previous embodiments. The stream 2-1 data symbol (1) 3501-1, stream 2-1 data symbol (2) 3501-2, and stream 2-1 data symbol (3) 3501-3 in FIG. 35 are as described in relation to the previous embodiments.

In FIGS. 9, 14, 25, 31, 32, and 35, a single-carrier transmission method or a multi-carrier transmission scheme such as OFDM may be used for transmission of data symbols. In addition, the temporal positions of the data symbols are not limited to those illustrated in FIGS. 9, 14, 25, 31, 32, and 35.

Although the descriptions with reference to FIGS. 25, 31, 32, and 35 have been given in which the horizontal axis represents the time direction, the same implementation is possible even when the horizontal axis represents a frequency (carrier) direction. Note that, when the horizontal axis represents the frequency (carrier) direction, the base station transmits each of the data symbols using one or more carriers or subcarriers.

(Supplement 2)

Supplement 2 describes a case where the base station performs unicast communication (that is, specific communication) with a plurality of terminals.

For example, #1 symbol group 901-1 of stream 1, #2 symbol group 901-2 of stream 1, #3 symbol group 901-3 of stream 1, #1 symbol group 902-1 of stream 2, #2 symbol group 902-2 of stream 2, and #3 symbol group 902-3 of stream 2 in FIG. 9 may be data to a base station or may be data addressed to any of a plurality of terminals performing communication. In this case, control information may be included in the data.

Note that, #1 symbol group 901-1 of stream 1, #2 symbol group 901-2 of stream 1, #3 symbol group 901-3 of stream 1, #1 symbol group 902-1 of stream 2, #2 symbol group 902-2 of stream 2, and #3 symbol group 902-3 of stream 2 in FIG. 9 are as described in relation to the previous embodiments.

For example, #1 symbol group 1401-1 of modulation signal 1, #2 symbol group 1401-2 of modulation signal 1, #3 symbol group 1401-3 of modulation signal 1, #1 symbol group 1402-1 of modulation signal 2, #2 symbol group 1402-2 of modulation signal 2, and #3 symbol group 1402-3 of modulation signal 2 in FIG. 14 may be data addressed to the base station or may be data addressed to any of the plurality of terminals performing communication. In this case, control information may be included in the data.

Note that, #1 symbol group 1401-1 of modulation signal 1, #2 symbol group 1401-2 of modulation signal 1, #3 symbol group 1401-3 of modulation signal 1, #1 symbol group 1402-1 of modulation signal 2, #2 symbol group 1402-2 of modulation signal 2, and #3 symbol group 1402-3 of modulation signal 2 in FIG. 14 are as described in relation to the previous embodiments.

For example, stream 1-1 data symbol (1) 2501-1-1, stream 1-1 data symbol (2) 2501-1-2, and stream 1-1 data symbol (3) 2501-1-3 in FIG. 25 may be data to the base station or may be data addressed to any of the plurality of terminals performing communication. In this case, control information may be included in the data.

Note that, stream 1-1 data symbol (1) 2501-1-1, stream 1-1 data symbol (2) 2501-1-2, and stream 1-1 data symbol (3) 2501-1-3 in FIG. 25 are as described in relation to the previous embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be data addressed to the base station or may be data addressed to any of the plurality of terminals performing communication. In this case, control information may be included in the data.

Note that, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in relation to the previous embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be data addressed to the base station or may be data addressed to any of the plurality of terminals performing communication. In this case, control information may be included in the data.

For example, stream 2-1 data symbol (1) 3501-1, stream 2-1 data symbol (2) 3501-2, and stream 2-1 data symbol (3) 3501-3 in FIG. 35 may be data addressed to the base station or may be data addressed to any of the plurality of terminals performing communication. In this case, control information may be included in the data.

Note that, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-N+1, stream 1-2 data symbol (N+2) 3101-N+2, stream 2-1 data symbol (1) 3501-1, stream 2-1 data symbol (2) 3501-2, and stream 2-1 data symbol (3) 3501-3 are as described in relation to the previous embodiments.

In FIGS. 9, 14, 25, 31, 32, and 35, a single-carrier transmission method or a multi-carrier transmission scheme such as OFDM may be used for transmission of data symbols. In addition, the temporal positions of the data symbols are not limited to those illustrated in FIGS. 9, 14, 25, 31, 32, and 35.

Although the descriptions with reference to FIGS. 25, 31, 32, and 35 have been given in which the horizontal axis represents the time direction, the same implementation is possible even when the horizontal axis represents a frequency (carrier) direction. Note that, when the horizontal axis represents the frequency (carrier) direction, the base station transmits each of the data symbols using one or more carriers or subcarriers.

(Supplement 3)

The base station may transmit another symbol group using another transmission beam different from "the transmission beam of #1 symbol group 901-1 of stream 1, the transmission beam of #2 symbol group 901-2 of stream 1, the transmission beam of #3 symbol group 901-3 of stream 1, the transmission beam of #1 symbol group 902-1 of stream 2, the transmission beam of #2 symbol group 902-2 of stream 2, or the transmission beam of #3 symbol group 902-3 of stream 2" during a time period of transmitting #1 symbol group 901-1 of stream 1, #2 symbol group 901-2 of stream 1, #3 symbol group 901-3 of stream 1, #1 symbol group 902-1 of stream 2, #2 symbol group 902-2 of stream 2, or #3 symbol group 902-3 of stream 2 as in the frame configuration of FIG. 9.

In addition, the base station of FIG. 3 may generate a transmission beam for the above-described "other symbol group" through the "signal processing by signal processor 102 and the signal processing by weighting combiner 301" or through the "signal processing by signal processor 102 or the signal processing by weighting combiner 301."

The base station may also transmit another symbol group using another transmission beam different from "the transmission beam of #1 symbol group 1401-1 of modulation signal 1, the transmission beam of #2 symbol group 1401-2 of modulation signal 1, the transmission beam of #3 symbol group 1401-3 of modulation signal 1, the transmission beam of #1 symbol group 1402-1 of modulation signal 2, the transmission beam of #2 symbol group 1402-2 of modulation signal 2, or the transmission beam of #3 symbol group 1402-3 of modulation signal 2" during a time period of transmitting #1 symbol group 1401-1 of modulation signal 1, #2 symbol group 1401-2 of modulation signal 1, #3 symbol group 1401-3 of modulation signal 1, #1 symbol group 1402-1 of modulation signal 2, #2 symbol group 1402-2 of modulation signal 2, or #3 symbol group 1402-3 of modulation signal 2 as in the frame configuration of FIG. 14.

In this case, the "other symbol group" may be a symbol group including data symbols addressed to a certain terminal, a symbol group including a control information symbol group as described in other portions of the present disclosure, or a symbol group including other multicast data symbols.

In addition, the base station of FIG. 3 may generate a transmission beam for the above-described "other symbol group" through the "signal processing by signal processor 102 and the signal processing by weighting combiner 301" or through the "signal processing by signal processor 102 or the signal processing by weighting combiner 301."

(Supplement 4)

For example, the base station may transmit another symbol group using another transmission beam different from the "transmission beam for transmitting stream 1-1 data symbol (1) 2501-1-1, stream 1-1 data symbol (2) 2501-1-2, or stream 1-1 data symbol (3) 2501-1-3" during a time period of transmitting stream 1-1 data symbol (1) 2501-1-1, stream 1-1 data symbol (2) 2501-1-2, or stream 1-1 data symbol (3) 2501-1-3 as in the frame configuration of FIG. 25.

Note that, the same applies to the case where the horizontal axis represents the frequency direction in FIG. 25. For example, the base station may transmit another symbol group using another transmission beam different from the "transmission beam for transmitting stream 1-1 data symbol (1) 2501-1-1, stream 1-1 data symbol (2) 2501-1-2, or stream 1-1 data symbol (3) 2501-1-3" during a time period of transmitting stream 1-1 data symbol (1) 2501-1-1, stream 1-1 data symbol (2) 2501-1-2, or stream 1-1 data symbol (3) 2501-1-3.

For example, the base station may transmit another symbol group using another transmission beam different from the "transmission beam for transmitting stream 1-1 data symbol (M) 2501-1-M, stream 1-1 data symbol (M+1) 2501-1-(M+1), or stream 1-1 data symbol (M+2) 2501-1-(M+2)" during a time period of transmitting stream 1-1 data symbol (M) 2501-1-M, stream 1-1 data symbol (M+1) 2501-1-(M+1), or stream 1-1 data symbol (M+2) 2501-1-(M+2) as in the frame configuration of FIGS. 31 and 32.

Note that, the same applies to the case where the horizontal axis represents the frequency direction in FIGS. 31 and 32. For example, the base station may transmit another symbol group using another transmission beam different from the "transmission beam for transmitting stream 1-1 data symbol (M) 2501-1-M, stream 1-1 data symbol (M+1) 2501-1-(M+1), or stream 1-1 data symbol (M+2) 2501-1-(M+2)" during a time period of transmitting stream 1-1 data symbol (M) 2501-1-M, stream 1-1 data symbol (M+1) 2501-1-(M+1), or stream 1-1 data symbol (M+2) 2501-1-(M+2).

For example, the base station may transmit another symbol group using another transmission beam different from the "transmission beam for transmitting stream 1-2 data symbol (1) 3101-1, stream 1-2 data symbol (2) 3101-2, or stream 1-2 data symbol (3) 3101-3" during a time period of transmitting stream 1-2 data symbol (1) 3101-1, stream 1-2 data symbol (2) 3101-2, or stream 1-2 data symbol (3) 3101-3 as in the frame configuration of FIGS. 31 and 32.

Note that, the same applies to the case where the horizontal axis represents the frequency direction in FIGS. 31 and 32. For example, the base station may transmit another symbol group using another transmission beam different from the "transmission beam for transmitting stream 1-2 data symbol (1) 3101-1, stream 1-2 data symbol (2) 3101-2, or stream 1-2 data symbol (3) 3101-3" during a time period of transmitting stream 1-2 data symbol (1) 3101-1, stream 1-2 data symbol (2) 3101-2, or stream 1-2 data symbol (3) 3101-3.

For example, the base station may transmit another symbol group using another transmission beam different from the "transmission beam for transmitting stream 1-1 data symbol (M) 2501-1-M, stream 1-1 data symbol (M+1) 2501-1-(M+1), or stream 1-1 data symbol (M+2) 2501-1-(M+2)" during a time period of transmitting stream 1-1 data symbol (M) 2501-1-M, stream 1-1 data symbol (M+1) 2501-1-(M+1), or stream 1-1 data symbol (M+2) 2501-1-(M+2) as in the frame configuration of FIG. 35.

Note that, the same applies to the case where the horizontal axis represents the frequency direction in FIG. 35. For example, the base station may transmit another symbol group using another transmission beam different from the "transmission beam for transmitting stream 1-1 data symbol (M) 2501-1-M, stream 1-1 data symbol (M+1) 2501-1-(M+1), or stream 1-1 data symbol (M+2) 2501-1-(M+2)" during a time period of transmitting stream 1-1 data symbol (M) 2501-1-M, stream 1-1 data symbol (M+1) 2501-1-(M+1), or stream 1-1 data symbol (M+2) 2501-1-(M+2).

For example, the base station may transmit another symbol group using another transmission beam different from the "transmission beam for transmitting stream 1-2 data symbol (N) 3101-N, stream 1-2 data symbol (N+1) 3101-(N+1), or stream 1-2 data symbol (N+2) 3101-(N+2)" during a time period of transmitting stream 1-2 data symbol (N) 3101-N, stream 1-2 data symbol (N+1) 3101-(N+1), or stream 1-2 data symbol (N+2) 3101-(N+2) as in the frame configuration of FIG. 35.

Note that, the same applies to the case where the horizontal axis represents the frequency direction in FIG. 35. For example, the base station may transmit another symbol group using another transmission beam different from the "transmission beam for transmitting stream 1-2 data symbol (N) 3101-N, stream 1-2 data symbol (N+1) 3101-(N+1), or stream 1-2 data symbol (N+2) 3101-(N+2)" during a time period of transmitting stream 1-2 data symbol (N) 3101-N, stream 1-2 data symbol (N+1) 3101-(N+1), or stream 1-2 data symbol (N+2) 3101-(N+2).

For example, the base station may transmit another symbol group using another transmission beam different from the "transmission beam for transmitting stream 2-1 data symbol (1) 3501-1, stream 2-1 data symbol (2) 3501-2, or stream 2-1 data symbol (3) 3501-3" during a time period of transmitting stream 2-1 data symbol (1) 3501-1, stream 2-1 data symbol (2) 3501-2, or stream 2-1 data symbol (3) 3501-3 as in the frame configuration of FIG. 35.

Note that, the same applies to the case where the horizontal axis represents the frequency direction in FIG. 35. For example, the base station may transmit another symbol group using another transmission beam different from the "transmission beam for transmitting stream 2-1 data symbol (1) 3501-1, stream 2-1 data symbol (2) 3501-2, or stream 2-1 data symbol (3) 3501-3" during a time period of transmitting stream 2-1 data symbol (1) 3501-1, stream 2-1 data symbol (2) 3501-2, or stream 2-1 data symbol (3) 3501-3.

In the above description, the "other symbol group" may be a symbol group including data symbols addressed to a certain terminal, a symbol group including a control information symbol group as described in other portions of the present specification, or a symbol group including other multicast data symbols.

In this case, the base station of FIG. 1 may generate a transmission beam for the above-described "other symbol group" through the signal processing by signal processor 102. Alternatively, the base station of FIG. 1 may generate the transmission beam for the above-described "other symbol group" by selecting one of antenna sections 106-1 to 106-M.

In addition, the base station of FIG. 3 may generate a transmission beam for the above-described "other symbol group" through the "signal processing by signal processor 102 and the signal processing by weighting combiner 301" or through the "signal processing by signal processor 102 or the signal processing by weighting combiner 301."

In addition, unicast transmission sections 2503-1 and 2503-2 as described in FIGS. 25, 31, 32, and 35 do not have to be set.

(Supplement 5)

The descriptions in relation to FIGS. 31 and 32 are as follows.

The "(multicast) stream 1-1 data symbol (M)" 2501-1-M, "(multicast) stream 1-1 data symbol (M+1)" 2501-1-(M+1), "(multicast) stream 1-1 data symbol (M+2)" 2501-1-(M+2), "(multicast) stream 1-2 data symbol (1)" 3101-1, "(multicast) stream 1-2 data symbol (2)" 3101-2, and "(multicast) 1-2 data symbol (3)" 3101-3 are data symbols for transmitting "stream 1."

The terminal obtains the "data symbols of stream 1-1" to obtain the "data of stream 1." The terminal also obtains the "data symbols of stream 1-2" to obtain the "data of stream 1."

In addition, the description in relation to FIG. 35 is as follows.

The "(multicast) stream 1-1 data symbol (M)" 2501-1-M, "(multicast) stream 1-1 data symbol (M+1)" 2501-1-(M+1), "(multicast) stream 1-1 data symbol (M+2)" 2501-1-(M+2), "(multicast) stream 1-2 data symbol (N)" 3101-N, "(multicast) stream 1-2 data symbol (N+1)" 3101-(N+1), and "(multicast) stream 1-2 data symbol (N+2)" 3101-(N+2) are data symbols for transmitting "stream 1."

The terminal obtains the "data symbols of stream 1-1" to obtain the "data of stream 1." The terminal also obtains the "data symbols of stream 1-2" to obtain the "data of stream 1."

In the following, a supplementary description will be given of the above-mentioned contents. For example, in FIG. 35, the above can be realized through following <method 1-1 >, <method 1-2 >, <method 2-1 >, or <method 2-2 >.

<Method 1-1>

Stream 1-1 data symbol (M) 2501-1-M and stream 1-2 data symbol (N) 3101-N contain the same data. Stream 1-1 data symbol (M+1) 2501-1-(M+1) and stream 1-2 data symbol (N+1) 3101-(N+1) contain the same data. Stream 1-1 data symbol (M+2) 2501-1-(M+2) and stream 1-2 data symbol (N+2) 3101-(N+2) contain the same data.

<Method 1-2>

Stream 1-2 data symbol (L) 3101-L containing the same data as the data contained in stream 1-1 data symbol (K) 2501-1-K is present. Note that, "K" and "L" are integers.

<Method 2-1>

Data contained in stream 1-1 data symbol (M) 2501-1-M is partly the same as data contained in stream 1-2 data symbol (N) 3101-N. Data contained in stream 1-1 data symbol (M+1) 2501-1-(M+1) is partly the same as data contained in stream 1-2 data symbol (N+1) 3101-(N+1). Data contained in stream 1-1 data symbol (M+2) 2501-1-(M+2) is partly the same as data contained in stream 1-2 data symbol (N+2) 3101-(N+2).

<Method 2-2>

Stream 1-2 data symbol (L) 3101-L containing part of the data contained in stream 1-1 data symbol (K) 2501-1-K is present. Note that, "K" and "L" are integers.

That is, a first base station or a first transmission system generates a first packet group including data of a first stream and a second packet group including data of the first stream, transmits a packet included in the first packet group in a first period using a first transmission beam, and transmits a packet included in the second packet group in a second period using a second transmission beam different from the first transmission beam, and the first period and the second period do not overlap with each other.

Here, the second packet group may include a second packet including data the same as data contained in a first packet included in the first packet group. Alternatively, as another configuration different from the above, the second packet group may include a third packet including data the same as a part of data contained in the first packet included in the first packet group.

Further, the first transmission beam and the second transmission beam may be transmission beams transmitted using the same antenna section and having directivities different from each other, or may be transmission beams transmitted using antenna sections different from each other.

In addition to the configuration of the first base station or the first transmission system, a second base station or a second transmission system further generates a third packet group including data of the first stream, and transmits a packet included in the third packet group in a third period using a third transmission beam different from the first transmission beam and the second transmission beam, and the third period does not overlap with the first period and the second period.

Here, the second base station or the second transmission system may repeatedly set the first period, the second period, and the third period in a predetermined order.

In addition to the configuration of the first base station or the first transmission system, a third base station or a third transmission system further generates a third packet group including data of the first stream, and transmits a packet included in the third packet group in a third period using a third transmission beam different from the first transmission beam and the second transmission beam, and at least part of the third period overlaps with the first period.

Here, the third base station or the third transmission system may repeatedly set the first period, the second period, and the third period, and a plurality of the third periods repeatedly set each may at least partly overlap with the first period, or none of the plurality of third periods repeatedly set may overlap with the first period.

Further, in addition to the configuration of the first base station or the first transmission system, a fourth base station or a fourth transmission system further generates a fourth packet including data of a second stream, and transmits the fourth packet in a fourth period using a fourth transmission beam different from the first transmission beam, and at least part of the fourth period overlaps with the first period.

Note that, although the first period and the second period do not overlap with each other in the above description, the first period and the second period may partly overlap with each other, an entirety of the first period may overlap with the second period, or the entirety of the first period may overlap with an entirety of the second period.

Further, a fifth base station or a fifth transmission system may generate one or more packet groups including data of the first stream, transmit the one or more packet groups using transmission beams different between the one or more packet groups, and increase or decrease, based on a signal transmitted from a terminal, the number of packet groups generated.

Note that although "stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3" in FIGS. 31 and 32 and "stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2)" in FIG. 35 have been described as "streams" above, they may be symbols including data symbols addressed to a certain terminal, symbols including control information symbols, or symbols including multicast data symbols as described in other parts of the present specification.

Embodiment 4

The present embodiment will be described in relation to specific examples of the communication systems described in relation to Embodiments 1 to 3.

A communication system in the present embodiment is configured with a (plurality of) base station(s) and a plurality of terminals, for example. For example, the communication system in FIGS. 7, 12, 17, 19, 20, 26, 29, or the like that is configured with base station 700 and terminals 704-1 and 704-2, and the like will be considered.

Figure 37:
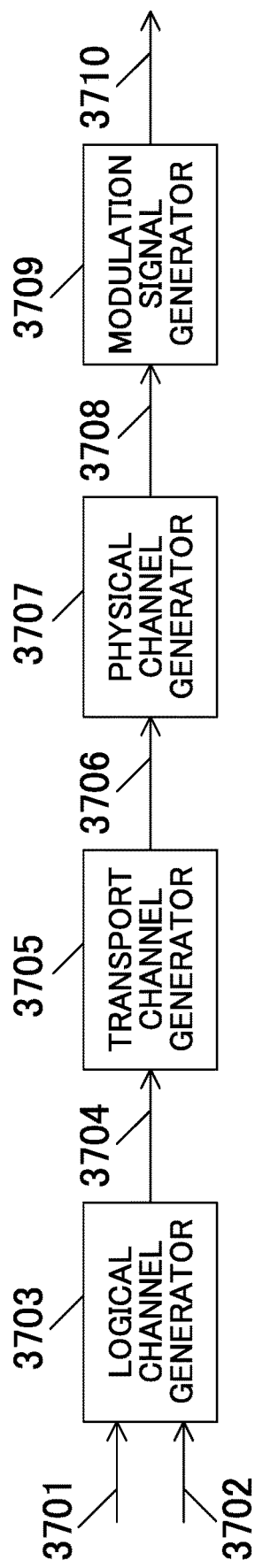
FIG. 37 illustrates an example of the configuration of the base station.

FIG. 37 illustrates an example of the configuration of base station (700).

Data 3701 and control data 3702 are input to logical channel generator 3703, and the logical channel generator outputs logical channel signal 3704. Logical channel signal 3704 is composed, for example, of a "Broadcast Control Channel (BCCH)," "Paging Control Channel (PCCH)," "Common Control Channel (CCCH)," "Multicast Control Channel (MCCH)," and/or "Dedicated Control Channel (DCCH)," which are logical control channels, "Dedicated Traffic Channel (DTCH)" and/or "Multicast Traffic Channel (MTCH)," which are logical data channels, and/or the like.

The "BCCH" is a downlink channel for broadcasting system control information. The "PCCH" is a downlink paging information channel. The "CCCH" is a common control channel used when there is no downlink Radio Resource Control (RRC) connection. The "MCCH" is a downlink control channel for multicast channel scheduling for one-to-many Multimedia Broadcast Multicast Service (MBMS). The "DCCH" is a downlink dedicated control channel used for a terminal with RRC connection. The "DTCH" is a downlink dedicated traffic channel for single terminal UE (User Equipment), which is dedicated to user data. The "MTCH" is a downlink one-to-many MBMS user-data channel.

Logical channel signal 3704 is input to transport channel generator 3705, and the transport channel generator generates and outputs transport channel signal 3706. Transport channel signal 3706 is composed, for example, of a Broadcast Channel (BCH), Downlink Shared Channel (DL-SCH), Paging Channel (PCH), Multicast Channel (MCH), and/or the like.

The "BCH" is a channel for system information broadcast over an entire cell. The "DL-SCH" is a channel for user data, control information, and system information. The "PCH" is a channel for paging information broadcast over the entire cell. The "MCH" is a channel for an MBMS traffic broadcast over the entire cell and for control.

Transport channel signal 3706 is input to physical channel generator 3707, and the physical channel generator generates and outputs physical channel signal 3708. Physical channel signal 3708 is composed, for example, of a Physical Broadcast Channel (PBCH), Physical Multicast Channel (PMCH), Physical Downlink Shared Channel (PDSCH), Physical Downlink Control Channel (PDCCH), and/or the like.

The "PBCH" is for transmission of a BCH transport channel. The "PMCH" is for transmission of a MCH transport channel. The "PDSCH" is for transmission of a DL-SCH and transport channel. The "PDCCH" is for transmission of a downlink L1 (Layer 1)/L2 (Layer 2) control signal.

Physical channel signal 3708 is input to modulation signal generator 3709, and the modulation signal generator generates and outputs modulation signal 3710 based on physical channel signal 3708. Then, base station 700 transmits modulation signal 3710 as a radio wave.

To begin with, a case where the base station performs unicast communication, i.e., specific communication, with a plurality of terminals is considered.

In this case, for example, symbol group #1 of stream 1 (901-1), symbol group #2 of stream 1 (901-2), and symbol group #3 of stream 1 (901-3) in FIG. 9 may be control information broadcast to a plurality of terminals in order for the base station to perform data communication with the plurality of terminals. That is, these symbol groups may be broadcast channel information. The control information is, for example, information that can be used to realize data communication between the base station and the terminals.

Here, a description will be given of the broadcast channel. The "PBCH," "PMCH," and "part of PD-SCH" of the physical channels (physical channel signal 3708) correspond to the broadcast channel.

In addition, the "BCH," "part of DL-SCH," "PCH," and "MCH" of the transport channels (transport channel signal 3706) correspond to the broadcast channel.

In addition, the "BCCH," "CCCH," "MCCH," "part of DTCH," and "MTCH" of the logical channels (logical channel signal 3704) correspond to the broadcast channel.

For example, symbol group #1 of stream 2 (902-1), symbol group #2 of stream 2 (902-2), and symbol group #3 of stream 2 (902-3) in FIG. 9 may be control information broadcast by the base station to a plurality of terminals in order for the base station to perform data communication with the plurality of terminals. That is, these symbol groups may be broadcast channel information. The control information is, for example, information that can be used to realize data communication between the base station and the terminals.

Note that, the "PBCH," "PMCH," and "part of PD-SCH" of the physical channels (physical channel signal 3708) correspond to the broadcast channel.

Note also that, the "BCH," "part of DL-SCH," "PCH," and "MCH" of the transport channels (transport channel signal 3706) correspond to the broadcast channel.

Note also that, the "BCCH," "CCCH," "MCCH," "part of DTCH," and "MTCH" of the logical channels (logical channel signal 3704) correspond to the broadcast channel.

In this case, symbol group #1 of stream 1 (901-1), symbol group #2 of stream 1 (901-2), and symbol group #3 of stream 1 (901-3) in FIG. 9 are as described in relation to the previous embodiments and, therefore, the descriptions thereof are omitted. Further symbol group #1 of stream 2 (902-1), symbol group #2 of stream 2 (902-2) and symbol group #3 of stream 2 (902-3) in FIG. 9 are as described in relation to the previous embodiments and, therefore, the descriptions thereof are omitted.

Note that there may be a case where streams 2 such as symbol group #1 of stream 2 (902-1), symbol group #2 of stream 2 (902-2), and/or symbol group #3 of stream 2 (902-3) in FIG. 9 are not transmitted. For example, when the base station transmits a signal of the broadcast channel, the base station does not have to transmit the symbol groups of stream 2. In this case, streams 703-1, 703-2, and 703-3 are not transmitted from base station 701 in the example of FIG. 7.

For example, symbol group #1 of modulation signal 1 (1401-1), symbol group #2 of modulation signal 1 (1401-2), and symbol group #3 of modulation signal 1 (1401-3) in FIG. 14 may be control information broadcast by the base station to a plurality of terminals in order for the base station to perform data communication with the plurality of terminals. That is, these symbol groups may be broadcast channel information. The control information is, for example, information that can be used to realize data communication between the base station and the terminals.

Note that, the "PBCH," "PMCH," and "part of PD-SCH" of the physical channels (physical channel signal 3708) correspond to the broadcast channel.

Note also that, the "BCH," "part of DL-SCH," "PCH," and "MCH" of the transport channels (transport channel signal 3706) correspond to the broadcast channel.

Note also that, the "BCCH," "CCCH," "MCCH," "part of DTCH," and "MTCH" of the logical channels (logical channel signal 3704) correspond to the broadcast channel.

For example, symbol group #1 of modulation signal 2 (1402-1), symbol group #2 of modulation signal 2 (1402-2), and symbol group #3 of modulation signal 2 (1402-3) in FIG. 14 may be control information broadcast by the base station to a plurality of terminals in order for the base station to perform data communication with the plurality of terminals. That is, these symbol groups may be broadcast channel information. Note that, the control information is information that can be used, for example, to realize data communication between the base station and the terminal.

Note that, the "PBCH," "PMCH," and "part of PD-SCH" of the physical channels (physical channel signal 3708) correspond to the broadcast channel.

Note also that, the "BCH," "part of DL-SCH," "PCH," and "MCH" of the transport channels (transport channel signal 3706) correspond to the broadcast channel.

Note also that, the "BCCH," "CCCH," "MCCH," "part of DTCH," and "MTCH" of the logical channels (logical channel signal 3704) correspond to the broadcast channel.

Note that, symbol group #1 of modulation signal 1 (1401-1), symbol group #2 of modulation signal 1 (1401-2), and symbol group #3 of modulation signal 1 (1401-3) in FIG. 14 are as described in relation to the previous embodiments and, therefore, the descriptions thereof are omitted. Symbol group #1 of modulation signal 2 (1402-1), symbol group #2 of modulation signal 2 (1402-2), and symbol group #3 of modulation signal 2 (1402-3) in FIG. 14 are as described in relation to the previous embodiments and, therefore, the descriptions thereof are omitted.

For example, stream 1-1 data symbol (1) (2501-1-1), stream 1-1 data symbol (2) (2501-1-2), and stream 1-1 data symbol (3) (2501-1-3) in FIG. 25 may be control information broadcast by the base station to a plurality of terminals in order for the base station to perform data communication with the plurality of terminals. That is, these symbols may be broadcast channel information. The control information is, for example, information that can be used to realize data communication between the base station and the terminals.

Note that, the "PBCH," "PMCH," and "part of PD-SCH" of the physical channels (physical channel signal 3708) correspond to the broadcast channel.

Note also that, the "BCH," "part of DL-SCH," "PCH," and "MCH" of the transport channels (transport channel signal 3706) correspond to the broadcast channel.

Note also that, the "BCCH," "CCCH," "MCCH," "part of DTCH," and "MTCH" of the logical channels (logical channel signal 3704) correspond to the broadcast channel.

Note that, stream 1-1 data symbol (1) (2501-1-1), stream 1-1 data symbol (2) (2501-1-2), and stream 1-1 data symbol (3) (2501-1-3) in FIG. 25 are as described in relation to the previous embodiments and, therefore, the descriptions thereof are omitted.

For example, stream 1-1 data symbol (M) (2501-1-M), stream 1-1 data symbol (M+1) (2501-1-(M+1)), stream 1-1 data symbol (M+2) (2501-1-(M+2)), stream 1-2 data symbol (1) (3101-1), stream 1-2 data symbol (2) (3101-2), and stream 1-2 data symbol (3) (3101-3) in FIGS. 31 and 32 may be control information broadcast by the base station to a plurality of terminals in order for the base station to perform data communication with the plurality of terminals. That is, these symbols may be broadcast channel information. The control information is, for example, information that can be used to realize data communication between the base station and the terminals.

Note that, the "PBCH," "PMCH," and "part of PD-SCH" of the physical channels (physical channel signal 3708) correspond to the broadcast channel.

Note also that, the "BCH," "part of DL-SCH," "PCH," and "MCH" of the transport channels (transport channel signal 3706) correspond to the broadcast channel.

Note also that, the "BCCH," "CCCH," "MCCH," "part of DTCH," and "MTCH" of the logical channels (logical channel signal 3704) correspond to the broadcast channel.

Note that stream 1-1 data symbol (M) (2501-1-M), stream 1-1 data symbol (M+1) (2501-1-(M+1)), stream 1-1 data symbol (M+2) (2501-1-(M+2)), stream 1-2 data symbol (1) (3101-1), stream 1-2 data symbol (2) (3101-2), and stream 1-2 data symbol (3) (3101-3) in FIGS. 31 and 32 are as described in relation to the previous embodiments and, therefore, the descriptions thereof are omitted.

For example, stream 1-1 data symbol (M) (2501-1-M), stream 1-1 data symbol (M+1) (2501-1-(M+1)), stream 1-1 data symbol (M+2) (2501-1-(M+2)), stream 1-2 data symbol (N) (3101-N), stream 1-2 data symbol (N+1) (3101-(N+1)), and stream 1-2 data symbol (N+2) (3101-(N+2)) in FIG. 35 may be control information broadcast by the base station to a plurality of terminals in order for the base station to perform data communication with the plurality of terminals. That is, these symbols may be broadcast channel information. The control information is, for example, information that can be used to realize data communication between the base station and the terminals.

Note that, the "PBCH," "PMCH," and "part of PD-SCH" of the physical channels (physical channel signal 3708) correspond to the broadcast channel.

Note also that, the "BCH," "part of DL-SCH," "PCH," and "MCH" of the transport channels (transport channel signal 3706) correspond to the broadcast channel.

Note also that, the "BCCH," "CCCH," "MCCH," "part of DTCH," and "MTCH" of the logical channels (logical channel signal 3704) correspond to the broadcast channel.

For example, stream 2-1 data symbol (1) (3501-1), stream 2-1 data symbol (2) (3501-2), and stream 2-1 data symbol (3) (3501-3) in FIG. 35 may be control information broadcast by the base station to a plurality of terminals in order for the base station to perform data communication with the plurality of terminals. That is, these symbols may be broadcast channel information. The control information is, for example, information that can be used to realize data communication between the base station and the terminals.

Note that, the "PBCH," "PMCH," and "part of PD-SCH" of the physical channels (physical channel signal 3708) correspond to the broadcast channel.

Note also that, the "BCH," "part of DL-SCH," "PCH," and "MCH" of the transport channels (transport channel signal 3706) correspond to the broadcast channel.

Note also that, the "BCCH," "CCCH," "MCCH," "part of DTCH," and "MTCH" of the logical channels (logical channel signal 3704) correspond to the broadcast channel.

Note that stream 1-1 data symbol (M) (2501-1-M), stream 1-1 data symbol (M+1) (2501-1-(M+1)), stream 1-1 data symbol (M+2) (2501-1-(M+2)), stream 1-2 data symbol (N) (3101-N), stream 1-2 data symbol (N+1) (3101-(N+1)), and stream 1-2 data symbol (N+2) (3101-(N+2)) in FIG. 35 are as described in relation to the previous embodiments and, therefore, the descriptions thereof are omitted. Stream 2-1 data symbol (1) (3501-1), stream 2-1 data symbol (2) (3501-2), and stream 2-1 data symbol (3) (3501-3) in FIG.

35 are as described in relation to the previous embodiments and, therefore, the descriptions thereof are omitted.

In FIGS. 9, 14, 25, 31, 32, and 35, a single-carrier transmission method or a multi-carrier transmission scheme such as OFDM may be used for transmission of data symbols. In addition, the temporal positions of the data symbols are not limited to those illustrated in FIGS. 9, 14, 25, 31, 32, and 35.

In addition, although the descriptions with reference to FIGS. 25, 31, 32, and 35 have been given in which the horizontal axis represents the time direction, the same implementation is possible even when the horizontal axis represents a frequency (carrier) direction. Note that, when the horizontal axis represents the frequency (carrier) direction, the base station transmits each of the data symbols using one or more carriers or subcarriers.

Note that, the symbol groups of stream 1 in FIG. 9 may contain data (unicast data) (or symbols) to be transmitted to a specific terminal. Similarly, the symbol groups of stream 2 in FIG. 9 may contain data (unicast data) (or symbols) to be transmitted to a specific terminal.

The symbol groups of stream 1 in FIG. 14 may contain data (unicast data) (or symbols) to be transmitted to a specific terminal. Similarly, the symbol groups of stream 2 in FIG. 14 may contain data (unicast data) (or symbols) to be transmitted to a specific terminal.

The symbols of stream 1-1 in FIG. 25 may contain data (unicast data) (or symbols) to be transmitted to a specific terminal. The symbols of stream 1-1 and stream 1-2 in FIGS. 31 and 32 may contain data (unicast data) (or symbols) to be transmitted to a specific terminal.

The PBCH may, for example, be configured "to be used to transmit minimum information (system bandwidth, system frame number, number of transmission antennas, and the like) that a UE reads first after the cell search."

The PMCH may, for example, be configured "to be used for operation of Multicast-broadcast single-frequency network (MBSFN)."

The PDSCH may, for example, be configured "as a shared data channel for transmitting downlink user data, and such that all data regardless of whether the data is C (Control)-plane/U (User)-plane data) is aggregated and transmitted."

The PDCCH may, for example, be configured "to be used to indicate allocation of radio resources to a user selected by scheduling by an eNodeB (gNodeB) (base station).

According to the embodiment described above, the base station transmits data symbols and control information symbols using a plurality of transmission beams in multicast or broadcast data transmission. In addition, the terminals selectively receive a high-quality beam out of a plurality of transmission beams to receive the data symbols based on the received beam. Thus, as an effect of the present embodiment, the terminal can obtain high data reception quality.

Embodiment 5

In the present embodiment, a supplementary description will be given of the configurations of the symbol groups of stream 1 and stream 2 in FIG. 9 transmitted by base station (700).

Figure 38:
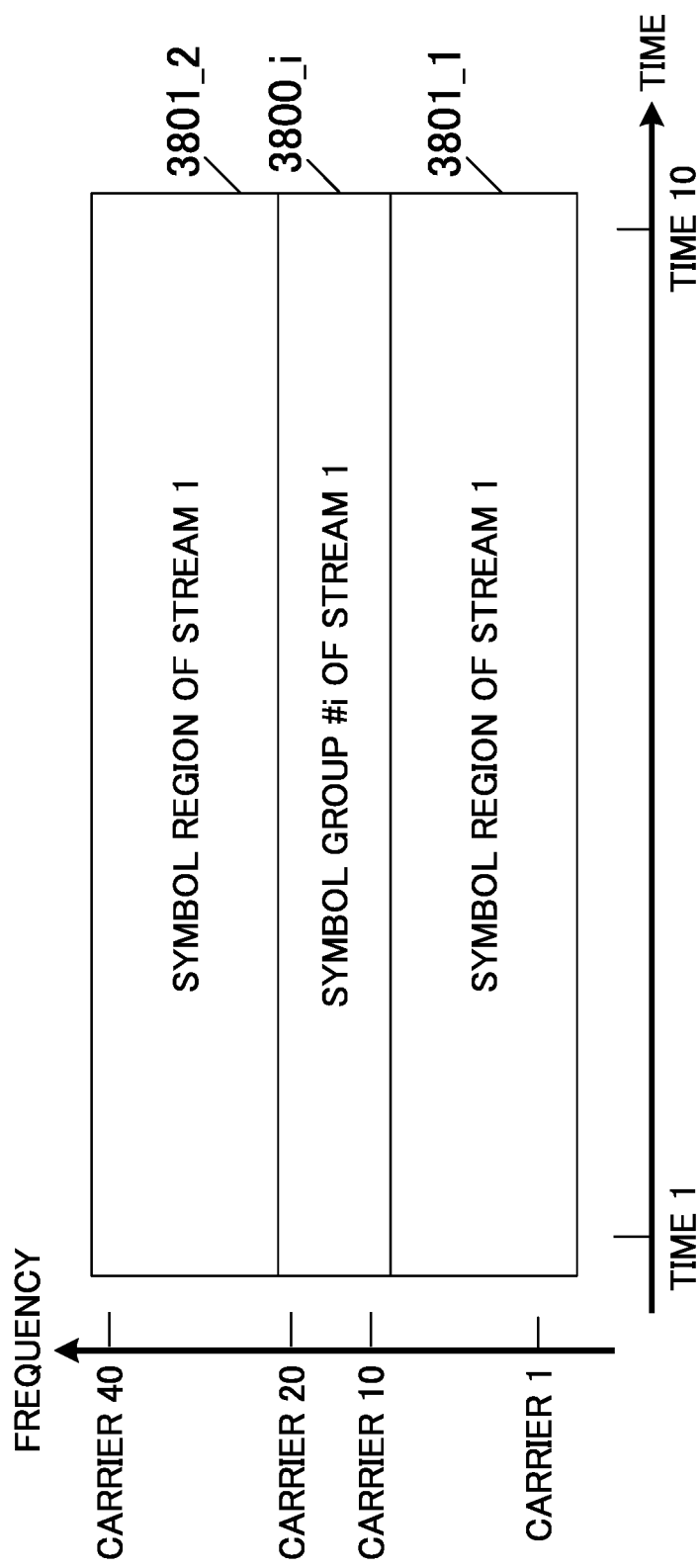
FIG. 38 illustrates an example of the frame configuration.

FIG. 38 illustrates an example of a frame configuration of stream 1 transmitted by base station (700). In FIG. 38, the horizontal axis represents the time direction, and the vertical axis represents the frequency direction. FIG. 38 illustrates the frame configuration of carriers 1 to 40 at time 1 to time 10. That is, FIG. 38 is the frame configuration of a multi-carrier transmission system such as an Orthogonal Frequency Division Multiplexing (OFDM) system.

In FIG. 38, symbol region 3801_1 of stream 1 extends from carrier 1 to carrier 9 at time 1 to time 10.

Symbol group #i of stream 1 (3800_i) exists at carriers 10 to 20 at time 1 to time 10. Note that, symbol group #i of stream 1 (3800_i) corresponds to symbol group #i of stream 1 (901-i) in FIG. 9.

Symbol region 3801_2 of stream 1 extends from carrier 21 to carrier 40 at time 1 to time 10.

In this case, the base station can use symbol regions 3801_1 and 3801_2 of stream 1 in FIG. 38 when transmitting (unicasting) specific data to one or more terminals as described, for example, in Embodiment 4 or the like.

Further, the base station can use symbol group #i of stream 1 (3800-i) in FIG. 38 to transmit multicast data as described in relation to Embodiments 1, 4, and the like.

Figure 39:
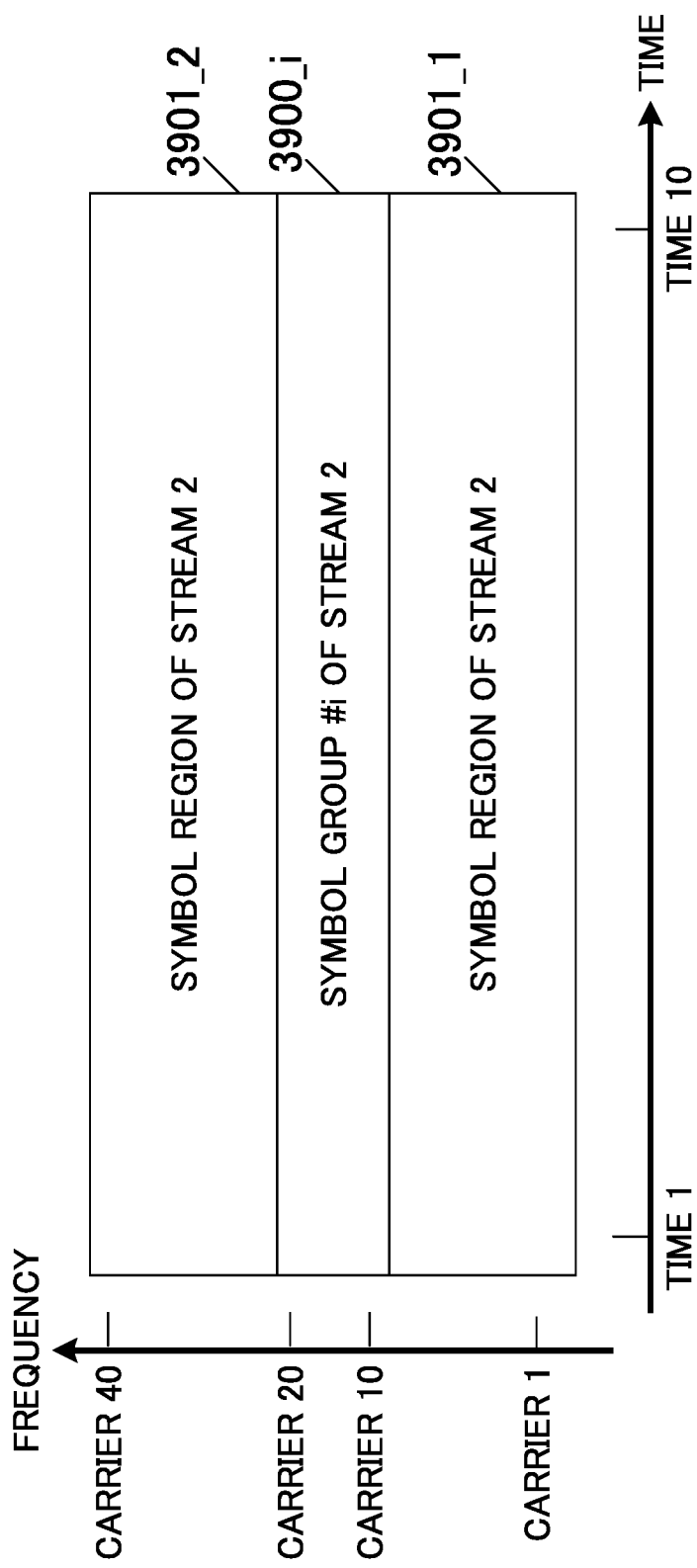
FIG. 39 illustrates an example of the frame configuration.

FIG. 39 illustrates an example of a frame configuration of stream 2 transmitted by base station 700. In FIG. 39, the horizontal axis represents the time direction, and the vertical axis represents the frequency direction. FIG. 39 illustrates the frame configuration of carriers 1 to 40 at time 1 to time 10. That is, FIG. 39 illustrates the frame configuration of a multi-carrier transmission system such as an OFDM system.

In FIG. 39, symbol region 3901_1 of stream 2 extends from carrier 1 to carrier 9 at time 1 to time 10.

Symbol group #i (3900_i) of stream 2 exists at carriers 10 to 20 at time 1 to time 10. Note that, symbol group #i (3900_i) of stream 2 corresponds to symbol group #i (902-i) of stream 2 in FIG. 9.

Symbol region 3901_2 of stream 2 extends from carrier 21 to carrier 40 at time 1 to time 10.

In this case, the base station can use symbol regions 3901_1 and 3901_2 of stream 2 in FIG. 39 when transmitting (unicasting) specific data to one or more terminals as described, for example, in Embodiment 4 or the like.

Further, the base station can use symbol group #i of stream 2 (3900-i) in FIG. 39 to transmit multicast data as described in relation to Embodiments 1, 4, and the like.

The base station transmits a symbol at carrier Y (Y is an integer of from 1 through 40 in the case of FIG. 38) at time X (X is an integer of from 1 through 10 in the case of FIG. 38) in FIG. 38 and a symbol at carrier Y at time X in FIG. 39 using the same frequency and the same time.

Symbol group #1 of stream 1 (901-1), symbol group #2 of stream 1 (901-2), and symbol group #3 of stream 1 (901-3) illustrated in FIG. 9 are as described in relation to the previous embodiments and, therefore, the descriptions thereof are omitted. That is, symbol groups #i of stream 1 in FIG. 38 are the same as described for the previous embodiments in relation to the symbol groups of stream 1 in FIG. 9 and, therefore, the descriptions thereof are omitted.

Symbol group #1 of stream 2 (902-1), symbol group #2 of stream 2 (902-2), and symbol group #3 of stream 3 (902-2) illustrated in FIG. 9 are as described in relation to the previous embodiments and, therefore, the descriptions thereof are omitted. That is, symbol groups #i of stream 2 in FIG. 39 are the same as described for the previous embodiments in relation to the symbol groups of stream 2 in FIG. 9 and, therefore, the descriptions thereof are omitted.

When there is any symbol existing at or after time 11 at any one of carriers 10 to 20 of the frame configuration illustrated in FIGS. 38 and 39, such a carrier may be used for multicast transmission or may be used for specific data transmission (unicast transmission).

When the base station transmits such a frame as illustrated in FIG. 9 having the frame configuration illustrated in FIG.

38 or 39, the base station may perform the same operations as those in Embodiments 1 and 4.

According to the embodiment described above, the base station transmits data symbols and control information symbols using a plurality of transmission beams in multicast or broadcast data transmission. The terminals selectively receive a high-quality beam out of a plurality of transmission beams to receive the data symbols based on the received beam. Thus, as an effect of the present embodiment, the terminal can obtain high data reception quality.

Embodiment 6

In the present embodiment, a supplementary description will be given of the configurations of the symbol groups of modulation signal 1 and modulation signal 2 in FIG. 14 transmitted by base station (700).

Figure 40:
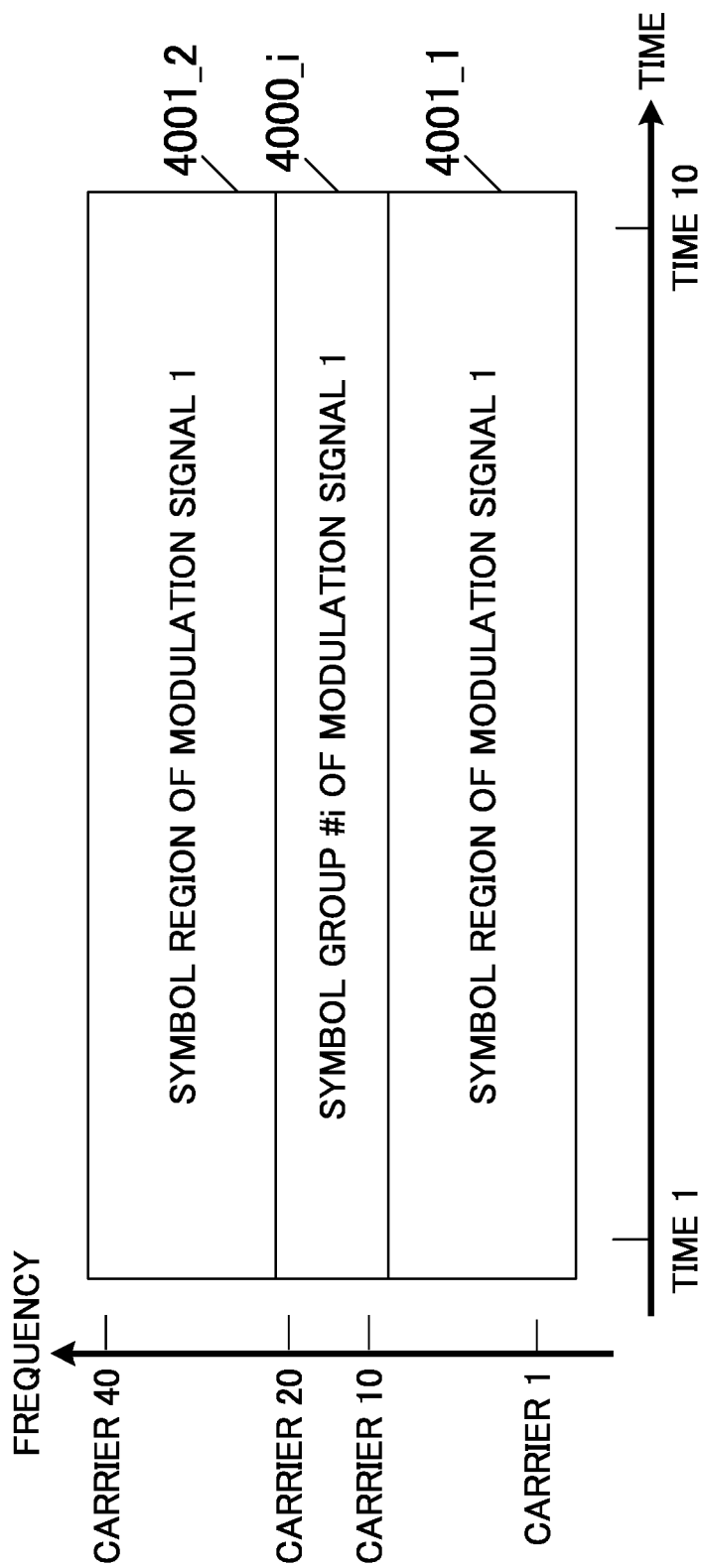
FIG. 40 illustrates an example of the frame configuration.

FIG. 40 illustrates an example of a frame configuration of modulation signal 1 transmitted by base station 700. In FIG. 40, the horizontal axis represents the time direction, and the vertical axis represents the frequency direction. FIG. 40 illustrates the frame configuration of carriers 1 to 40 at time 1 to time 10. That is, FIG. 40 illustrates the frame configuration of a multi-carrier transmission system such as an Orthogonal Frequency Division Multiplexing (OFDM) system.

In FIG. 40, symbol region 4001_1 of modulation signal 1 extends from carrier 1 to carrier 9 at time 1 to time 10.

Symbol group #i of modulation signal 1 (4000-i) exists at carriers 10 to 20 at time 1 to time 10. Symbol group #i of modulation signal 1 (4000-i) corresponds to symbol group #i of modulation signal 1 (1401-i) in FIG. 14.

Symbol region 4001_2 of modulation signal 1 extends from carrier 21 to carrier 40 at time 1 to time 10.

In this case, the base station can use symbol regions 4001_1 and 4001_2 of modulation signal 1 in FIG. 40 when transmitting (unicasting) specific data to one or more terminals as described, for example, in Embodiment 4 or the like.

Further, the base station can use symbol group #i of modulation signal 1 (4000-i) in FIG. 40 to transmit multicast data as described in relation to Embodiments 1, 4, and the like.

Figure 41:
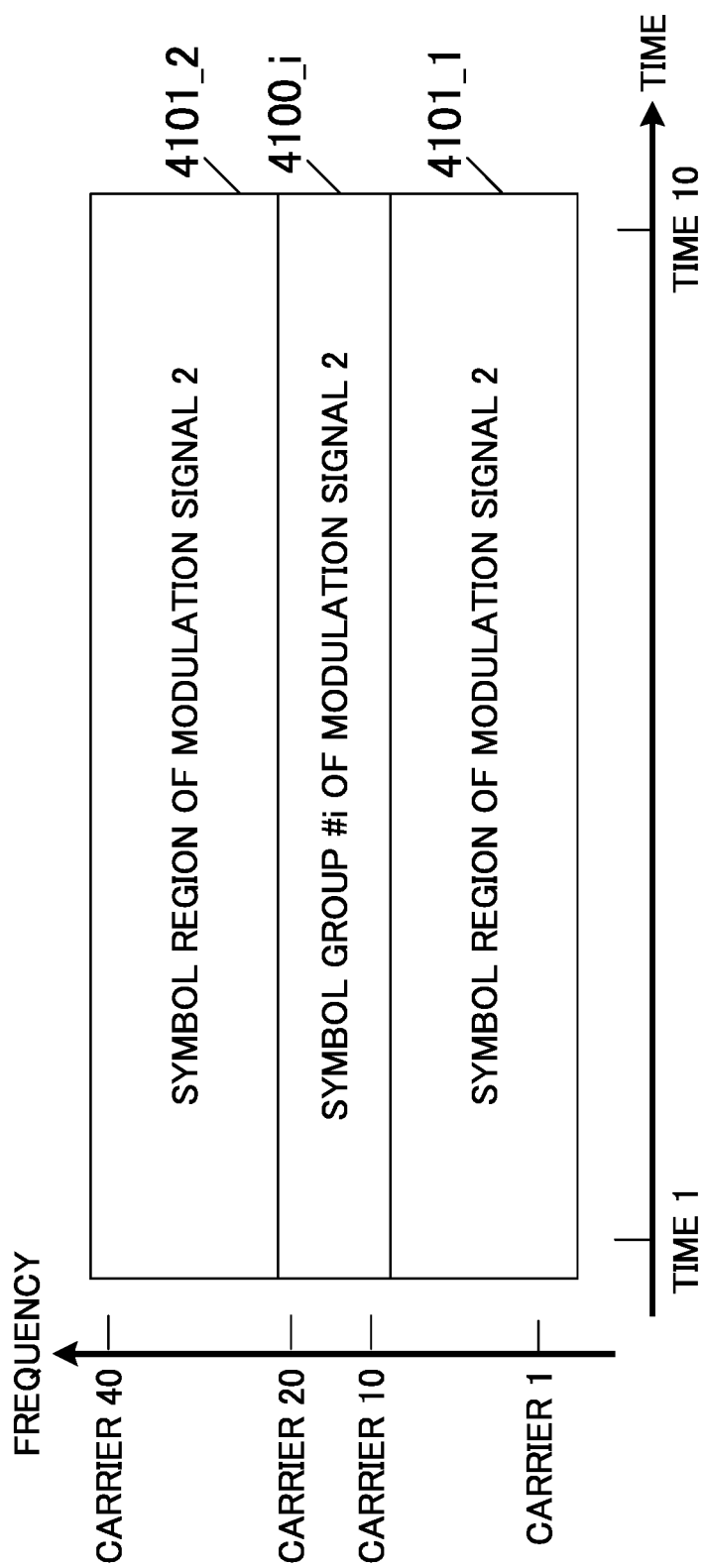
FIG. 41 illustrates an example of the frame configuration.

FIG. 41 illustrates an example of a frame configuration of modulation signal 2 transmitted by base station (700). In FIG. 41, the horizontal axis represents the time direction and the vertical axis represents the frequency direction. FIG. 41 illustrates the frame configuration of carriers 1 to 40 at time 1 to time 10. That is, FIG. 41 illustrates the frame configuration of a multi-carrier transmission system such as the OFDM system.

In FIG. 41, symbol region 4101_1 of modulation signal 2 extends from carrier 1 to carrier 9 at time 1 to time 10.

Symbol group #i (4100-i) of modulation signal 2 exists at carriers 10 to 20 at time 1 to time 10. Symbol group #i (4100-i) of modulation signal 2 corresponds to symbol group #i (1402-i) of modulation signal 2 in FIG. 14.

Symbol region 4101_2 of modulation signal 2 extends from carrier 21 to carrier 40 at time 1 to time 10.

In this case, the base station can use symbol regions 4101_1 and 4101_2 of modulation signal 2 in FIG. 41 when transmitting (unicasting) specific data to one or more terminals as described, for example, in Embodiment 4 or the like.

Further, the base station can use symbol group #i of modulation signal 2 (4100-i) in FIG. 41 to transmit multicast data as described in relation to Embodiments 1, 4, and the like.

The base station transmits a symbol at carrier Y (Y is an integer of from 1 through 40 in the case of FIG. 40) at time X (X is an integer of from 1 through 10 in the case of FIG. 40) in FIG. 40 and a symbol at carrier Y at time X in FIG. 41 using the same frequency and the same time.

Symbol group #1 of modulation signal 1 (1401-1), symbol group #2 of modulation signal 1 (1401-2), and symbol group #3 of modulation signal 1 (1401-3) illustrated in FIG. 14 are as described in relation to the previous embodiments and, therefore, the descriptions thereof are omitted. That is, symbol groups #i of modulation signal 1 in FIG. 40 are the same as described for the previous embodiments in relation to the symbol groups of modulation signal 1 in FIG. 14 and, therefore, the descriptions thereof are omitted.

Symbol group #1 of modulation signal 2 (1402-1), symbol group #2 of modulation signal 2 (1402-2), and symbol group #3 of modulation signal 2 (1402-3) illustrated in FIG. 14 are as described in relation to the previous embodiments and, therefore, the descriptions thereof are omitted. That is, symbol groups #i of modulation signal 2 in FIG. 41 are the same as described for the previous embodiments in relation to the symbol groups of modulation signal 2 in FIG. 14 and, therefore, the descriptions thereof are omitted.

When there is any symbol existing at or after time 11 at any one of carriers 10 to 20 of the frame configuration illustrated in FIGS. 40 and 41, such a carrier may be used for multicast transmission or may be used for specific data transmission (unicast transmission).

When the base station transmits such a frame as illustrated in FIG. 14 having the frame configuration illustrated in FIG. 40 or 41, the base station may perform the same operations as those in Embodiments 1 and 4.

A description will be given of an example of a method of using symbol regions 3801_1 and 3801_2 of stream 1 in FIG. 38, symbol regions 3901_1 and 3901_2 of stream 2 in FIG. 39, symbol regions 4001_1 and 4001_2 of modulation signal 1 in FIG. 40, and symbol regions 4101_1 and 4102_2 of modulation signal 2 in FIG. 41 in the above description.

Figure 42:
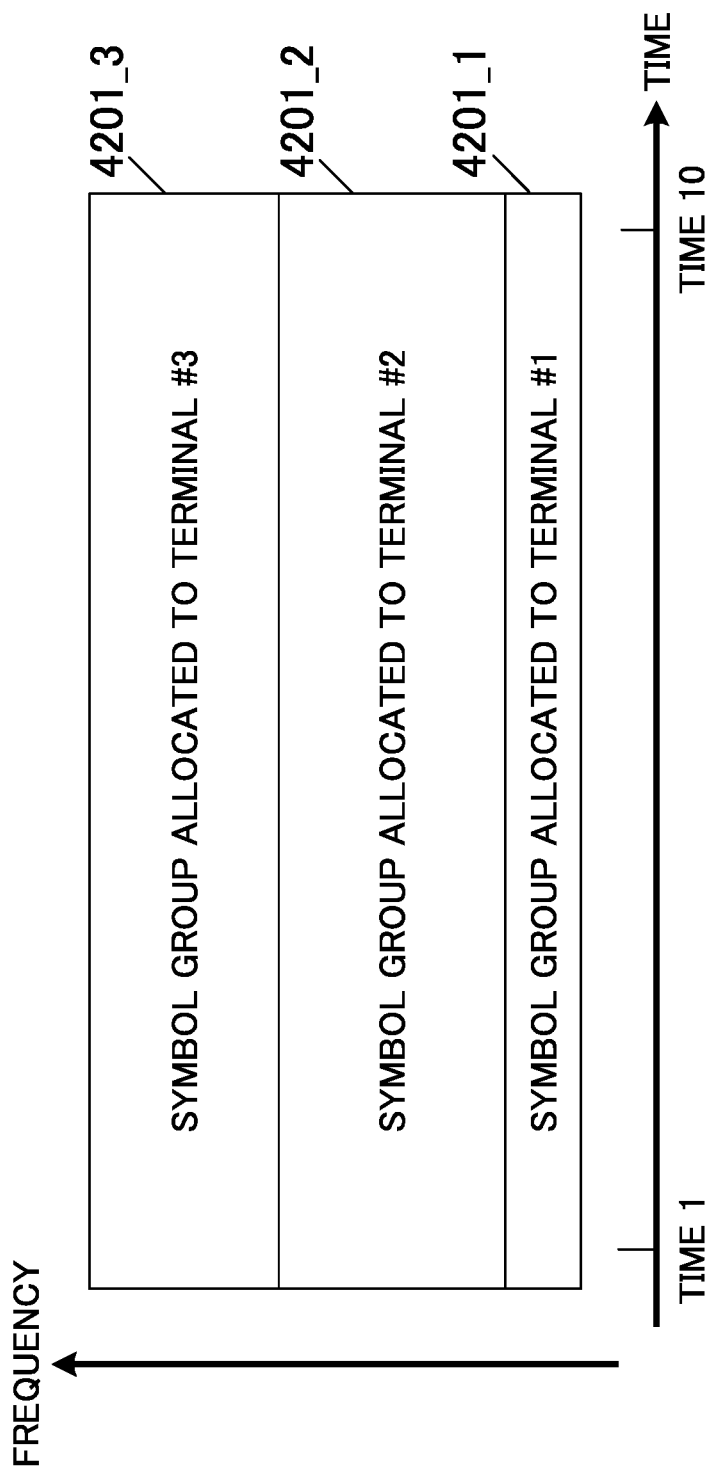
FIG. 42 illustrates an example of allocation of symbol regions to terminals.

FIG. 42 illustrates an example of allocation of "symbol regions 3801_1 and 3801_2 of stream 1 in FIG. 38, symbol regions 3901_1 and 3901_2 of stream 2 in FIG. 39, symbol regions 4001_1 and 4001_2 of modulation signal 1 in FIG. 40, and symbol regions 4101_1 and 4102_2 of modulation signal 2 in FIG. 41 to terminals. Note that, the horizontal axis represents the time direction and the vertical axis represents the frequency (carrier) direction in FIG. 42.

As illustrated in FIG. 42, "symbol regions 3801_1 and 3801_2 of stream 1 in FIG. 38, symbol regions 3901_1 and 3901_2 of stream 2 in FIG. 39, symbol regions 4001_1 and 4001_2 of modulation signal 1 in FIG. 40, and symbol regions 4101_1 and 4102_2 of modulation signal 2 in FIG. 41" are frequency-divided and allocated to the terminals, for example. FIG. 42 illustrates symbol group 4201_1 allocated to terminal #1, symbol group 4201_2 allocated to terminal #2, and symbol group 4201_3 allocated to terminal #3.

For example, base station 700 communicates with terminal #1, terminal #2, and/or terminal #3. When transmitting data to terminal #1, the base station transmits the data to terminal #1 using "symbol group 4201_1 allocated to terminal #1" in FIG. 42. When transmitting data to terminal #2, the base station transmits the data to terminal #2 using "symbol group 4201_2 allocated to terminal #2" in FIG. 42. When transmitting data to terminal #3, the base station transmits the data to terminal #3 using "symbol group 4201_3 allocated to terminal #3" in FIG. 42.

Note that the allocation method for allocation to the terminals is not limited to that illustrated in FIG. 42. For example, the frequency band (the number of carriers) may vary with time, or may be set in any manner. The allocation method for allocation to the terminals may also be changed with time.

Figure 43:
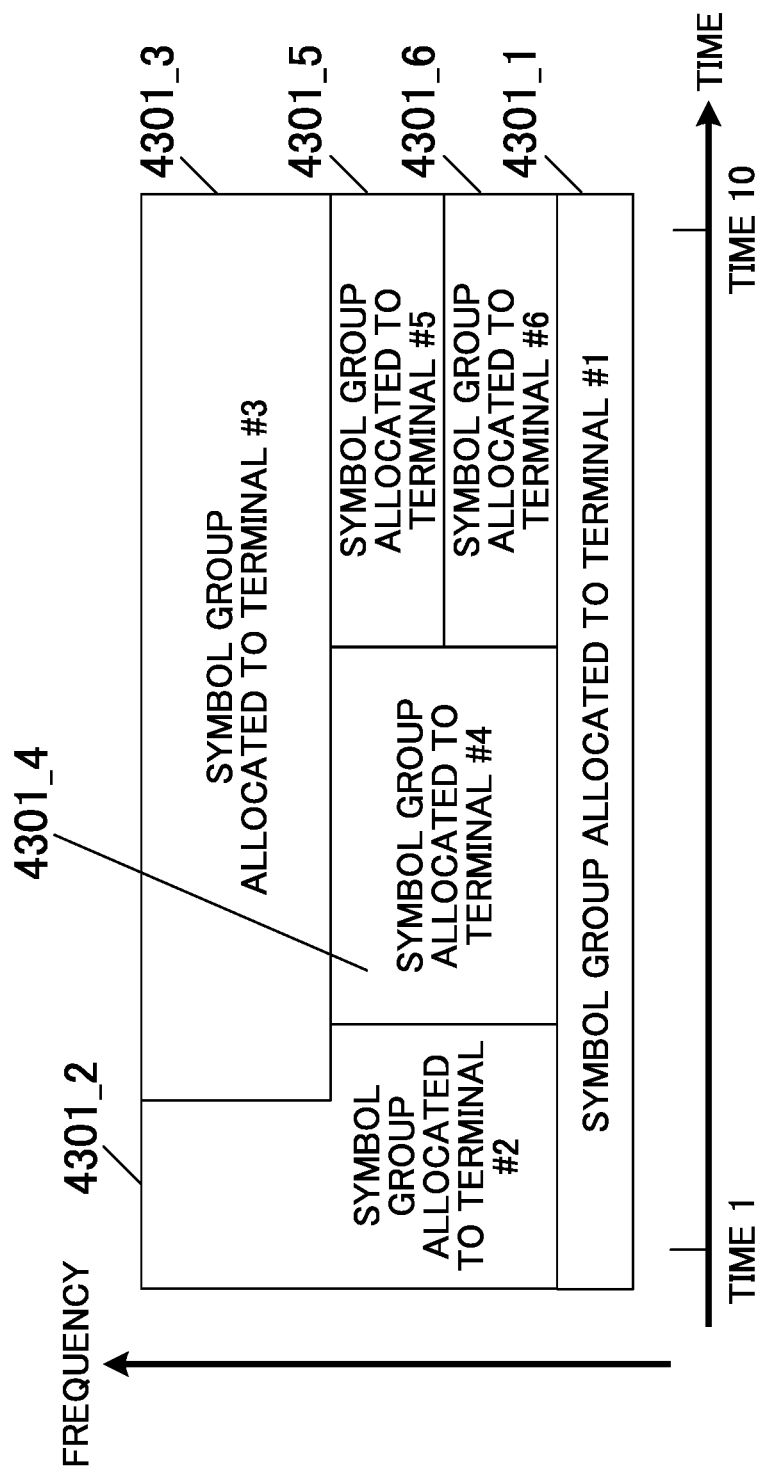
FIG. 43 illustrates an example of allocation of symbol regions to terminals.

FIG. 43 illustrates an example different from FIG. 42 in which "symbol regions 3801_1 and 3801_2 of stream 1 in FIG. 38, symbol regions 3901_1 and 3901_2 of stream 2 in FIG. 39, symbol regions 4001_1 and 4001_2 of modulation signal 1 in FIG. 40, and symbol regions 4101_1 and 4102_2 of modulation signal 2 in FIG. 41 are allocated to terminals. Note that, the horizontal axis represents the time direction and the vertical axis represents the frequency (carrier) direction in FIG. 43.

As illustrated in FIG. 43, "symbol regions 3801_1 and 3801_2 of stream 1 in FIG. 38, symbol regions 3901_1 and 3901_2 of stream 2 in FIG. 39, symbol regions 4001_1 and 4001_2 of modulation signal 1 in FIG. 40, and symbol regions 4101_1 and 4102_2 of modulation signal 2 in FIG. 41" are time-divided and frequency-divided, and allocated to the terminals, for example. FIG. 43 illustrates symbol group (4301_1) allocated to terminal #1, symbol group (4301_2) allocated to terminal #2, symbol group (4301_3) allocated to terminal #3, symbol group (4301_4) allocated to terminal #4, symbol group (4301_5) allocated to terminal #5, and symbol group (4301_6) allocated to terminal #6.

For example, base station (700) communicates with terminal #1, terminal #2, terminal #3, terminal #4, terminal #5, and terminal #6. When transmitting data to terminal #1, the base station transmits the data using "symbol group 4301_1 allocated to terminal #1" in FIG. 43. When transmitting data to terminal #2, the base station transmits the data to terminal #2 using "symbol group 4301_2 allocated to terminal #2" in FIG. 43. When transmitting data to terminal #3, the base station transmits the data to terminal #3 using "symbol group 4301_3 allocated to terminal #3" in FIG. 43. When transmitting data to terminal #4, the base station transmits the data to terminal #4 using "symbol group 4301_4 allocated to terminal #4" in FIG. 43. When transmitting data to terminal #5, the base station transmits the data to terminal #5 using "symbol group 4301_5 allocated to terminal #5" in FIG. 43. When transmitting data to terminal #6, the base station transmits the data using "symbol group 4301_6 allocated to terminal #6" in FIG. 43.

Note that the allocation method for allocation to the terminals is not limited to that illustrated in FIG. 43. For example, the frequency band (number of carriers) and the time width may be changed or may be set in any manner. The allocation method for allocation to the terminals may also be changed with time.

Further, weighted combination different for each carrier may be performed on the symbol regions of stream 1, the symbol regions of stream 2, the symbol regions of modulation signal 1, and the symbol regions of modulation signal 2 in FIGS. 38, 39, 40, and 41, or a method for the weighted combination may be determined on the basis of a plurality of carriers. Further, a weighted combination parameter may be set for each of the terminals to which the symbol regions are allocated as illustrated in FIGS. 42 and 43. Setting the method for the weighted combination for the carriers is not limited to these examples.

According to the embodiment described above, the base station transmits data symbols and control information symbols using a plurality of transmission beams in multicast or broadcast data transmission. The terminals selectively receive a high-quality beam out of a plurality of transmission beams to receive the data symbols based on the received beam. Thus, as an effect of the present embodiment, the terminal can obtain high data reception quality.

Embodiment 7

Figure 44:
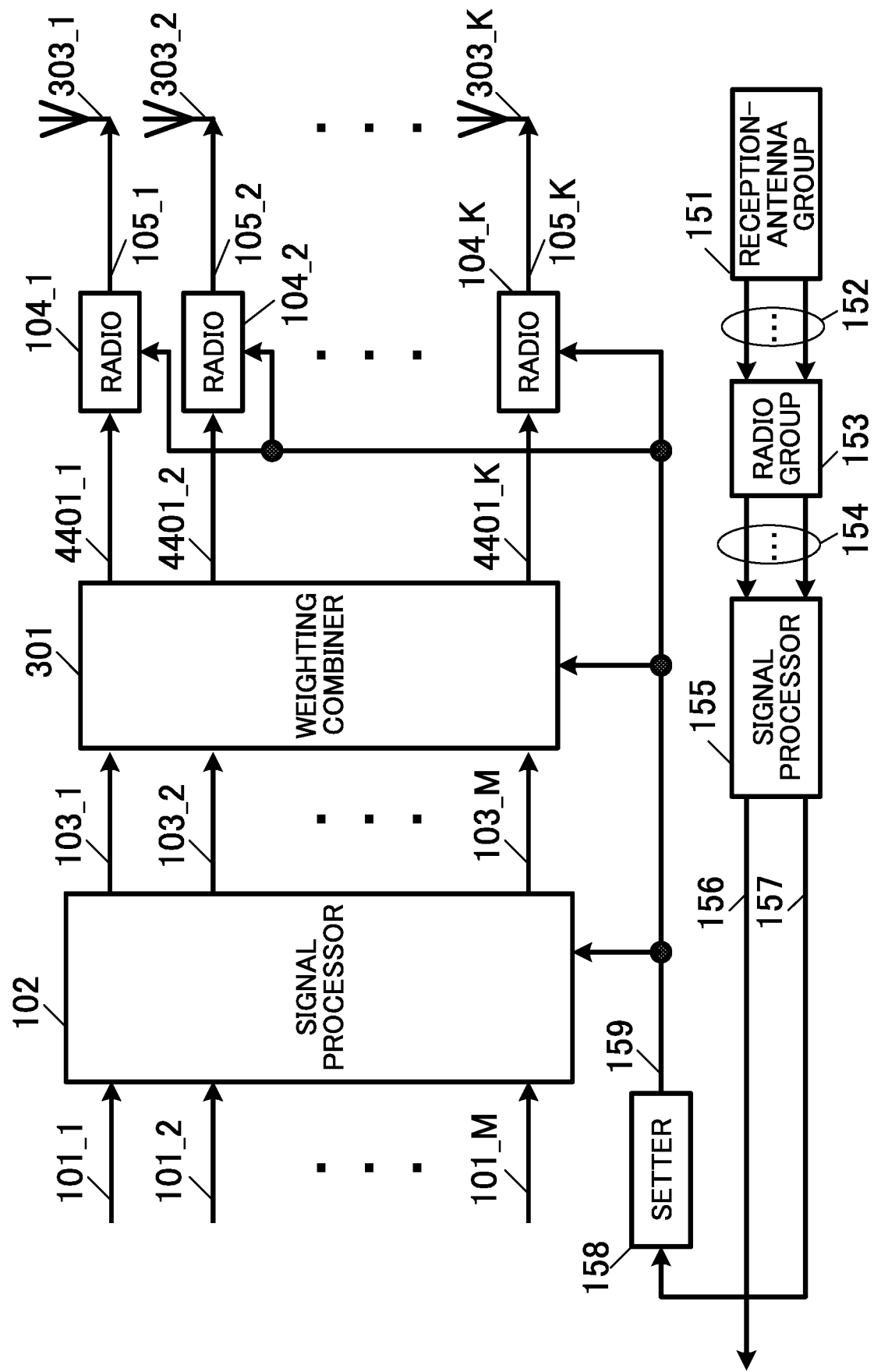
FIG. 44 illustrates an example of the configuration of the base station.

Base station 700 in FIGS. 7, 12, 17, 18, 19, 20, and 22, or the base station described in relation to other embodiments in the present specification may be configured as illustrated in FIG. 44.

The operation of the base station of FIG. 44 will be described below. Components in FIG. 44 that operate in the same manner as those in FIG. 1 or 3 are provided with the same reference numerals, and the descriptions of those components are omitted.

Signals 103_1, 103_2, ..., and 103_M after signal processing and control signal 159 are input to weighting combiner 301, and the weighting combiner performs weighted combination based on control signal 159 and outputs weighted-combination signals 4401_1, 4401_2, ..., and 4401_K. Note that M is an integer equal to or greater than 2 and K is an integer equal to or greater than 2.

For example, when signal 103_i (i is an integer of from 1 through M) after the signal processing is represented by ui(t) (t denotes time) and signal 4401_g (g is an integer of from 1 through K) resulting from the weighted combination is represented by vg(t), vg(t) can be expressed by the following equation.

[7]

$$v_g^{(t)} = Q_{g1} \times u_1^{(t)} + Q_{g2} \times u_2^{(t)} + \ldots + Q_{gM} \times u_M^{(t)} \quad \text{(Equation 7)}$$
$$= \sum_{j=1}^{M} Q_{gj} \times u_j^{(t)}$$

Signal 4401-g resulting from the weighted combination and control signal 159 are input to radio 104-g, and the radio performs predetermined processing based on control signal 159 to generate and output transmission signal 105-g. Transmission signal 105-g is then transmitted from antenna 303_1.

The transmission method supported by the base station may be a multicarrier system such as OFDM or a single carrier system. In addition, the base station may support both the multicarrier system and the single carrier system. In this case, the present embodiment can be implemented by employing any one of a plurality of methods for generating a modulation signal of a single carrier system. Examples of the single carrier system include "Discrete Fourier Transform (DFT)-Spread Orthogonal Frequency Division Multiplexing (OFDM)," "Trajectory Constrained DFT-Spread OFDM," "OFDM based Single Carrier (SC)," "Single Carrier (SC)-Frequency Division Multiple Access (FDMA)," "Guard interval DFT-Spread OFDM," and the like, for example.

While Equation 7 is described as a function of time, the equation may also be a function of time and frequency in the case of a multi-carrier system such as the OFDM system.

For example, in the OFDM system, the weighted combination different for each carrier may be performed, or a method for the weighted combination may be determined on the basis of a plurality of carriers. Setting the method for the weighted combination for the carriers is not limited to these examples.

(Supplement 6)

It is needless to say that the embodiments described in the present specification may be implemented by combining a plurality of miscellaneous contents such as the supplements.

The configuration of the base station is not limited to the examples of FIGS. 1 and 3. The present disclosure can be implemented by any base station as long as the base station includes a plurality of transmission antennas and generates and transmits a plurality of transmission beams (transmission directional beams).

In addition, the embodiments are merely examples. For example, even though examples of "modulation scheme, error correction coding scheme (error correction code, code length, coding rate, and the like for use), control information, and the like" are given, another "modulation scheme, error correction coding scheme (error correction code, code length, coding rate, and the like for use), control information, and the like" can be applied to implement the present disclosure with the same configuration.

The embodiments and miscellaneous contents described in the present specification can also be implemented using a modulation scheme other than the modulation scheme described in the present specification. For example, APSK (e.g., 16APSK, 64APSK, 128APSK, 256APSK, 1024APSK, 4096APSK, or the like), PAM (e.g., 4PAM, 8PAM, 16PAM, 64PAM, 128PAM, 256PAM, 1024PAM, 4096PAM, or the like), PSK (e.g., BPSK, QPSK, 8PSK, 16PSK, 64PSK, 128PSK, 256PSK, 1024PSK, 4096PSK, or the like), QAM (e.g., 4QAM, 8QAM, 16QAM, 64QAM, 128QAM, 256QAM, 1024QAM, 4096QAM, or the like), and/or the like may be applied, and uniform mapping and non-uniform mapping may be used in each of the modulation schemes. In addition, the method of arranging signal points (e.g., 2, 4, 8, 16, 64, 128, 256, or 1024 signal points) on the I-Q plane (modulation scheme with 2, 4, 8, 16, 64, 128, 256, or 1024 signal points or other number of signal points) is not limited to the signal-point arrangement method of the modulation scheme indicated in the present specification.

In the present specification, it is considered that a communication/broadcasting device such as a broadcasting station, a base station, an access point, a terminal, a mobile phone, or the like is provided with the transmission apparatus, for example. In this case, it is considered that a communication device such as a television, a radio, a terminal, a personal computer, a mobile phone, an access point, a base station, or the like is provided with the reception apparatus. Further, it is considered that the transmission apparatus and the reception apparatus in the present disclosure are devices having a communication function, and the devices are configured to be capable of being connected via some interface to an apparatus for executing an application of a television, a radio, a personal computer, a mobile phone, or the like. In addition, symbols other than data symbols, for example, a pilot symbol (preamble, unique word, postamble, reference symbol, and the like) and a control information symbol may be arranged in any manner in a frame in the present embodiment. Those symbols called "pilot symbol" and "control information symbol" in the present embodiment may also be called by any names. That is, those symbols, even with different names, have the same function.

The pilot symbol may be a known symbol modulated using PSK modulation in a transceiver, for example. A receiver performs frequency synchronization, time synchronization, channel estimation of each modulation signal (estimation of Channel State Information (CSI)), signal detection, and/or the like using this symbol. Alternatively, the receiver may be able to know a symbol transmitted by a transmitter by synchronizing the pilot symbol.

In addition, the control information symbol is a symbol for transmitting information other than data (data of an application or the like) that is to be transmitted to a communication partner for realizing communication. For example, the control information symbol transfers a modulation scheme, an error correction coding scheme, an error correction coding scheme, a coding rate of the error correction coding scheme, configuration information of a higher layer, and/or the like used for communication.

Note that the present disclosure is not limited to each of the embodiments, and can be implemented with various modifications. For example, although the embodiments have been described as operations of the communication apparatus, the present disclosure is not limited to the embodiments, and can also be described as an operation of software for implementing a communication method.

For example, a program for executing the above communication method may be stored in a ROM in advance, and the program may be operated by a CPU.

Further, the program for executing the above communication method may be stored in a computer-readable storage medium, the program stored in the storage medium may be recorded in a RAM of the computer, and the computer may be operated in accordance with the program.

The configurations of each of the above embodiments may typically be implemented as an LSI that is an integrated circuit having an input terminal and an output terminal. These configurations may be individually formed into single chips, or may be formed into one chip to include all or some of the configurations of each of the embodiments. In this case, an appellation "LSI" is employed. However, depending on the degree of integration, appellations such as IC, system LSI, super LSI, and ultra LSI may be employed. In addition, the technique of circuit integration is not limited to the LSI, and it may be realized by a dedicated circuit or a general-purpose processor. An FPGA that can be programmed after LSI fabrication or a reconfigurable processor that can reconfigure connections and settings of circuit cells inside the LSI may be used. If future integrated circuit technology replaces LSIs as a result of the advancement of semiconductor technology or other derivative technology, the functional blocks could be integrated using the future integrated circuit technology. Biotechnology can also be applied.

The various frame configurations have been described in the present specification. For example, a base station (AP) including the transmission apparatus of FIG. 1 transmits the modulation signals of the frame configurations described herein using a multi-carrier scheme such as the OFDM scheme. In this case, an application method can be considered in which, when a terminal (user) communicating with the base station (AP) transmits a modulation signal, the modulation signal transmitted by the terminal is of a single carrier system. The base station (AP) can transmit a data symbol group to a plurality of terminals at the same time by using the OFDM system, or also can reduce power consumption by using the single carrier system.

Further, a terminal may apply a Time Division Duplex (TDD) scheme for transmitting a modulation scheme using a part of a frequency band used for a modulation signal transmitted by the base station (AP).

The configuration of each of antenna sections 106-1, 106-2, . . . , and 106-M in FIG. 1 is not limited to the configuration described in relation to the embodiment. For example, antenna sections 106-1, 106-2, . . . , and 106-M do not have to be configured with a plurality of antennas. Further, signal 159 does not have to be input to antenna sections 106-1, 106-2, . . . , and 106-M.

The configuration of each of antenna sections 401-1, 401-2, . . . , and 401-N in FIG. 4 is not limited to the configuration described in relation to the embodiment. For example, antenna sections 401-1, 401-2, . . . , and 401-N do not have to be configured with a plurality of antennas. Further, signal 410 does not have to be input to antenna sections 401-1, 401-2, . . . , and 401-N.

Note that, the transmission method supported by the base station and the terminals may be a multicarrier system such as OFDM or a single carrier system. The base station may also support both the multicarrier and single carrier schemes. In this case, the present embodiment can be implemented by employing any one of a plurality of methods for generating a modulation signal of a single carrier system. Examples of the single carrier system include "Discrete Fourier Transform (DFT)-Spread Orthogonal Frequency Division Multiplexing (OFDM)," "Trajectory Constrained DFT-Spread OFDM," "OFDM based Single Carrier (SC)," "Single Carrier (SC)-Frequency Division Multiple Access (FDMA)," "Guard interval DFT-Spread OFDM," and the like, for example.

Further, there is at least multicast (broadcast) data in information #1 (101_1), information #2 (101_2), . . . , and information #M (101_M) in FIGS. 1, 3, and 44. For example, when information #1 101_1 is multicast data in FIG. 1, a plurality of streams or modulation signals including this data are generated by signal processor 102 and output from the antenna.

When information #1 (101_1) is multicast data in FIG. 3, a plurality of streams or modulation signals including this data are generated by signal processor 102 and/or weighting combiner 301, and are output from the antenna.

When information #1 (101_1) is multicast data in FIG. 44, a plurality of streams or modulation signals including this data are generated by signal processor 102 and/or weighting combiner 301, and are output from the antenna.

Note that, the state of the plurality of streams or modulation signals is as described with reference to FIGS. 7, 9, 12, 14, 17, 18, and 19.

Further, data addressed to a specific terminal may be included in information #1 (101_1), information #2 (101_2), . . . , or information #M (101_M) in FIGS. 1, 3, and 44. This point is as described in relation to the embodiments of the present specification.

Note that, at least one of a Field Programmable Gate Array (FPGA) and a Central Processing Unit (CPU) may be configured to allow download of all or part of software through radio communication or wired communication, which is required for implementing the communication methods described in the present disclosure. Further, at least one of the FPGA and the CPU may be configured to allow download of all or part of software for update through radio communication or wired communication. In addition, digital signal processing described in the present disclosure may be executed by at least one of the FPGA and the CPU operated based on downloaded software stored in a storage section.

At this time, the device including at least one of the FPGA and the CPU may be connected to a communication modem by radio or by wire, and the communication methods described in the present disclosure may be implemented by the device and the communication modem.

For example, the communication apparatus such as the base station, the AP, or the terminal described in the present specification may include at least one of the FPGA and the CPU, and the communication apparatus may include an interface for externally acquiring software for operating at least one of the FPGA and the CPU. Further, the communication apparatus may include a storage section for storing the externally acquired software, and the signal processing described in the present disclosure may be realized by operating the FPGA or the CPU based on the stored software.

Embodiment 8

Figure 45:
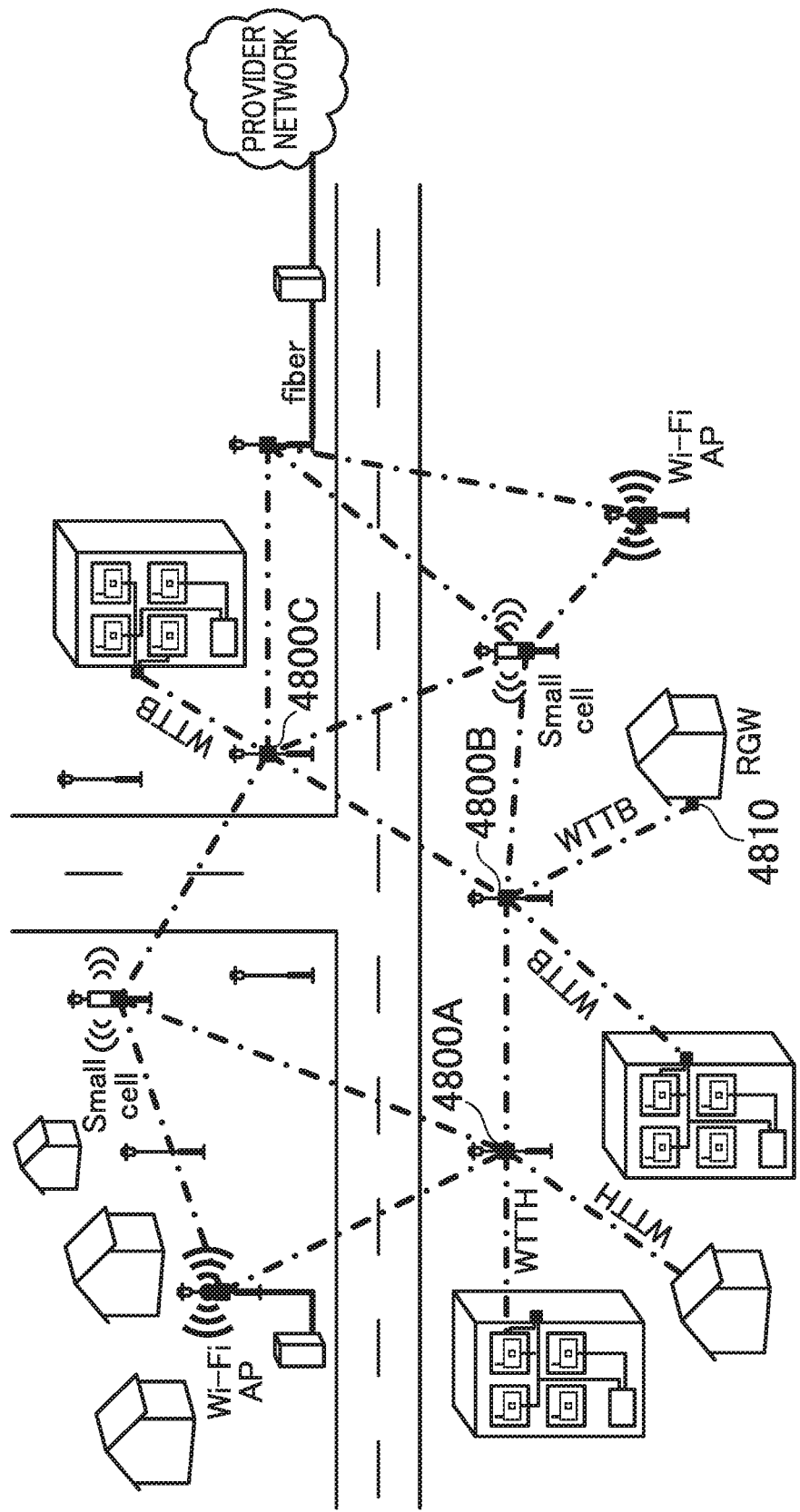
FIG. 45 illustrates an example of a configuration of a mesh network in which repeaters are used.

FIG. 45 illustrates an example of a configuration of a mesh network in which repeaters of a radio signal (hereinafter, simply referred to as "repeaters") are used.

As illustrated in FIG. 45, a plurality of repeaters are arranged at a plurality of points in a predetermined area, respectively, and constitute a mesh type radio backhaul.

For example, repeater 4800B transmits to repeater 4800C a signal received from repeater 4800A. Repeater 4800B also transmits the signal received from repeater 4800A to edge node 4810 connected to repeater 4800B. Repeater 4800B also transmits to another repeater 4800C a signal received from edge node 4810 connected to repeater 4800B.

For example, the edge node may be a gateway device for a gateway to a home network. This is a use case called Wireless To The Home (WTTH). The edge node may also be a gateway device for a gateway to a network in a building. This is a use case called Wireless to the building (WTTB). The edge node may also be a Wi-Fi access point, for example. Thus, use cases in which the edge node is wirelessly connected is referred to collectively as Wireless to the X (WTTX).

Note that the term "repeater" is merely an example, and the repeater may also be referred to as a communication apparatus, a base station, or a node, for example. Therefore, the implementation described as the operation of the base station in the present specification may also be the operation of the repeater in the present embodiment.

Figure 46:
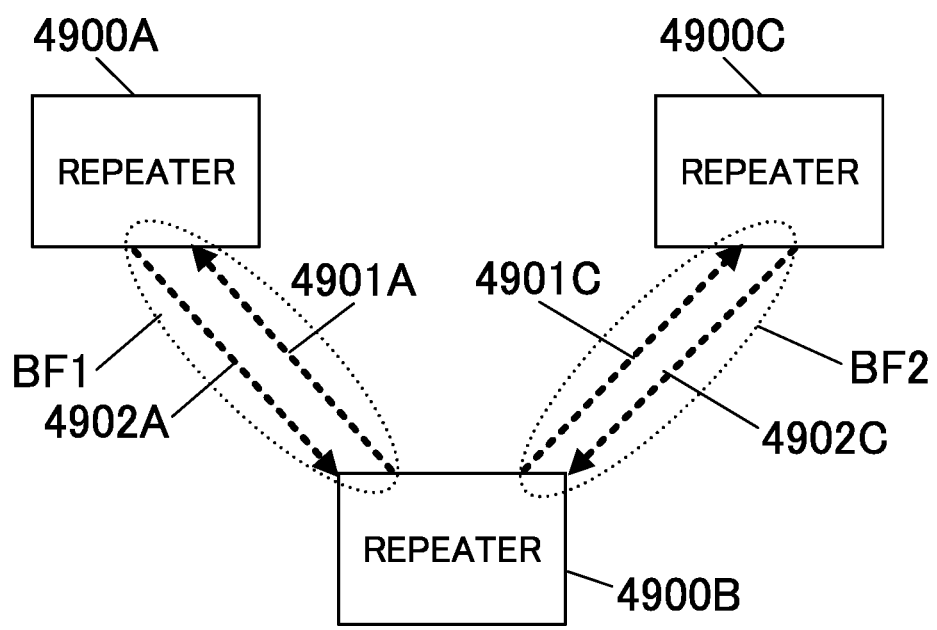
FIG. 46 illustrates an example of connection between the repeaters.

FIG. 46 schematically illustrates an example of connection between repeaters according to Embodiment 8.

In FIG. 46, repeater 4900B directs beam directivity toward repeater 4900A for transmitting or receiving a modulation signal. That is, repeater 4900B performs beamforming BF1 toward repeater 4900A. Repeater 4900B directs beam directivity toward repeater 4900C for transmitting or receiving a modulation signal. That is, repeater 4900B performs beamforming BF2 toward repeater 4900C.

In FIG. 46, repeater 4900B receives modulation signal 4902A transmitted by repeater 4900A, and transmits modulation signal 4901C corresponding to modulation signal 4901A to repeater 4900C. In addition, repeater 4900B receives modulation signal 4902C transmitted by repeater 4900C, and transmits modulation signal 4901A corresponding to modulation signal 4902C to repeater 4900A. That is, repeater 4900B relays the modulation signals between repeater 4900A and repeater 4900C.

Note that modulation signal 4902A and modulation signal 4901C are not necessarily the same modulation signal. Modulation signal 4902A and modulation signal 4901C at least contain the same information (which is referred to as "first information") or contain information relevant to the first information. The modulation scheme for generating modulation signal 4902A and the modulation scheme for generating modulation signal 4901C are not necessarily the same.

Further, the error correction coding scheme for generating modulation signal 4902A and the error correction coding scheme for generating modulation signal 4901C are not necessarily the same. In addition, modulation signal 4902C and modulation signal 4901A are not necessarily the same modulation signal. Modulation signal 4902C and modulation signal 4901A contain at least the same information (which is referred to as "second information") or contain information relevant to the second information.

Further, the modulation scheme for generating modulation signal 4902C and the modulation scheme for generating modulation signal 4901A are not necessarily the same. Furthermore, the error correction coding scheme for generating modulation signal 4902C and the error correction coding scheme for generating modulation signal 4901A are not necessarily the same.

Repeater 4900B performs beamforming BF1 toward repeater 4900A when transmitting modulation signal 4901A to repeater 4900A and when receiving modulation signal 4902A from repeater 4900A. Thus, the reception quality of the modulation signals between repeater 4900B and repeater 4900A improves.

Repeater 4900B also performs beamforming BF2 toward repeater 4900C when transmitting modulation signal 4901C to repeater 4900C and when receiving modulation signal 4902C from repeater 4900C. Thus, the reception quality of the modulation signals between repeater 4900B and repeater 4900C improves.

Figure 47:
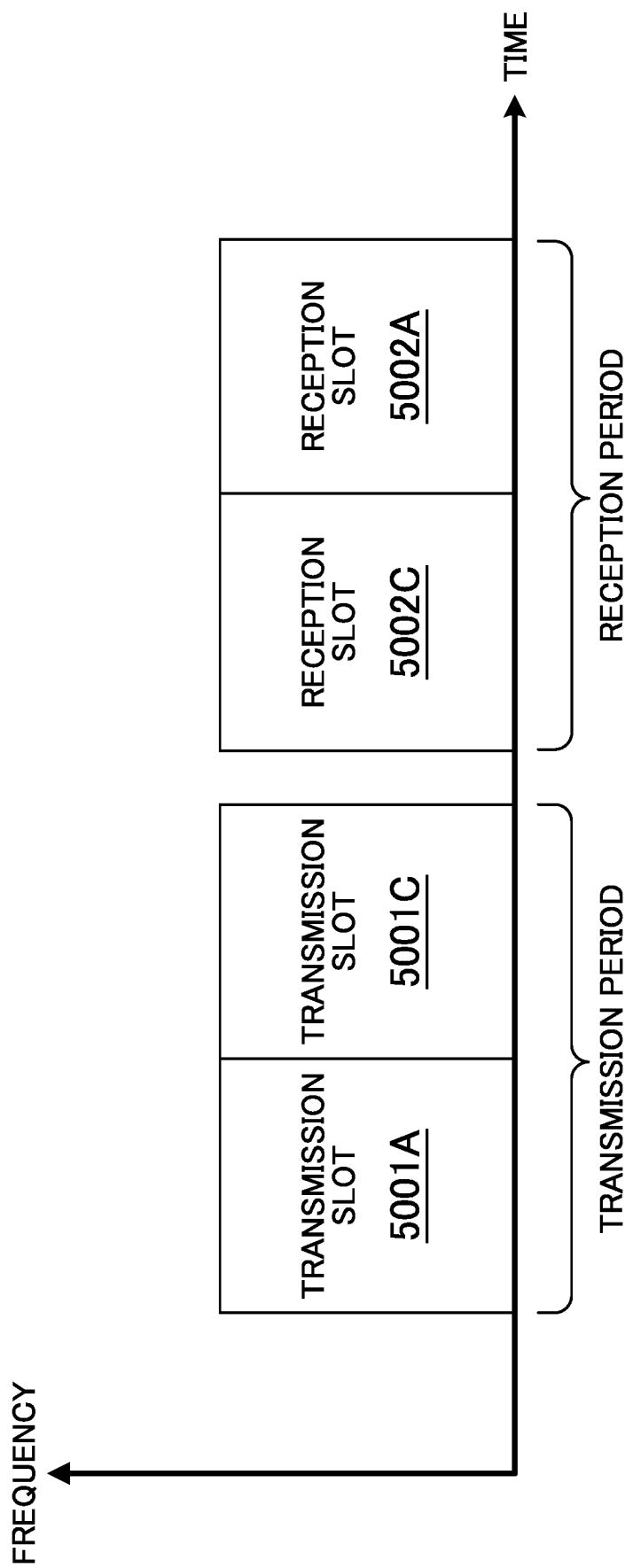
FIG. 47 illustrates an example of slot allocation.

FIG. 47 illustrates an example of slot allocation to repeater 4900B of FIG. 46.

A slot for transmission of a modulation signal (hereinafter referred to as a "transmission slot") and a slot for reception of a modulation signal (hereinafter referred to as a "reception slot") are allocated to repeaters. Each one of the slots is a resource unit occupying a predetermined time period and frequency as illustrated in FIG. 47, and is arranged on the time axis. Note that, the slot represented as one slot in FIG. 47 (for example, transmission slot 5001A) may be formed by a plurality of slots. The same applies to other FIGS. 48, 50, 51, 53, 54, 55, and 56.

The example of FIG. 47 illustrates that transmission slot 5001A for transmission to repeater 4900A, transmission slot 5001C for transmission to repeater 4900C, reception slot 5002C for reception from repeater 4900C, and reception slot 5002A for reception from repeater 4900C are allocated to repeater 4900B successively on the time axis. Note that, a transmission period and a reception period combined with each other constitute one TDD interval, which will be described later.

That is, FIG. 47 illustrates an example in which the transmission slots are allocated consecutively on the time axis and the reception slots are allocated consecutively on the time axis. Note that, a period in which transmission slots are consecutively allocated is referred to as a transmission period, and a period in which reception slots are consecutively allocated is referred to as a reception period.

Note that, there may also be another symbol (e.g., a control information symbol or a data symbol) between transmission slot 5001A and transmission slot 5001C, or there may also be a time period during which no modulation signal exists. In addition, there may also be another symbol (e.g., a control information symbol or a data symbol) between reception slot 5002C and reception slot 5002A, or there may also be a time period during which no modulation signal exists.

The period lengths of transmission slot 5001A and transmission slot 5001C may be the same as each other or different from each other. Similarly, the period lengths of reception slot 5002C and reception slot 5002A may be the same as each other or different from each other. The same applies to other FIGS. 48, 50, 51, 53, 54, 55, and 56.

Note that, FIG. 47 illustrates the slot allocation to repeater 4900B at a certain time, and except for this time, the transmission slot and the reception slot may be allocated to repeater 4900B in the same order as in FIG. 47, or the transmission slot and the reception slot may be allocated in a different order than in FIG. 47. The same applies to other FIGS. 48, 50, 51, 53, 54, 55, and 56.

Note that, data transmitted in transmission slots 5001A and 5001C in FIG. 47 is data received in a reception slot preceding by one or more TDD intervals or in a frame preceding by one or more frames, and data received in reception slots 5002A and 5002C in FIG. 47 is data to be transmitted in a transmission slot succeeding by one or more TDD intervals or in a frame succeeding by one or more frames. The same applies to other FIGS. 48, 50, 51, 53, 54, 55, and 56.

Repeater 4900B directs the beam directivity toward repeater 4900A (i.e., performs directivity control) during the period of transmission slot 5001A for transmitting the modulation signal. Repeater 4900B also directs the beam directivity toward repeater 4900C during the period of transmission slot 5001C for transmitting the modulation signal.

Repeater 4900B also directs the beam directivity toward repeater 4900C during the period of reception slot 5002C for receiving the modulation signal transmitted by repeater 4900C. Repeater 4900B also directs the directivity toward repeater 4900A during the period of reception slot 5002A for receiving the modulation signal transmitted by repeater 4900A.

As illustrated in FIG. 47, consecutive allocation of at least the transmission slots or the reception slots (to a certain time and a certain frequency band) allows reduction in load on a power amplifier in repeater 4900B, resulting in reduction in power consumption of repeater 4900B. In addition, when a guard period is provided between transmission slot 5001A and transmission slot 5001C, it is possible to shorten the guard period so as to improve the data transmission rate.

Figure 48:
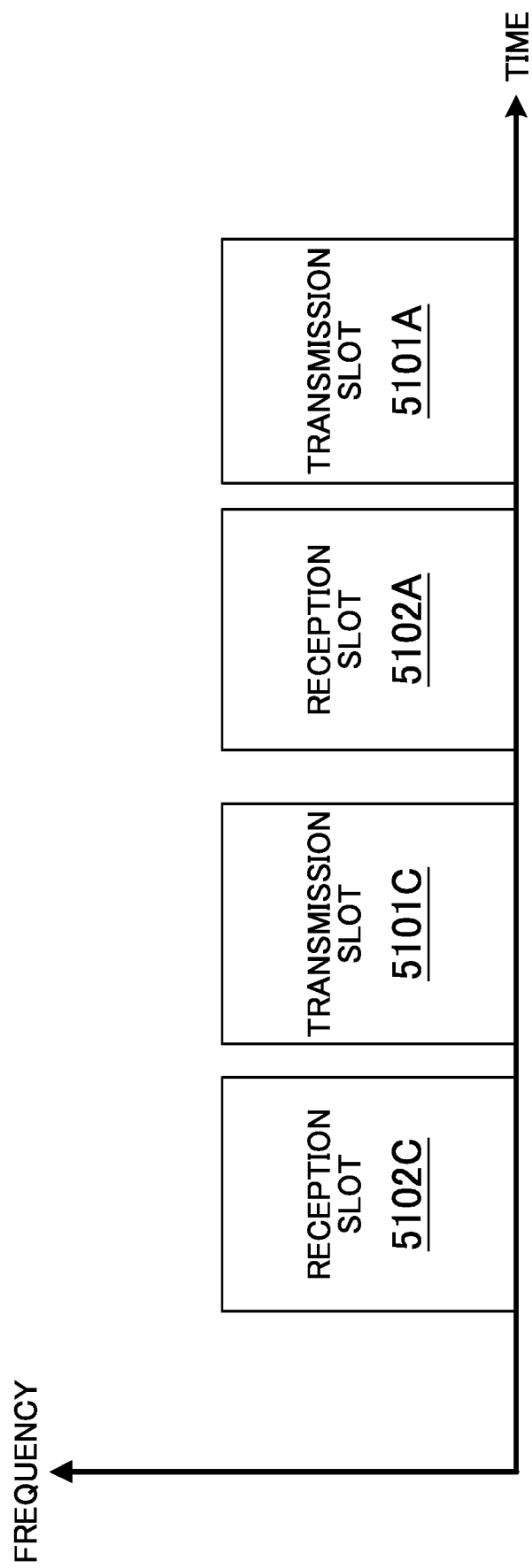
FIG. 48 illustrates an example of slot allocation.

FIG. 48 illustrates a variation of slot allocation to repeater 4900B of FIG. 46.

An example of FIG. 48 illustrates that reception slot 5102C for reception from repeater 4900C, transmission slot 5101C for transmission to repeater 4900C, reception slot 5102A for reception from repeater 4900A, and transmission slot 5101A for transmission to repeater 4900A are allocated to repeater 4900B successively on the time axis. That is, FIG. 48 illustrates an example of pairs of slots each of which is composed of the "reception slot and transmission slot for the same repeater" allocated consecutively.

A guard period may be provided between reception slot 5102C and transmission slot 5101C. Similarly, a guard period may be provided between reception slot 5102A and transmission slot 5101A. Note that, the guard period is a period in which no modulation signal exists, for example.

Repeater 4900B directs the beam directivity toward repeater 4900C (performs directivity control) during the period of reception slot 5102C for receiving the modulation signal transmitted by repeater 4900C. Repeater 4900B directs the beam directivity toward repeater 4900C during the period of transmission slot 5101C for transmitting the modulation signal.

Repeater 4900B directs the beam directivity toward repeater 4900A during the period of reception slot 5102A for receiving the modulation signal transmitted by repeater 4900A. Repeater 4900B directs directivity toward repeater 4900A during the period of transmission slot 5101A for transmitting the modulation signal.

The reception slot and the transmission slot for the same repeater are consecutively allocated as illustrated in FIG. 48, so that repeater 4900B only has to direct the beam directivity toward repeater 4900C during the period of reception slot 5102C and transmission slot 5101C, and only has to direct the beam directivity toward repeater 4900A during the period of reception slot 5102A and transmission slot 5101A. Therefore, the directivity control of the beam in repeater 4900B is facilitated.

Note that the slot allocation system illustrated in FIG. 47 and the slot allocation system illustrated in FIG. 48 may be switched according to conditions of radio communication, propagation environment, and/or the like. For example, repeater 4900B may transmit predetermined switching information to repeaters 4900A and 4900C according to a change in such conditions to switch the slot allocation system.

Accordingly, a suitable transmission method is selected according to a communication condition, so that it is possible to obtain an effect of achieving both the improvement of the reception data quality and the improvement of the data transmission rate.

Embodiment 9

Figure 49:
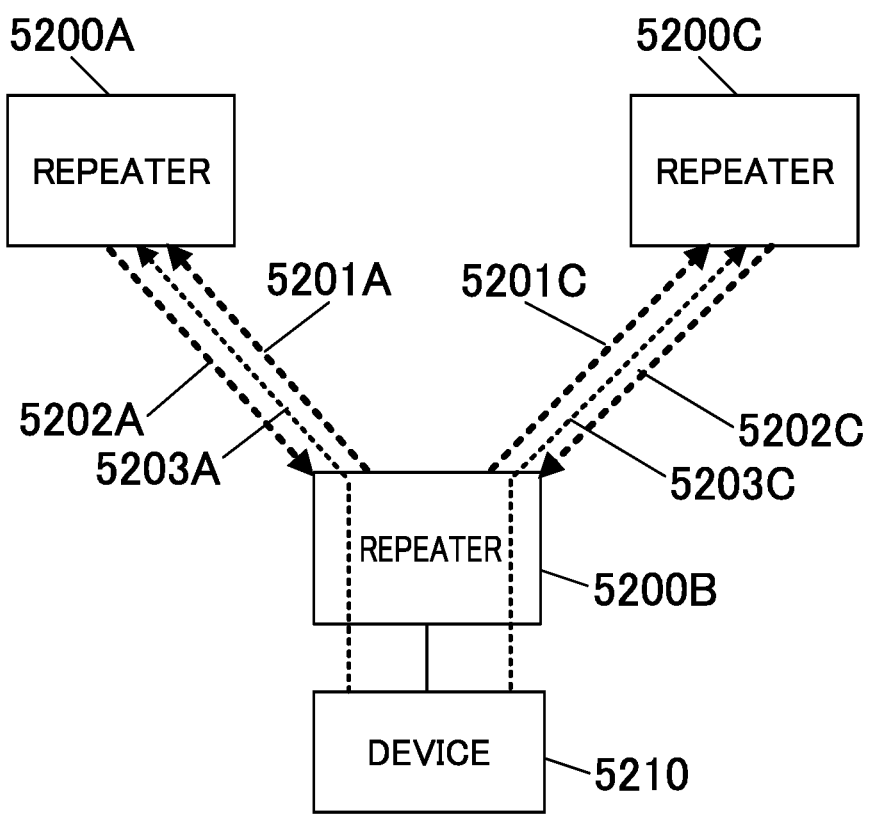
FIG. 49 illustrates an example of connection between the repeaters.

FIG. 49 illustrates an example of connection between repeaters according to Embodiment 9.

FIG. 49 differs from FIG. 46 in that device 5210 is connected to repeater 5200B.

Device 5210 is an image capturing device for capturing a moving image or a still image (e.g., a surveillance camera), a predetermined sensor, or a radio base station, for example. Repeater 5200B and device 5210 are connected to each other by an interface (I/F) such as a USB. However, the I/F between repeater 5200B and device 5210 is not limited to this, and may be a gigabit class Ethernet, for example. The I/F is not limited to a wired interface, but may also be a radio interface. Repeater 5200B and device 5210 may also constitute a single device or a single system.

As in FIG. 46, repeater 5200B receives modulation signal 5202A transmitted by repeater 5200A, and transmits modulation signal 5201C corresponding to received modulation signal 5202A to repeater 5200C. Repeater 5200B also receives modulation signal 5202C transmitted by repeater 5200C, and transmits modulation signal 5201A corresponding to received modulation signal 5202C to repeater 5200A. That is, repeater 5200B relays the modulation signal between repeater 5200A and repeater 5200C.

Note that modulation signal 5202A and modulation signal 5201C are not necessarily the same modulation signal. Modulation signal 5202A and modulation signal 5201C at least contain the same information (which is referred to as first information) or information relevant to the first information.

Note also that, the modulation scheme for generating modulation signal 5202A and the modulation scheme for generating modulation signal 5201C are not necessarily the same. Further, the error correction coding scheme for generating modulation signal 5202A and the error correction coding scheme for generating modulation signal 5201C are not necessarily the same. In addition, modulation signal 5202C and modulation signal 5201A are not necessarily the same modulation signal.

Modulation signal 5202C and modulation signal 5201A at least contain the same information (which is referred to as second information) or contain information relevant to the second information. In addition, the modulation scheme for generating modulation signal 5202C and the modulation scheme for generating modulation signal 5201A are not necessarily the same. Further, the error correction coding scheme for generating modulation signal 5202C and the error correction coding scheme for generating modulation signal 5201A are not necessarily the same.

In addition, repeater 5200B receives data transmitted by device 5210 connected to repeater 5200B or a modulation signal including the data, generates a modulation signal including at least part of the data transmitted by device 5210 or at least part of data relevant to the transmitted data, and transmits the modulation signal to repeater 5200A as modulation signal 5203A.

Repeater 5200B also receives data transmitted by device 5210 or a modulation signal including the data, generates a modulation signal including at least part of the data transmitted by device 5210 or at least part of data relevant to the transmitted data, and transmits the modulation signal to repeater 5200C as modulation signal 5203C.

Note that, an example of the "relevant information" and "relevant data" described above will be described.

For example, apparatus A performs first encoding on a video of a first scene to generate first data, and performs second encoding on the video of the first scene to generate second data. At this time, the first data and the second data are in a relationship of "relevant information" or "relevant data."

Further, apparatus B obtains the generated first data, generates the video of the first scene from the first data, and performs the second encoding again to generate the second data, for example. At this time, the first data and the second data are in a relationship of "relevant information" or "relevant data." Note that, this point is applicable to all the embodiments included in the present specification.

Note that, the basic operation of the directivity control of the beam for transmission and reception of the modulation signal is the same as in the case of FIG. 46 and, therefore, the description thereof is omitted.

Figure 50:
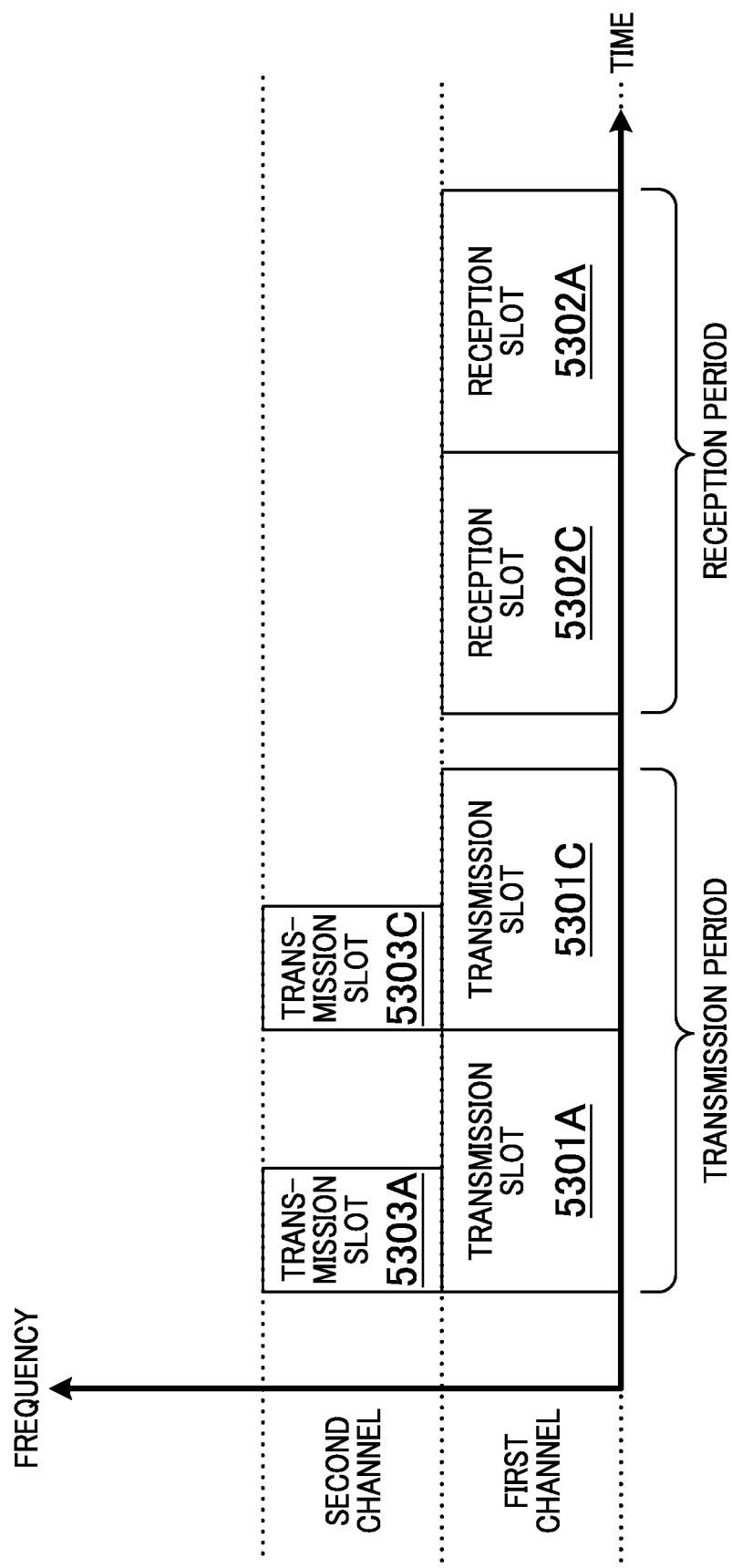
FIG. 50 illustrates an example of slot allocation.

FIG. 50 illustrates an example of slot allocation to repeater 5200B of FIG. 49. Note that, the horizontal axis represents time and the vertical axis represents the frequency in FIG. 50. In addition, a first channel formed in a first frequency band and a second channel formed in a second frequency band are illustrated in FIG. 50.

FIG. 50 illustrates that transmission slot 5301A for transmission to repeater 5200A, transmission slot 5301C for transmission to repeater 5200C, reception slot 5302C for reception from repeater 5200C, and reception slot 5302A for reception from repeater 5200C are allocated to repeater 5200B in the first channel successively on the time axis.

In addition, FIG. 50 illustrates that transmission slot 5303A for transmitting to repeater 5200A a modulation signal containing at least part of data transmitted by device 5210 or at least part of data relevant to the transmitted data, and transmission slot 5303C for transmitting to repeater 5200C a modulation signal containing at least part of the data transmitted by device 5210 or at least part of data relevant to the transmitted data are allocated to repeater 5200B in the second channel. Note that, as already described, repeater 5200B has a mechanism for obtaining the data transmitted by device 5210.

The first channel and the second channel are channels (frequency domains) different from each other. Note that, the first channel and the second channel may be adjacent to each other or may be separated from each other.

Accordingly, when device 5210 is newly connected to repeater 5200B, transmission slots 5303A and 5303C for transmitting modulation signals containing at least part of data transmitted by device 5210 or at least part of data relevant to the transmitted data can be allocated to repeater 5200B without changing allocation of existing slots to repeater 5200B (for example, the allocation of the slots in the first channel). That is, it is possible to omit allocation change of the existing slots when a new slot is allocated to a repeater.

In addition, transmission slot 5303A can be allocated such that the period of transmission slot 5303A for transmitting to repeater 5200A a modulation signal containing at least part of data transmitted by device 5210 or at least part of data relevant to the transmitted data is within the period of transmission slot 5301A for transmission also to repeater 5200A as illustrated in FIG. 50.

Similarly, transmission slot 5303C can be allocated such that the period of transmission slot 5303C for transmitting to repeater 5200C a modulation signal containing at least part of data transmitted by device 5210 or at least part of data relevant to the transmitted data is within the period of transmission slot 5301C for transmission also to repeater 5200C.

Accordingly, repeater 5200B only has to direct the beam directivity toward repeater 5200A during the period of transmission slot 5301A, and direct the beam directivity toward repeater 5200C during the period of transmission slot 5301C. Accordingly, the directivity control of the beam in repeater 5200B is facilitated. For example, it is possible for repeater 5200B to use a common precoding matrix for transmission slot 5301A and transmission slot 5303A, so that an effect of allowing simplification of the procedure for beamforming and simplification of at least part of the signal processing is obtained.

Note that, reception slots 5302C and 5302A illustrated in FIG. 50 are basically the same as in the case of FIG. 47 and, therefore, the descriptions thereof are omitted.

Figure 51:
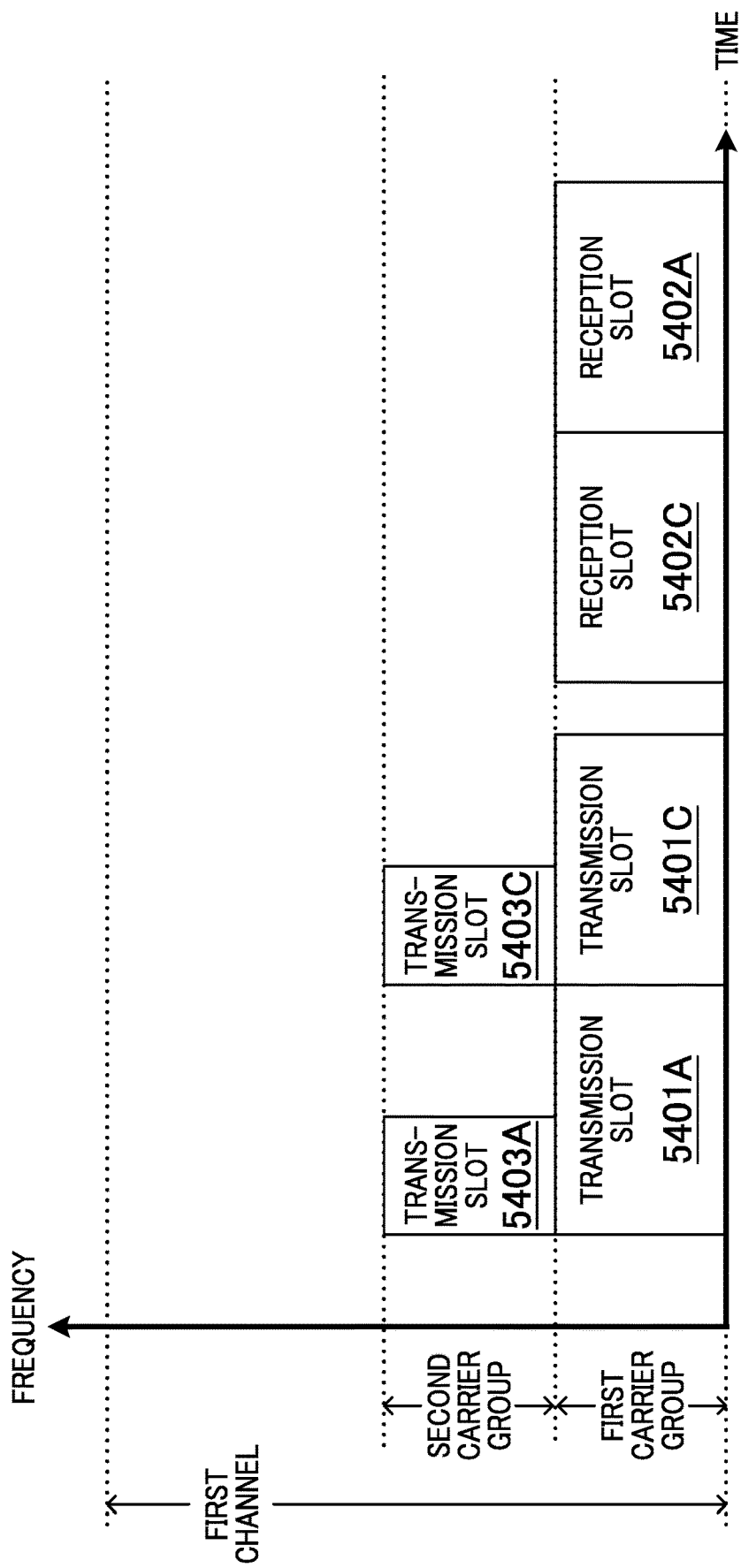
FIG. 51 illustrates an example of slot allocation.

FIG. 51 illustrates a variation of slot allocation to repeater 5200B of FIG. 49. Note that, likewise in FIG. 50, the horizontal axis represents time and the vertical axis represents the frequency in FIG. 51. In addition, a channel formed in the first frequency band is called a first channel, and the first channel includes a first carrier group composed of one or more carriers and a second carrier group composed of one or more carriers.

FIG. 51 illustrates that transmission slot 5401A for transmission to repeater 5200A, transmission slot 5401C for transmission to repeater 5200C, reception slot 5402C for reception from repeater 5200C, and reception slot 5402A for reception from repeater 5200C are allocated to repeater 5200B successively on the time axis in the first carrier group of the first channel.

In addition, FIG. 51 illustrates that transmission slot 5403A for transmitting to repeater 5200A a modulation signal including at least part of data transmitted by device 5210 or at least part of data relevant to the transmitted data, and transmission slot 5403C for transmitting to repeater 5200C a modulation signal including at least part of data transmitted by device 5210 or at least part of data relevant to the transmitted data are allocated to repeater 5200B in the second carrier group of the first channel. Note that, as already described, repeater 5200B holds a mechanism for obtaining the data transmitted by device 5210.

Each of the first carrier group and the second carrier group includes one or more carriers. The first carrier group and the second carrier group respectively have frequency domains different from each other. The number of carriers in the first carrier group and the number of carriers in the second carrier group may be the same as each other or different from each other. The first carrier group and the second carrier group may be adjacent to each other or may be separated from each other.

Accordingly, when device 5210 is newly connected to repeater 5200B, transmission slots 5403A and 5403C for transmitting modulation signals containing at least part of data transmitted by device 5210 or at least part of data relevant to the transmitted data can be allocated to repeater 5200B without changing allocation of existing slots to repeater 5200B (for example, the allocation of the slots in the first carrier group). That is, it is possible to omit allocation change of the existing slots when a new slot is allocated to a repeater.

In addition, an effect of adjustability of the data transmission rate with slots in the carrier groups is obtained, which is achieved by adjusting the number of carriers constituting the carrier groups. For example, when the data amount of the signal from device 5210 is small, the second carrier group may be constituted by a small number of carriers, whereas when the data amount of the signal from device 5210 is large, the second carrier group may be constituted by a large number of carriers.

In addition, transmission slot 5403A can be allocated such that the period of transmission slot 5403A for transmitting to repeater 5200A a modulation signal containing at least part of data transmitted by device 5210 or at least part of data relevant to the transmitted data is within the period of transmission slot 5401A for transmission also to repeater 5200A as illustrated in FIG. 51.

Similarly, transmission slot 5403C can be allocated such that the period of transmission slot 5403C for transmitting to repeater 5200C a modulation signal containing at least part of data transmitted by device 5210 or at least part of data relevant to the transmitted data is within the period of transmission slot 5401C for transmission also to repeater 5200C.

Accordingly, repeater 5200B only has to direct the beam directivity toward repeater 5200A during the period of transmission slot 5401A, and direct the beam directivity toward repeater 5200C during the period of transmission slot 5401C.

Accordingly, the directivity control of the beam in repeater 5200B is facilitated. For example, it is possible for repeater 5200B to use a common precoding matrix for transmission slot 5401A and transmission slot 5403A, so that an effect of allowing simplification of the procedure for beamforming and simplification of at least part of the signal processing is obtained.

Note that the basic operation of reception slots 5402C and 5402A illustrated in FIG. 51 is the same as in the case of FIG. 47 and, therefore, the description thereof is omitted.

Figure 52:
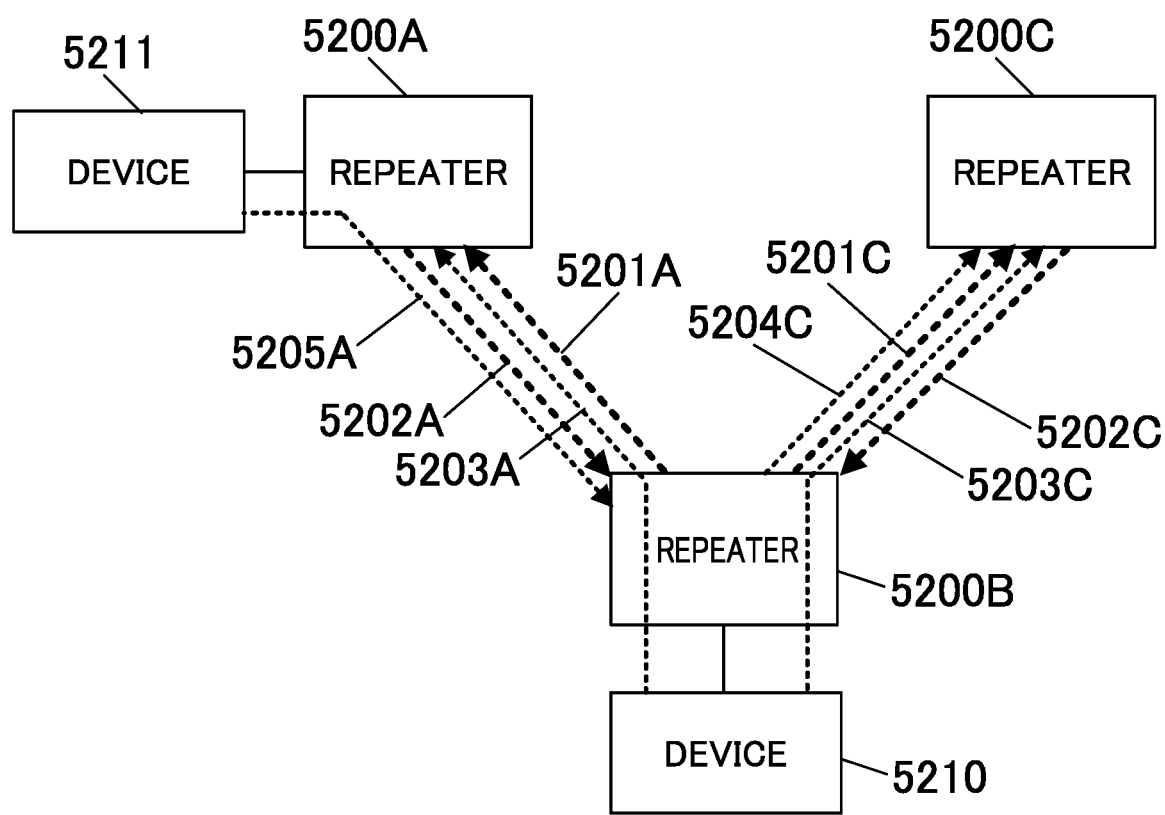
FIG. 52 illustrates an example of connection between the repeaters.

FIG. 52 illustrates a variation of connection between repeaters according to Embodiment 9.

FIG. 52 differs from FIG. 49 in that device 5211 is connected to repeater 5200A. Similarly to device 5210 in FIG. 49, device 5211 is an image capturing device for capturing a moving image or a still image (e.g., a surveillance camera), a predetermined sensor, or a radio base station, for example.

Repeater 5200B also performs the following processing in addition to the processing described with reference to FIG. 49. That is, repeater 5200A receives data transmitted by device 5211, and transmits to repeater 5200B modulation signal 5205A including at least part of the received data or at least part of data relevant to the received data.

Then, repeater 5200B transmits to repeater 5200C modulation signal 5204C including at least part of the data obtained by receiving this modulation signal 5205A or at least part of data relevant to the obtained data. That is, repeater 5200B relays to repeater 5200C the modulation signal including at least part of the data transmitted by device 5211 or at least part of the data relevant to the data transmitted by device 5211.

Figure 53:
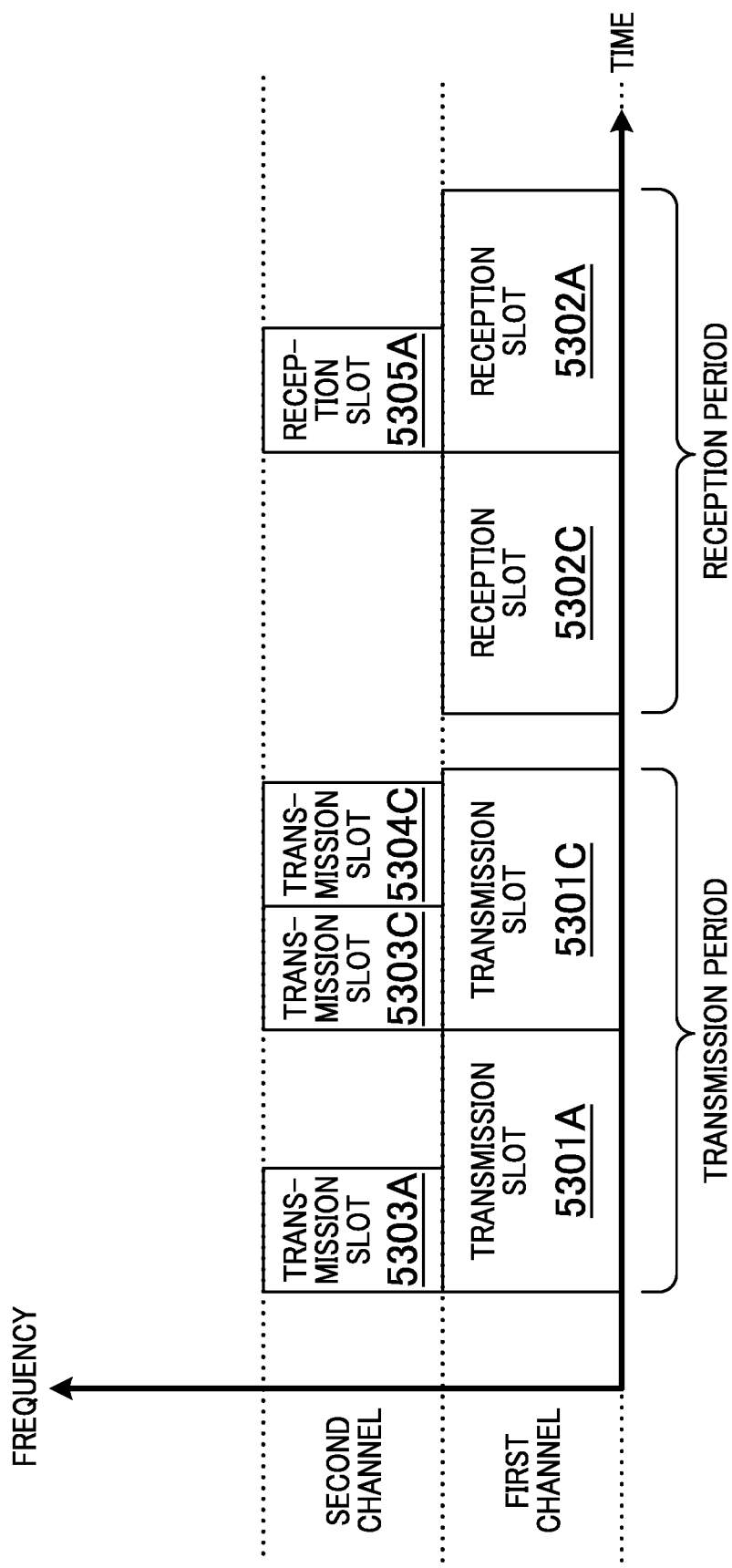
FIG. 53 illustrates an example of slot allocation.

FIG. 53 illustrates an example of slot allocation to repeater 5200B of FIG. 52.

FIG. 53 differs from FIG. 50 in the second channel in terms of the following points.

Repeater 5200A transmits a modulation signal generated from at least part of the data obtained from connected device 5211 or at least part of the data relevant to the obtained data. The transmitted modulation signal is then received by repeater 5200B. The reception slot for repeater 5200B to receive this modulation signal is reception slot 5305A in FIG. 53.

In addition, repeater 5200B transmits to repeater 5200C the data obtained in last or other previous reception slot 5305A. The transmission slot for repeater 5200B to transmit the modulation signal including this data is transmission slot 5304C.

Accordingly, when device 5211 is newly connected to repeater 5200A, transmission slot 5304C and reception slot 5305A can be allocated in the second channel without changing the allocation of the existing slots in the first channel to repeater 5200B (for example, the allocation of the slots illustrated in FIG. 50). That is, it is possible to obtain an effect of allowing omission of allocation change of existing slots when a new slot is allocated to a repeater.

Further, as illustrated in FIG. 53, transmission slot 5304C is allocated such that the period of transmission slot 5304C is within the period of transmission slot 5301C for transmission also to repeater 5200C and is different from the period of transmission slot 5303C which has already been allocated previously.

Thus, repeater 5200B only has to direct the beam directivity toward repeater 5200C during the period of transmission slot 5301C. Accordingly, the directivity control of the beam in repeater 5200B is facilitated. For example, it is possible for repeater 5200B to use a common precoding matrix for transmission slot 5301C, transmission slot 5303C, and transmission slot 5304C, so that an effect of allowing simplification of the procedure for beamforming and simplification of at least part of the signal processing is obtained.

Figure 54:
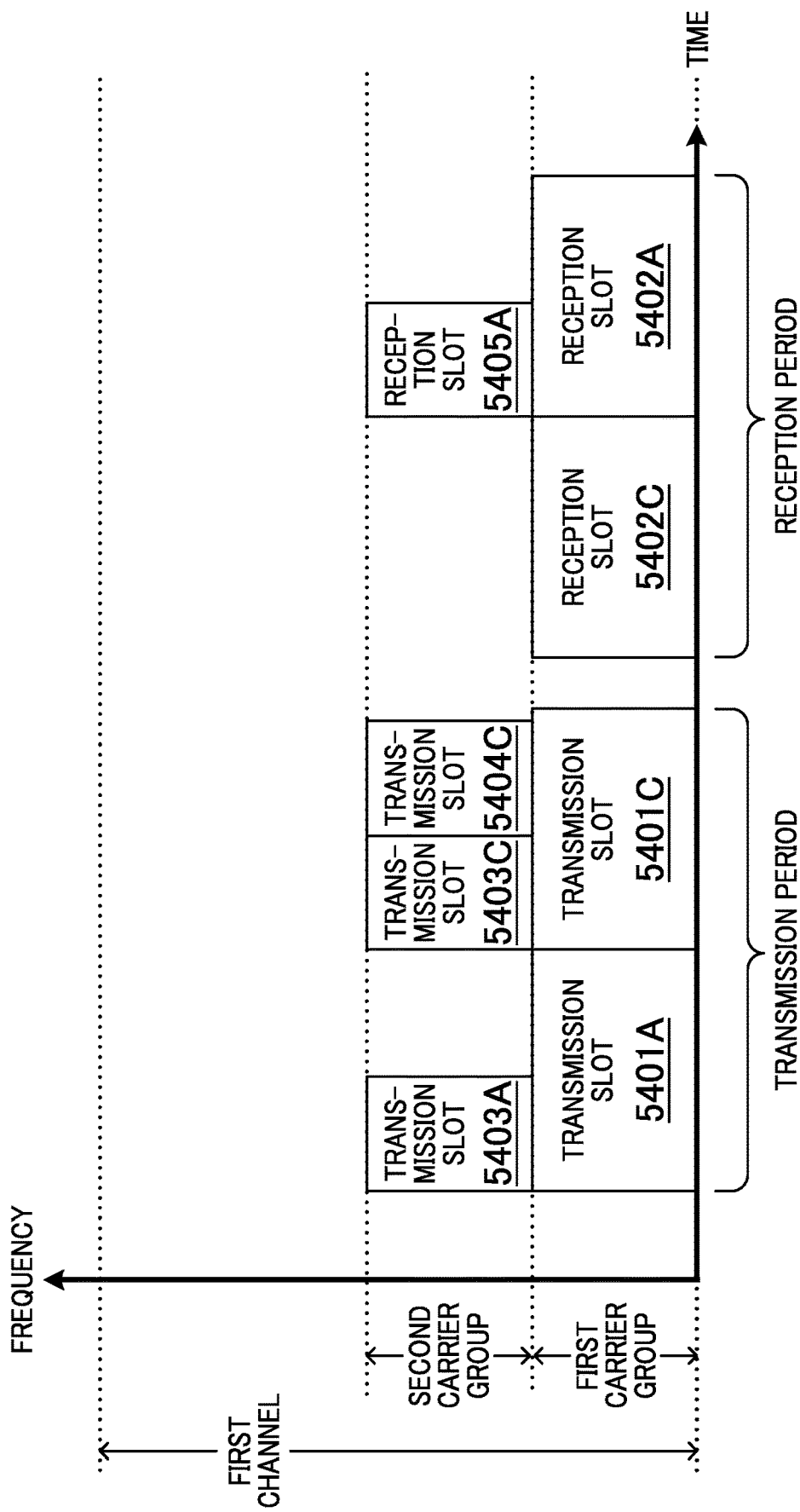
FIG. 54 illustrates an example of slot allocation.

FIG. 54 illustrates Variation 1 of the slot allocation to repeater 5200B of FIG. 52.

FIG. 54 differs from FIG. 51 in the second carrier group of the first channel in terms of the following points.

Repeater 5200A transmits a modulation signal generated from at least part of data obtained from connected device 5211 or at least part of data relevant to the obtained data. Then, repeater 5200B receives the modulation signal transmitted by repeater 5200A. That is, the slot for reception from repeater 5200A is reception slot 5405A in FIG. 54.

In addition, repeater 5200B transmits the data obtained in reception slot 5405A to repeater 5200C. The slot for transmitting the modulation signal including the data to be transmitted to repeater 5200C is transmission slot 5404C.

Accordingly, when device 5211 is newly connected to repeater 5200A, transmission slot 5404C and reception slot 5405A can be allocated without changing the allocation of the existing slots to repeater 5200B (for example, the allocation of the slots illustrated in FIG. 51). That is, it is possible to obtain an effect of allowing omission of allocation change of existing slots when a new slot is allocated to a repeater.

Further, as illustrated in FIG. 54, transmission slot 5404C is allocated such that the period of transmission slot 5404C is within the period of transmission slot 5401C for transmission also to repeater 5200C and is different from the period of transmission slot 5403C which has already been allocated previously.

Thus, repeater 5200B only has to direct the beam directivity toward repeater 5200C during the period of transmission slot 5401C. Accordingly, the directivity control of the beam in repeater 5200B is facilitated. For example, it is possible for repeater 5200B to use a common precoding matrix for transmission slot 5401C, transmission slot 5403C, and transmission slot 5404C, so that an effect of allowing simplification of the procedure for beamforming and simplification of at least part of the signal processing is obtained.

Figure 55:
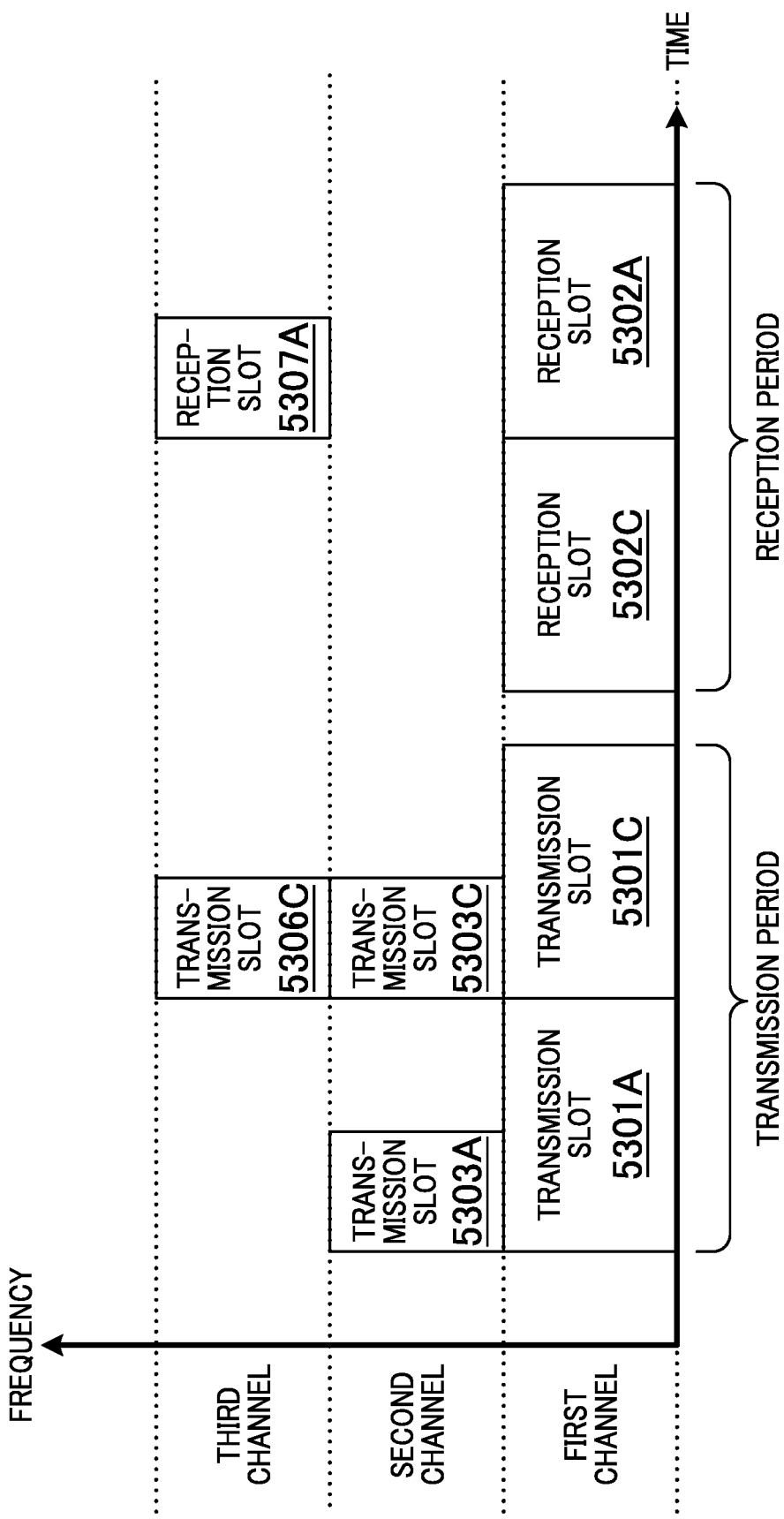
FIG. 55 illustrates an example of slot allocation.

FIG. 55 illustrates Variation 2 of the slot allocation to repeater 5200B of FIG. 52.

FIG. 55 differs from FIG. 50 in the third channel in terms of the following points.

Repeater 5200A transmits a modulation signal generated from at least part of data obtained from connected device 5211 or at least part of data relevant to the obtained data. The transmitted modulation signal is then received by repeater 5200B. The slot for reception from repeater 5200A is reception slot 5307A in FIG. 55.

In addition, repeater 5200B transmits the data obtained in reception slot 5307A to repeater 5200C. The transmission slot for transmitting the modulation signal including the data to be transmitted to repeater 5200C is transmission slot 5306C.

Accordingly, when device 5211 is newly connected to repeater 5200A, transmission slot 5306C and reception slot 5307A can be allocated without changing the allocation of the existing slots to repeater 5200B (for example, the allocation of the slot illustrated in FIG. 50). That is, it is possible to obtain an effect of allowing omission of allocation change of existing slots when a new slot is allocated to a repeater.

Further, as illustrated in FIG. 55, transmission slot 5306C is allocated such that the period of transmission slot 5306C is within the period of transmission slot 5301C for transmission also to repeater 5200C and the channel of transmission slot 5306C is a channel different from those of transmission slots 5301C and 5303C which have already been allocated previously.

Thus, repeater 5200B only has to direct the beam directivity toward repeater 5200C during the period of transmission slot 5301C. Accordingly, the directivity control of the beam in repeater 5200B is facilitated. For example, it is possible for repeater 5200B to use a common precoding matrix for transmission slot 5301C, transmission slot 5303C, and transmission slot 5306C, so that an effect of allowing simplification of the procedure for beamforming and simplification of at least part of the signal processing is obtained.

Figure 56:
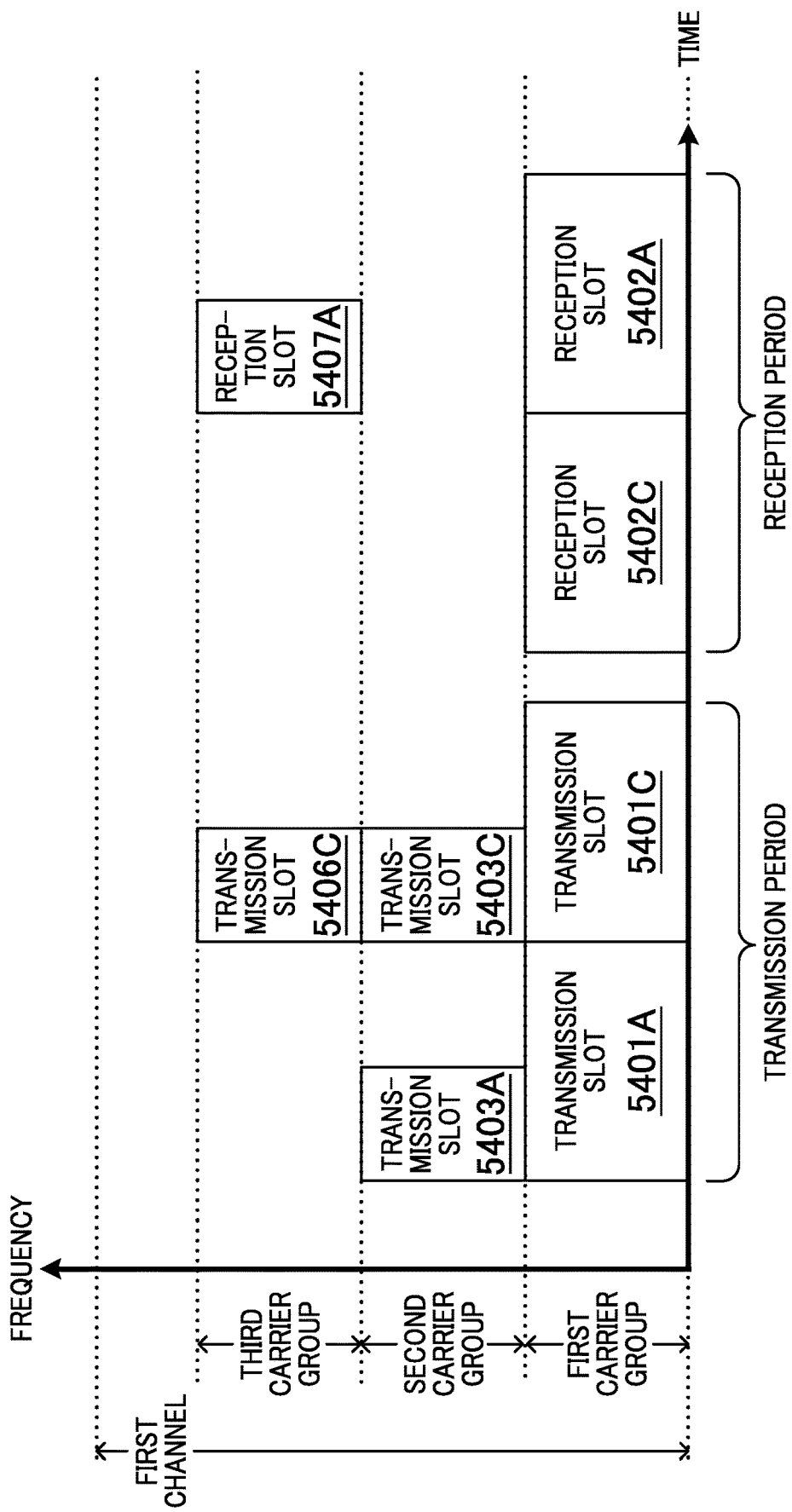
FIG. 56 illustrates an example of slot allocation.

FIG. 56 illustrates Variation 3 of the slot allocation to repeater 5200B of FIG. 52.

FIG. 56 differs from FIG. 51 in the third carrier group in terms of the following points.

Repeater 5200A transmits a modulation signal generated from at least part of data obtained from connected device 5211 or at least part of data relevant to the obtained data. Then, repeater 5200B receives the modulation signal transmitted by repeater 5200A. That is, the slot for reception from repeater 5200A is reception slot 5407A in FIG. 56.

In addition, repeater 5200B transmits the data obtained in reception slot 5407A to repeater 5200C. The slot for transmitting the modulation signal including the data to be transmitted to repeater 5200C is transmission slot 5406C.

Accordingly, when device 5211 is newly connected to repeater 5200A, transmission slot 5406C and reception slot 5407A can be allocated without changing the allocation of the existing slots to repeater 5200B (for example, the allocation of the slots illustrated in FIG. 51). That is, it is possible to obtain an effect of allowing omission of allocation change of existing slots when a new slot is allocated to a repeater.

Further, as illustrated in FIG. 56, transmission slot 5406C is allocated such that the period of transmission slot 5406C is within the period of transmission slot 5401C for transmission also to repeater 5200C and the carrier group of transmission slot 5406C is a carrier group different from those of transmission slots 5401C and 5403C which have already been allocated previously.

Thus, repeater 5200B only has to direct the beam directivity toward repeater 5200C during the period of transmission slot 5401C. Accordingly, the directivity control of the beam in repeater 5200B is facilitated. For example, it is possible for repeater 5200B to use a common precoding matrix for transmission slot 5401C, transmission slot 5403C, and transmission slot 5406C, so that an effect of allowing simplification of the procedure for beamforming and simplification of at least part of the signal processing is obtained.

Figure 57:
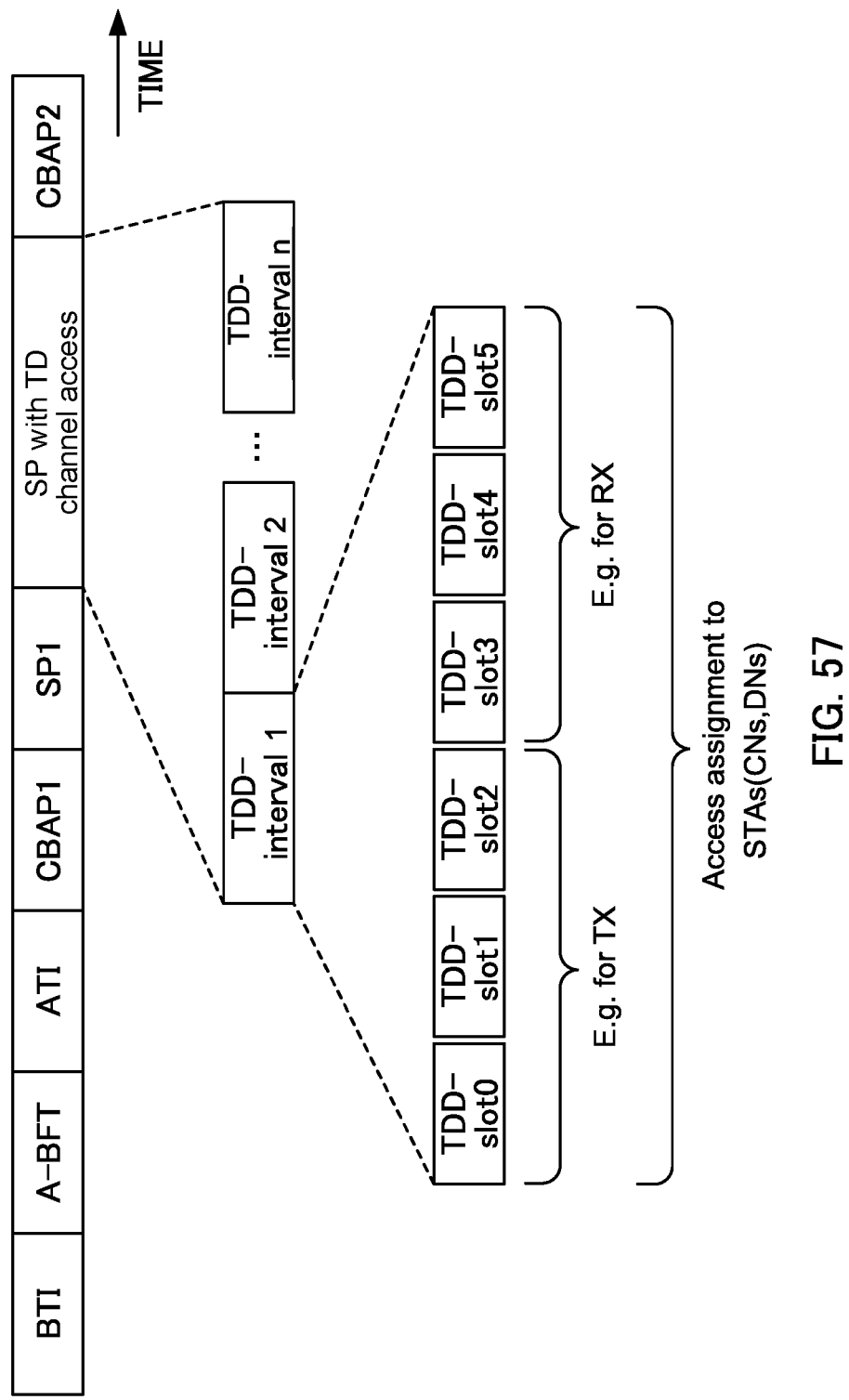
FIG. 57 illustrates an example of a configuration of a radio signal transmitted and received between the repeaters.

FIG. 57 illustrates an example of the configuration of a signal transmitted and received between repeaters.

The signal between the repeaters may have a configuration of a frame according to IEEE802.11ad or IEEE802.11ay illustrated in FIG. 57.

FIG. 57 illustrates an example of the frame configuration whose horizontal axis represents time. In FIG. 57, the "BTI" stands for Beacon Transmission Interval. The "A-BFT" stands for Association Beamforming Training. The "ATI" stands for Announcement Transmission Interval. There are "CBAP1" and "CBAP2," and "CBAP" stands for Contention-Based Access Period. The "SP" denotes Scheduled Service Period. The "TDD" stands for Time Division Duplex. The "STA" denotes Station. The "TX" denotes Transmitter, and "RX" denotes Receiver.

In the frame of FIG. 57, a repeater transmits "BTI," "A-BFT," "ATI," "CBAP1," "SP1," "SP with Time Division (TD) channel access," and "CBAP2" in this order.

The "SP with TD channel access" is composed of "TDD interval 1," "TDD interval 2," . . . , and "TDD interval n." Note that "n" is an integer equal to or greater than 1. Note also that each of the "TDD intervals" is composed of one or more TDD slots.

For example, the slots described with reference to FIGS. 45 to 56 may be composed of the TDD-slots illustrated in FIG. 57. By way of illustration, the transmission slots may correspond to TDD-slots 0 to 2 illustrated in FIG. 57, and the reception slots may correspond to TDD-slots 3 to 5 illustrated in FIG. 57. Note that, the frequency axis is not indicated in FIG. 57.

Note also that, the repeaters described with reference to FIGS. 45 to 56 may have the configuration illustrated in FIG. 1, for example. For example, reception-antenna group 151, radio group 153, and signal processor 155 serve as a processor (processing circuit) for demodulating the reception slots in FIGS. 45 to 56. In addition, signal processor (signal processing circuit) 102, radios (radio circuits) 104-1 to 104-M, and antennas 106-1 to 106-M perform processing for transmitting modulation signals in the transmission slots.

Setter (setting circuit) 158 performs scheduling of the transmission slots and the reception slots, and performs transmission processing of the transmission slots and reception processing of the reception slots properly.

Note that, a "transmission scheme for transmitting one stream (or one modulation signal)" or a "transmission scheme for transmitting two or more streams (or two or more modulation signals)" may be used in the transmission slots and the reception slots in FIGS. 47, 48, 50, 51, 53, 54, 55, and 56 of the present embodiment.

The configuration of the repeaters is not limited to the configuration of FIG. 1. For example, as for the transmission function and the reception function, the repeaters may be configured to support "transmission and reception of a single stream." Therefore, radios 104-2 to 104-M and antennas 106-2 to 106-M may be omitted, and each of the repeaters may be configured, for example, with radio 104-1 and antenna 106-1 in FIG. 1.

In addition, each of the transmission slots and each of the reception slots in FIGS. 47, 48, 50, 51, 53, 54, 55, and 56 of the present embodiment may exist at the same time when the directivity control of the transmission beam and the directivity control of the reception beam are performed independently as described in relation to other embodiments.

The frequency band in which a transmission slot exists and the frequency band in which a reception slot exists may be arranged in different frequency bands, and the channel in which a transmission slot exists and the channel in which a reception slot exists may be arranged in different channels. Further, the carrier group in which a transmission slot exists and the carrier group in which a reception slot exists may be arranged in different carrier groups.

As described above, the repeater operates according to the present embodiment to provide another repeater with data provided by an apparatus other than the repeater, and such relaying of data allows addition of a new function. A relaying method performed according to the present embodiment provides an effect of allowing omission of allocation change of existing slots in allocating a new slot.

Variation 1 of Embodiment 9

Although Embodiment 9 has been described in which device 5210 in FIGS. 49 and 52 and device 5211 in FIG. 52 may be a radio base station, those devices may also be a wired base station using wired communication instead of radio communication, or a communication device using a wire.

(Supplementary Description)

Hereinafter, a supplementary description will be given of the transmission apparatus, the reception apparatus, the transmission method, and the reception method of the present disclosure.

The transmission apparatus according to one aspect of the present disclosure is a transmission apparatus including a plurality of transmission antennas, the transmission apparatus including: a signal processor that modulates data of a first stream to generate a first baseband signal, and modulates data of a second stream to generate a second baseband signal; and a transmission section that generates from the first baseband signal a plurality of first transmission signals having respective different directivities, generates from the second baseband signal a plurality of second transmission signals having respective different directivities, and transmits the plurality of first transmission signals and the plurality of second transmission signals at the same time, in which, when receiving a request for transmission of the first stream from a terminal, the transmission section further generates from the first baseband signal a plurality of third transmission signals being different from the plurality of first transmission signals and having respective different directivities, and transmits the plurality of third transmission signals.

Each of the plurality of first transmission signals and the plurality of second transmission signals may include a control signal for indicating which one of the data of the first stream and the data of the second stream is transmitted by the transmission signal.

Each of the plurality of first transmission signals and the plurality of second transmission signals may include a training signal for a reception apparatus to perform directivity control.

The reception apparatus according to one aspect of the present disclosure is a reception apparatus including a plurality of reception antennas, the reception apparatus including: a reception section that selects at least one first signal and at least one second signal among a plurality of first signals and a plurality of second signals transmitted by a transmission apparatus at the same time, the plurality of first signals being for transmitting data of a first stream and having respective different directivities, the plurality of second signals being for transmitting data of a second stream and having respective different directivities, and then performs directivity control for receiving a plurality of selected signals, so as to receive the plurality of selected signals; a signal processor that demodulates the received signals and outputs data of the first stream and data of the second stream; and a transmission section that requests, from the transmission apparatus, transmission of the first stream when the at least one first signal has not been received by the reception section.

The reception section may select the at least one first signal and the at least one second signal based on a control signal for indicating which one of the data of the first stream and the data of the second stream included in a plurality of reception signals is transmitted by the signal.

The reception section may perform directivity control using a training signal included in each of the plurality of reception signals.

The transmission method according to one aspect of the present disclosure is a transmission method performed by a transmission apparatus including a plurality of transmission antennas, the transmission method including: processing of modulating data of a first stream to generate a first baseband signal, and modulating data of a second stream to generate a second baseband signal; and processing of generating from the first baseband signal a plurality of first transmission signals having respective different directivities, generating from the second baseband signal a plurality of second transmission signals having respective different directivities, and transmitting the plurality of first transmission signals and the plurality of second transmission signals at the same time, in which, in the transmission processing, a plurality of third transmission signals being different from the plurality of first transmission signals and having respective different directivities are further generated from the first baseband signal and transmitted when a request for transmission of the first stream is received from a terminal.

The reception method according to one aspect of the present disclosure is a reception method performed by a reception apparatus including a plurality of reception antennas, the reception method including: processing of selecting at least one first signal and at least one second signal among a plurality of first signals and a plurality of second signals transmitted by a transmission apparatus at the same time, the plurality of first signals being for transmitting data of a first stream and having respective different directivities, the plurality of second signals being for transmitting data of a second stream and having respective different directivities, and then performing directivity control for receiving a plurality of selected signals, so as to receive the plurality of selected signals; processing of demodulating the received signals and outputting data of the first stream and data of the second stream; and processing of requesting, from the transmission apparatus, transmission of the first stream when the at least one first signal has not been received in the reception processing.

The communication apparatus according to one aspect of the present disclosure is a communication apparatus that relays a relay signal transmitted and received between a first communication apparatus and a second communication apparatus, and that is additionally connected to a first device, in which the communication apparatus transmits the relay signal using a first transmission slot, and transmits a signal from the first device using a second transmission slot during a transmission period of the first transmission slot in a frequency domain different from a frequency domain of the first transmission slot.

During the period of the first transmission slot, the communication apparatus according to one aspect of the present disclosure directs directivity toward another communication apparatus to which the first transmission slot is to be transmitted.

In the communication apparatus according to one aspect of the present disclosure, a second device is connected to the first communication apparatus or the second communication apparatus, and the communication apparatus transmits a signal using a third transmission slot in a frequency domain different from the frequency domain of the first transmission slot and the frequency domain of the second transmission slot, the signal being a signal received from the second device via a communication apparatus to which the second device is connected.

In the communication apparatus according to one aspect of the present disclosure, a second device is connected to the first communication apparatus or the second communication apparatus, and the communication apparatus transmits a signal using a third transmission slot during the period of the first transmission slot in a frequency domain common to the second transmission slot, the signal being a signal received from the second device via a communication apparatus to which the second device is connected.

The communication method according to one aspect of the present disclosure is a communication method for a communication apparatus that relays a relay signal transmitted and received between a first communication apparatus and a second communication apparatus, and that is additionally connected to a first device, the communication method including: transmitting the relay signal using a first transmission slot; and transmitting a signal from the first device using a second transmission slot during a period of the first transmission slot in a frequency domain different from a frequency domain of the first transmission slot.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a radio LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

According to the present disclosure, there is a possibility of achieving a greater communication distance in multicast/broadcast communication with a plurality of streams than in the case where an antenna of a quasi-omni pattern is used.

INDUSTRIAL APPLICABILITY

The present disclosure is useful in communication using a plurality of antennas.

REFERENCE SIGNS LIST

700 Base station
701 Antenna
702, 703 Transmission beam
704 Terminal
705, 706 Reception directivity

The invention claimed is:

1. A relay apparatus comprising:
a receiver which, in operation, receives a first relay signal from a first relay apparatus and receives a first data signal from a first device that is physically or wirelessly connected to the relay apparatus;
a processor which, in operation, allocates a first transmission slot for the first relay signal in a first time period over a first frequency domain and allocates a second transmission slot for the first data signal within the first time period over a second frequency domain different from the first frequency domain; and
a transmitter which, in operation, transmits the first relay signal to a second relay apparatus by using the first transmission slot, and transmits the first data signal to the second relay apparatus by using the second transmission slot.

2. The relay apparatus according to claim 1, wherein the transmission of the first relay signal and the transmission of the first data signal are performed by using a single transmission beam directed to the second relay apparatus.

3. The relay apparatus according to claim 1, wherein
the receiver, in operation, receives a second data signal from a second device that is physically or wirelessly connected to the first relay apparatus;
the processor, in operation, allocates a third transmission slot for the second data signal within the first time period over a third frequency domain different from the first frequency domain; and
the transmitter, in operation, transmits the second data signal to the second relay apparatus by using the third transmission slot.

4. The relay apparatus according to claim 3, wherein the third frequency domain is different from the second frequency domain.

5. The relay apparatus according to claim 3, wherein the transmission of the second data signal, the transmission of the first relay signal and the transmission of the first data signal are performed by using a single transmission beam directed to the second relay apparatus.

6. The relay apparatus according to claim 1, wherein
the receiver, in operation, receives a second relay signal from the second relay apparatus and receives a second data signal from the first device;
the processor, in operation, allocates a fourth transmission slot for the second relay signal in a second time period over the first frequency domain and allocates a fifth transmission slot for the second data signal within the second time period over the second frequency domain, the second time period being different from the first time period; and
the transmitter, in operation, transmits the second relay signal to the first relay apparatus by using the fourth transmission slot and transmits the second data signal to the first relay apparatus by using the fifth transmission slot.

7. The relay apparatus according to claim 6, wherein the transmission of the second relay signal and the transmission of the second data signal are performed by using a single transmission beam directed to the first relay apparatus.

8. The relay apparatus according to claim 6, wherein a first transmission beam used for the transmission to the first relay apparatus is different from a second transmission beam used for the transmission to the second relay apparatus.

9. A communication method for a relay apparatus, the communication method comprising:
receiving a first relay signal from a first relay apparatus;
receiving a first data signal from a first device that is physically or wirelessly connected to the relay apparatus;
allocating a first transmission slot for the first relay signal in a first time period over a first frequency domain;

allocating a second transmission slot for the first data signal within the first time period over a second frequency domain different from the first frequency domain; and transmitting the first relay signal to a second relay apparatus by using the first transmission slot and transmitting the first data signal to the second relay apparatus by using the second transmission slot.

10. The communication method according to claim 9, wherein the transmission of the first relay signal and the transmission of the first data signal are performed by using a single transmission beam directed to the second relay apparatus.

11. The communication method according to claim 9, comprising:

receiving a second data signal from a second device that is physically or wirelessly connected to the first relay apparatus;

allocating a third transmission slot for the second data signal within the first time period over a third frequency domain different from the first frequency domain; and transmitting the second data signal to the second relay apparatus by using the third transmission slot.

12. The communication method according to claim 11, wherein the third frequency domain is different from the second frequency domain.

13. The communication method according to claim 11, wherein the transmission of the second data signal, the transmission of the first relay signal and the transmission of the first data signal are performed by using a single transmission beam directed to the second relay apparatus.

14. The communication method according to claim 9, comprising:

receiving a second relay signal from the second relay apparatus and receiving a second data signal from the first device;

allocating a fourth transmission slot for the second relay signal in a second time period over the first frequency domain and allocating a fifth transmission slot for the second data signal within the second time period over the second frequency domain, the second time period being different from the first time period; and transmitting the second relay signal to the first relay apparatus by using the fourth transmission slot and transmitting the second data signal to the first relay apparatus by using the fifth transmission slot.

15. The communication method according to claim 14, wherein the transmission of the second relay signal and the transmission of the second data signal are performed by using a single transmission beam directed to the first relay apparatus.

16. The communication method according to claim 14, wherein a first transmission beam used for the transmission to the first relay apparatus is different from a second transmission beam used for the transmission to the second relay apparatus.

* * * * *